(12) United States Patent (10) Patent No.: US 9,181,883 B2
Mavinahally et al. (45) Date of Patent: Nov. 10, 2015

(54) FOUR CYCLE ENGINE CARBURETORS

(71) Applicants:Nagesh S. Mavinahally, Northridge, CA
(US); Jay Veerathappa, Northridge, CA
(US); Pushpa Nagesh Mavinahally,
Northridge, CA (US)

(72) Inventors: Nagesh S. Mavinahally, Northridge, CA
(US); Jay Veerathappa, Northridge, CA
(US); Pushpa Nagesh Mavinahally,
Northridge, CA (US)

(73) Assignee: Nagesh S. Mavinahally, Granada Hills, CA (US)

( * ) Notice: Subject to any disclaimer, the term of this patent is extended or adjusted under 35 U.S.C. 154(b) by 317 days.

(21) Appl. No.: 13/745,716

(22) Filed: Jan. 18, 2013

(65) Prior Publication Data

US 2014/0202428 A1 Jul. 24, 2014

(51) Int. Cl.
*F02D 35/00* (2006.01)
*F02M 37/00* (2006.01)
*F02M 21/02* (2006.01)
*F02M 7/24* (2006.01)

(52) U.S. Cl.
CPC ............. *F02D 35/0084* (2013.01); *F02M 7/24* (2013.01); *F02M 21/02* (2013.01); *F02M 37/00* (2013.01)

(58) Field of Classification Search
CPC ...... F02D 25/0084; F02D 35/76; F02M 7/24; F02M 21/02
USPC ........ 123/434, 311, 196 R, 196 CP, 437, 438, 123/439, 442, 443, 184.42; 261/41, 2, 3, 261/42, 23, 1
See application file for complete search history.

(56) References Cited

U.S. PATENT DOCUMENTS

| | | | | |
|---|---|---|---|---|
| 2,128,519 | A | * | 8/1938 | Adams ........................ 48/180.1 |
| 2,287,508 | A | | 5/1941 | Berger |
| 3,447,519 | A | * | 6/1969 | Jokl et al. ................. 123/73 AD |
| 4,080,948 | A | * | 3/1978 | Dolza, Sr. .................. 123/198 F |
| 4,351,300 | A | * | 9/1982 | Selvidge et al. .............. 123/527 |
| 4,459,966 | A | | 7/1984 | Sakano et al. |
| 4,513,702 | A | | 4/1985 | Koga et al. |
| 4,567,860 | A | * | 2/1986 | Sugiyama ................ 123/184.42 |
| 4,572,134 | A | * | 2/1986 | Nouthuka et al. ............ 123/438 |
| 5,090,363 | A | | 2/1992 | Duret |
| 5,377,634 | A | | 1/1995 | Taue |
| 5,778,838 | A | | 7/1998 | Taue |
| 5,947,075 | A | | 9/1999 | Ryu et al. |
| 6,021,766 | A | | 2/2000 | Maeda et al. |
| 6,039,020 | A | | 3/2000 | Kawamoto et al. |
| 6,047,678 | A | | 4/2000 | Kurihara et al. |
| 6,119,648 | A | | 9/2000 | Araki |
| 6,152,098 | A | | 11/2000 | Becker et al. |
| 6,199,532 | B1 | | 3/2001 | Haberlein et al. |
| 6,213,079 | B1 | | 4/2001 | Watanabe |
| 6,250,273 | B1 | | 6/2001 | Ryu et al. |
| 6,332,440 | B1 | | 12/2001 | Nagai et al. |
| 6,427,672 | B1 | | 8/2002 | Ito et al. |
| 6,439,215 | B1 | | 8/2002 | Sato et al. |
| 6,502,565 | B2 | | 1/2003 | Schmid et al. |
| 6,508,224 | B2 | | 1/2003 | Ito et al. |
| 6,539,904 | B2 | | 4/2003 | Ito et al. |
| 6,640,755 | B2 | * | 11/2003 | Araki ........................ 123/73 PP |
| 6,644,290 | B2 | | 11/2003 | Yoneyama et al. |
| 6,672,273 | B2 | | 1/2004 | Ito et al. |
| 6,705,263 | B2 | | 3/2004 | Ito et al. |
| 6,901,892 | B2 | * | 6/2005 | Mavinahally et al. ...... 123/73 V |

(Continued)

*Primary Examiner* — Mahmoud Gimie

(57) ABSTRACT

Various embodiments include engine carburetors. Various embodiments provide for methods of cylinder manufacturing engines. Various embodiments provide for methods of cylinder manufacturing four-stroke engines. Various embodiments provide for methods of cylinder manufacturing two-stroke engines.

3 Claims, 50 Drawing Sheets

(56) References Cited

U.S. PATENT DOCUMENTS

| | | |
|---|---|---|
| 7,000,581 B1 | 2/2006 | Mavinahally et al. |
| 7,093,570 B2 * | 8/2006 | Mavinahally et al. ...... 123/73 D |
| 7,096,850 B2 | 8/2006 | Yashirodai et al. |
| 7,243,632 B2 | 7/2007 | Hu |
| 7,398,759 B2 | 7/2008 | Todero |
| 2005/0172924 A1 * | 8/2005 | Simon ...................... 123/184.23 |
| 2011/0056462 A1 * | 3/2011 | Mavinahally et al. ........ 123/434 |
| 2011/0220074 A1 * | 9/2011 | Veerathappa ................ 123/65 P |
| 2012/0247435 A1 * | 10/2012 | Veerathappa et al. ........ 123/527 |
| 2012/0247442 A1 * | 10/2012 | Mavinahally ............. 123/73 PP |

* cited by examiner

FOUR CYCLE ENGINE CARBURETORS

RELATED APPLICATIONS

The present application claims the benefit of priority of U.S. patent application Ser. No. 12/876,137, entitled "FOUR CYCLE ENGINE CARBURETORS", which was filed Sep. 4, 2010; Ser. No. 12/890,627, entitled "INTEGRALLY CAST BLOCK AND GASEOUS FUEL INJECTED GENERATOR ENGINE", which was filed Sep. 25, 2010; Ser. No. 12/880,049, entitled "FUEL SYSTEM", which was filed Sep. 10, 2010; Ser. No. 12/880,047, entitled "TWO-STROKE ENGINE", which was filed Sep. 10, 2010; and Ser. No. 12/907,360, entitled "INTEGRALLY CAST BLOCK AND UPPER CRANKCASE", which was filed Oct. 19, 2010; the entirety of each of which is incorporated by reference herein for all purposes.

BACKGROUND

Conventional four-stroke engines have certain disadvantages as they are complicated and difficult to manufacture and assemble because there are numerous parts as compared to two-stroke engines. The additional parts, for example include, valve trains consisting of intake and exhaust valves, followers in the case of push tube trains for transmitting motion from cam lobes to rockers, just rockers in the case of overhead cam and belt or chain drives for overhead cam types. Also included are cam gear or pulley as the case may be, valve springs and retainers, camshafts, and cam covers in some cases. Also, the method of assembling the main components varies depending on how the cylinder, crankcase, crankcase cover, piston rod and crankshaft assemblies are made. Also, in the conventional hand held four-stroke engines, the oil is either recirculated in a wet type lubrication or pre-mixed with fuel for mist lubrication.

It is known in the prior art that four-stroke engines have cylinder blocks (with or without a separate cylinder head) and crankcases as the case may be with or without crankcase covers. For example, cylinders manufactured by MTD Southwest has a cylinder head integral with the cylinder and has a separate crankcase which has main bearings to support the crankshaft and a separate volute attached to the crankcase. The volute also has bosses for the ignition module. Another example is a Honda engine which has a cylinder block including a cylinder, where the upper half of the crankcase is integral with the cylinder block and a lower half of the crankcase which, when assembled together, support the main bearings. In this case, there is no separate crankcase cover and the belt drive for the overhead valve system is a wet type, where the upper and lower half of the crankcases together form a reservoir for the lubricating oil and the belt is completely enclosed. The enclosure is integral with the upper half of the crankcase. A similar design is used for a push tube type of valve train. Reference may be made to U.S. Pat. Nos. 6,539,904, 6,672,273, 6,427,672, 6,508,224, 6,705,263 (belt drive), and U.S. Pat. No. 6,021,766 (push tube).

Some Honda full crank engines have the crankcases split at an angle to the crankshaft as disclosed in U.S. Pat. Nos. 6,250,273 and 6,644,290. The front half of the crankcase is integral with the cylinder block and has bearing boss to support the front half of the crankshaft and the rear half of the crankcase has another bearing boss to support the outboard side of the crankshaft. The cam gear or the pulley for transmitting the motion to the overhead valves is in the outboard side.

Another example of engines with push tubes are disclosed in U.S. Pat. Nos. 6,213,079, 7,243,632, and 6,119,648. Some engines use gears to transmit rotation from crankshaft to the overhead camshaft, which is running at half the crankshaft speed as disclosed in U.S. Pat. No. 6,152,098. In most cases where the engine has a two piece block, the top or front half and lower or outboard half of the crankcase, the valve train is on the outboard side.

In the case of upper and lower halves of crankcases (or left and right halves as in Kioritz U.S. Pat. No. 6,119,648, the disadvantages are that the upper and lower halves are first assembled together and then the bearing bores are machined. They are taken apart for the final assembly. They are not interchangeable. A sealing gasket is used to seal the two halves. As such, the cost of such a system is higher than the one proposed in the design disclosed herein.

Prior art disclosed in U.S. Pat. No. 2,287,508 refers to a wet lubrication, where the oil is pumped into various sections of the engine and oil is recirculated. The lubricating pump is not described clearly, but it is driven by the camshaft. In the handheld trimmer sold by Mitsubishi model TL 26, the oil pump is driven by the crankshaft on the outboard side, but it is two-stroke engine and 100% of the air-fuel mixture enters the crankcase chamber.

Thus, engine designers are constantly trying to design engines that have less parts, are simpler, and less expensive to manufacture.

Disadvantage with conventional four stroke engines for hand held application is that the oil in the crankcase may seep into the combustion chamber and cylinder head when the equipment is turned upside down.

In some hand held engines, such as trimmers and blowers, the location and size of the fuel tank is constrained by the size of the engine and the shape and size of the crankcase cover. The constraint is more when the fuel is propane gas. Propane gas are typically made out of metal and preferably of cylindrical shape. Therefore the height of the whole engine is significantly higher when propane tank is mounted either on the top or bottom of the engine. The embodiments disclosed here provide many advantages over the prior arts.

In some electronic fuel injection system, the fuel is gasoline or diesel. However, in small hand-held engines, electronic fuel injection system is complex as it requires a separate fuel pump, either integral with the throttle body or a separate system. In either case, the cost of the system becomes expensive because of the additional parts.

The embodiment described here does not require a pump, as the fuel is already at a pressure in the LPG fuel tank or even in a compressed natural gas tank. The advantage described in this embodiment is that the throttle body can be integral with the pressure regulator and a metering chamber if necessary. It is also possible to have a pressure regulator only either integral with the throttle body or a separate pressure regulator commonly used with LPG tanks.

BRIEF SUMMARY

Accordingly, embodiments of the present inventions provide a new and improved method of cylinder manufacturing and assembling the four-stroke engines, particularly, four stroke engines (applicable to two stroke engine cylinders as well). A single piece cylinder crankcase block for half and full crank allow for the manufacture and assembly of a lower cost engine. A simpler crankcase for dry sump lubrication can also be used as the dry sump engine/mist lubrication allows engines for any attitude operation when used in hand-held applications.

The low cost simpler four-stroke engine is especially suited for handheld, lawn and garden equipments such as trimmers, blowers, chainsaws, cultivators, lawn mowers, compressor engines, and generator engines.

Further, the conventional four-stroke engines have camshaft and reduction gear for running the cam lobes at half the crankshaft speed to operate the intake and exhaust valves only once every two rotations of the crankshaft speed. However, in the monoshaft engine, the cam lobe is either integral with the counter-weight or a separate piece mounted on the crankshaft in a chamber between the bearing bosses. In the invention disclosed here, the method manufacturing the cylinder block is simplified.

The present inventions reduces the number of parts, particularly, the half-crank engine and simplifies the method of assembling the full crank engine. Further, the engine design disclosed here is applicable to a full crank engine, where in both the outer and inner main bearing bosses are cast in as a single piece, but has a new assembly procedure.

Some four stroke engines have a breather system for discharging excessive blowby gases through the camshaft, particularly, in the case of push tube type valve train system. The camshaft, in this case, is substantially parallel to the crankshaft and is mounted between the cylinder head and the crankshaft. The breather passage is in the camshaft and it can be a stationary shaft, where the cam gear and lobe are rotating on the shaft. Further, there can be a breather passage in the crankshaft connecting the cam chamber to the ambient (instead of breather passage in the crankshaft).

Further, the embodiment of the present invention provide a new and improved lubricating system where in first fraction of the charge which consists of first fraction of air and first fraction of pre-mixed fuel goes to the crankcase chamber to lubricate the internal parts of the engine and second fraction of the charge consisting of second fraction of air and second fraction of pre-mixed fuel straight to the combustion chamber during intake stroke. The first fraction of the charge also enters the combustion chamber during the intake stroke. In another embodiment the first fraction of the air free of any fuel where in lubricating oil is injected into the first fraction of air to lubricate the internal parts. However, the first fraction of air and oil mixture returns to the intake port and into the combustion chamber during the intake process.

In another embodiment, the first fraction of the charge enters the crankcase chamber through a passage in the crankshaft. The first fraction of the charge in one embodiment returns to the intake port through a passage in the cylinder head through a check valve. In another embodiment first fraction of the charge returns to the intake port through a passage external to the valve chamber through a check valve. Yet, in another embodiment the first fraction of the charge returns to the combustion chamber through a separate intake port in a divided intake port. And in this case, the first fraction of the charge mixes with the second fraction of the charge only at the intake port and in the combustion chamber. In another embodiment the first fraction of air or charge entering through a passage in the crankshaft may be timed by a rotary valve in place of a one way valve. The second fraction of the charge may be a propane gas-air mixture or any liquid fuel-air mixture. The fuel may be injected into the second fraction of air.

BRIEF DESCRIPTION OF THE DRAWINGS

FIG. 9bb is a cross-sectional side view illustration of a mono-block having integrally cast cylinder block, crankcase, cylinder head, and bearing boss in the engine illustrated in FIG. 7.

FIG. 19cc shows enlarged view of the location of the LPG fuel tank and the shape of the crankcase cover shown in FIG. 19c.

FIG. 20a is a cross sectional front view of an embodiment of a fuel mixer with two sliding valves on a common sliding drum.

FIG. 20b is a cross sectional side view of FIG. 20a.

FIG. 20c is a view of FIG. 20b with sliding drum partially lifted up.

DETAILED DESCRIPTION

Figure 1:
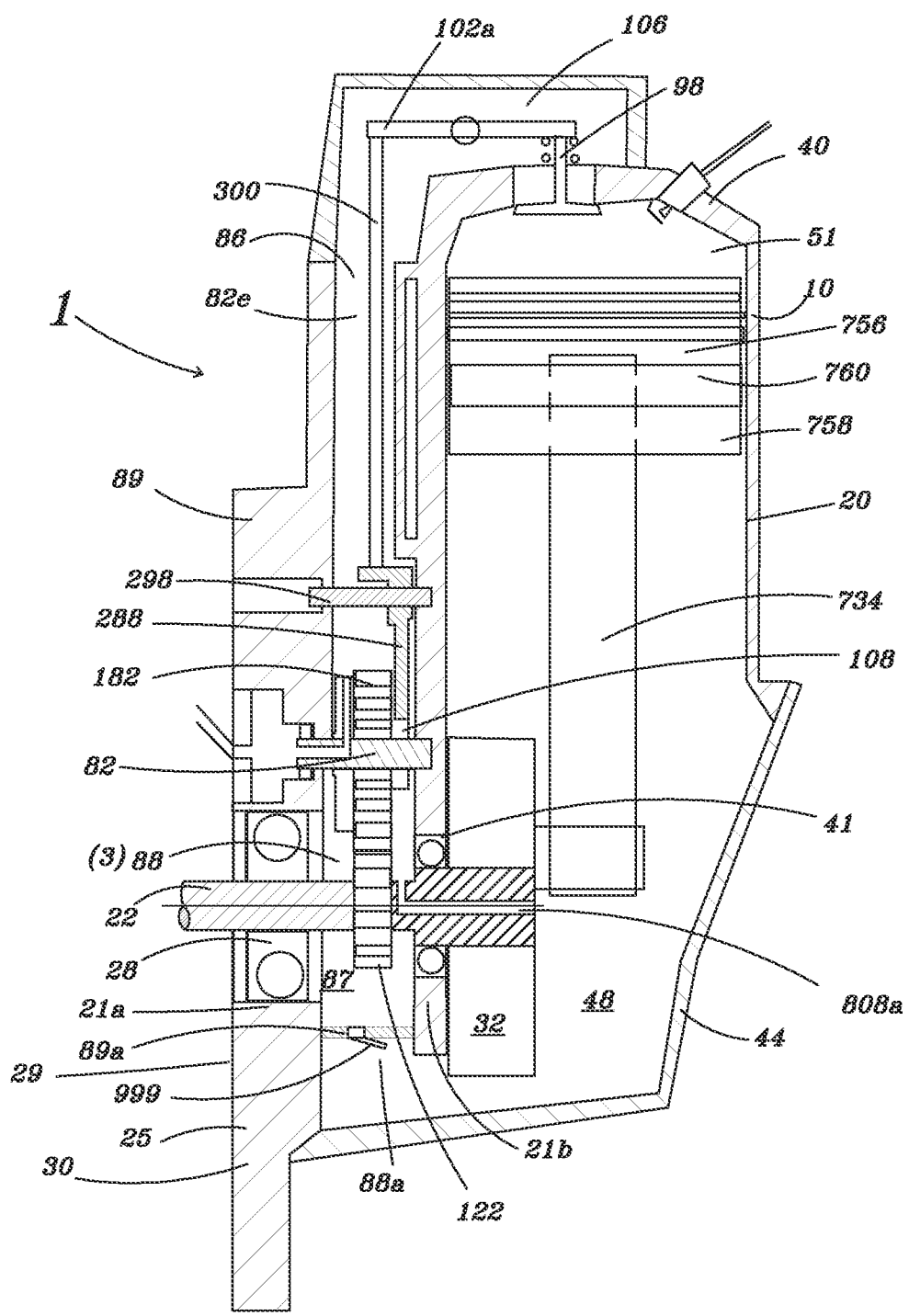
FIG. 1 is a cross-sectional side view illustration of an exemplary embodiment of a half-crank mono-block four-stroke engine with a push tube valve train where the cam chamber is plugged at its bottom.
Figure 1B:
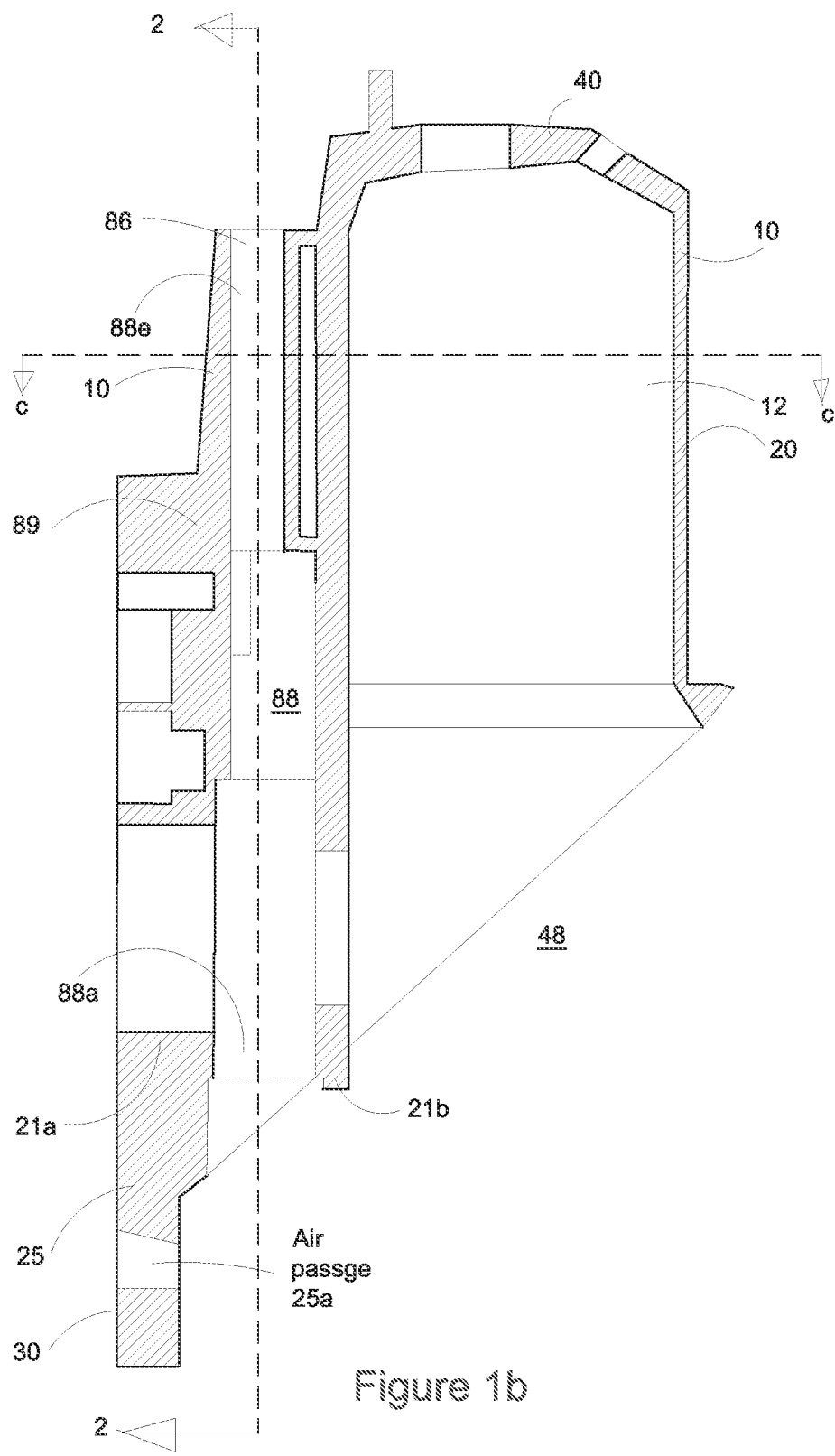
FIG. 1b is a cross-sectional side view illustration of a mono-block having integrally cast cylinder block, crankcase, cylinder head, and outer and inner bearing bosses in the engine illustrated in FIG. 1.
Figure 1C:
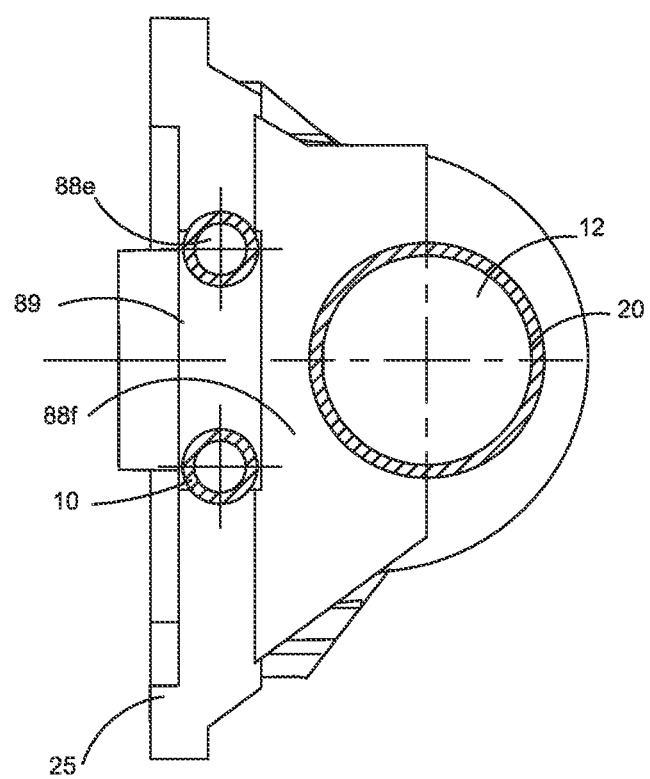
FIG. 1c is a cross-sectional top view illustration of a monoblock having integrally cast cylinder block, crankcase, cylinder head, and outer and inner bearing bosses in the engine illustrated in FIG. 1.

FIGS. 1, 1b, and 1c illustrate an exemplary embodiment of a half-crank mono-block four-stroke engine 1 with a push tube valve train 2 and a cam chamber 3 plugged at its bottom 4. The engine 1 includes a one half-crank monoblock 10 having a cylinder block 20 surrounding a cylinder bore 12, a crankcase 30, and cylinder head 40 all integral as a monoblock as further illustrated in FIG. 1b. The crankcase 30 includes integrally cast outer and inner bearing bosses 21a and 21b configured to support a half crankshaft 22. The inner bearing boss 21b supports an inner bearing 41 closest to a counter-weight 32 on the crankshaft 22. An outer bearing 28 is supported by the outer bearing boss 21a on a flywheel side 29 of an outer frame 25 of the crankcase 30. The outer frame 25 is spaced apart from the cylinder block 20. A piston assembly 756 disposed within the cylinder bore 12 includes a generally cylindrical piston 758 and a connecting rod 734 connected to the piston 758 by a piston pin 760.

In a full crank engine, an outer oil seal may replace the outer bearing. The outer frame 25 may be designed either for a reverse or forward air flow. Reverse air flow is where the frame has openings around the outer circumference for flow of air from behind the engine and forward air flow has openings in the front housing for flow of air. The combination of forward and reverse air flow has openings in the frame 25 as well as in the front housing for flow of air. A longitudinally extending open valve train chamber 88, formed in the mono-block 10 between an outboard wall 89 and the cylinder block 20, a lower opening 88a at a lower end 87 of the valve train chamber 88 that may be closed with a cover 89a, if necessary, or may be open to a crankcase chamber 48. A top end 86 of the valve train chamber 88 located near the cylinder head 40 is open to allow a valve train 60 to transmit motion from crankshaft 22 to an intake valve 98 and to an exhaust valve (not illustrated) which is behind the intake valve 98.

The intake valve 98 and the exhaust valve are in a valve chamber 106. The valve train 60 includes cam gear 182, cam lobe 108, followers 288, and push tubes 300 (also referred to as push rods). The valve train chamber 88 houses crank gear 122 and cam gear 182 with the followers 288. The valve train chamber 88 is formed, such as by casting, so that there is at least one slot 34 between the outer bearing boss 21a and the inner bearing boss 21b at the lower end of the valve train chamber 88. The slot 34 illustrated in FIGS. 1 and 1b is the lower end 87 of the valve train chamber 88.

The valve train chamber 88 is cored out using a slide in casting tool. The push tubes 300 may be disposed in push tube passages 88e. It may also be possible to core out part of push tube passages 88e and/or a belt drive passage 1288e illustrated in FIG. 12, together with the entire valve train chamber 88. Thus, the mono-block 10 allows coring out of the valve train chamber 88 or belt drive passage 1288e from the crankcase chamber 48 to form a single piece block without any additional cover piece or machining process.

Figure 12:
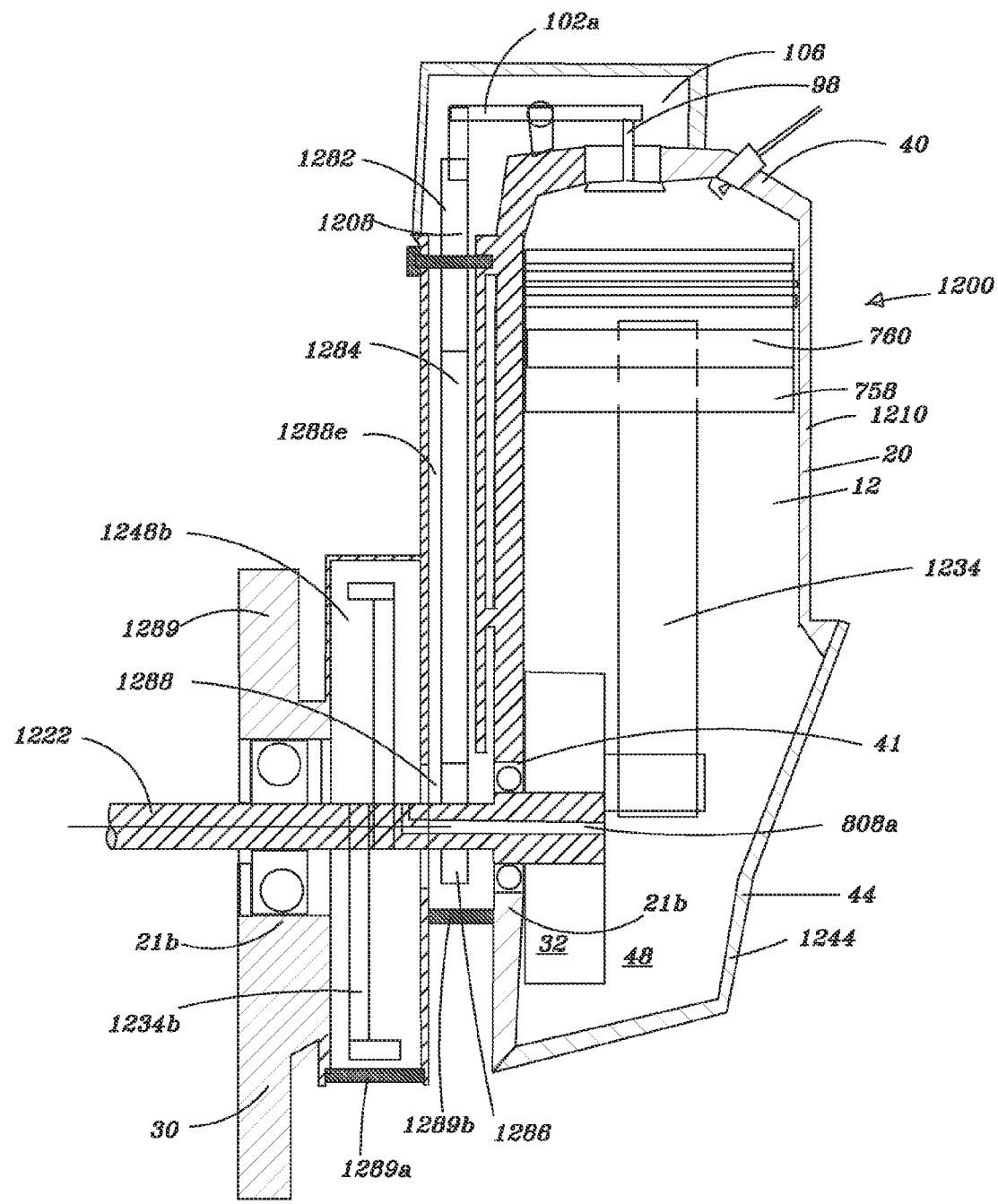
FIG. 12 is a cross-sectional side view illustration of another embodiment of the monoblock four stroke engine with a belt driven overhead cam and an oil chamber and a slinger.

The top end 86 of the valve train chamber 88 may be open to the overhead valve chamber 106 through the cast in push tube passage (or passages) 88e or may be just open for a dry type belt drive as illustrated in FIG. 12 or a passage for the wet type belt drive to drive the overhead camshaft through a cam gear or a pulley as the case may be.

Figure 4:
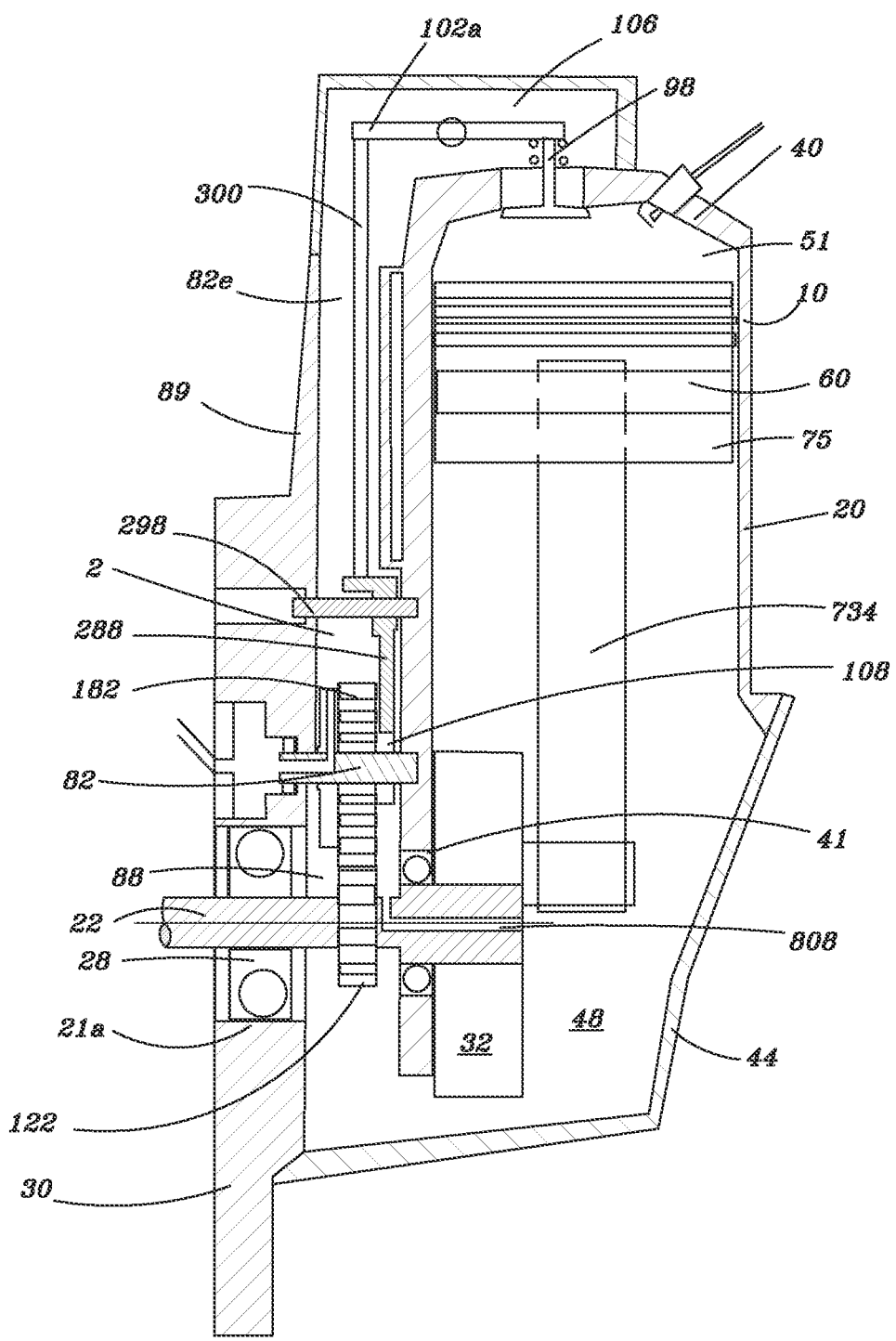
FIG. 4 is a cross-sectional side view illustration of a second exemplary embodiment of a half-crank mono-block four-stroke engine with a push tube valve train where the cam chamber is open at its bottom and the cam chamber and crankcase chamber are in communication through a cut-out passage.
Figure 5:
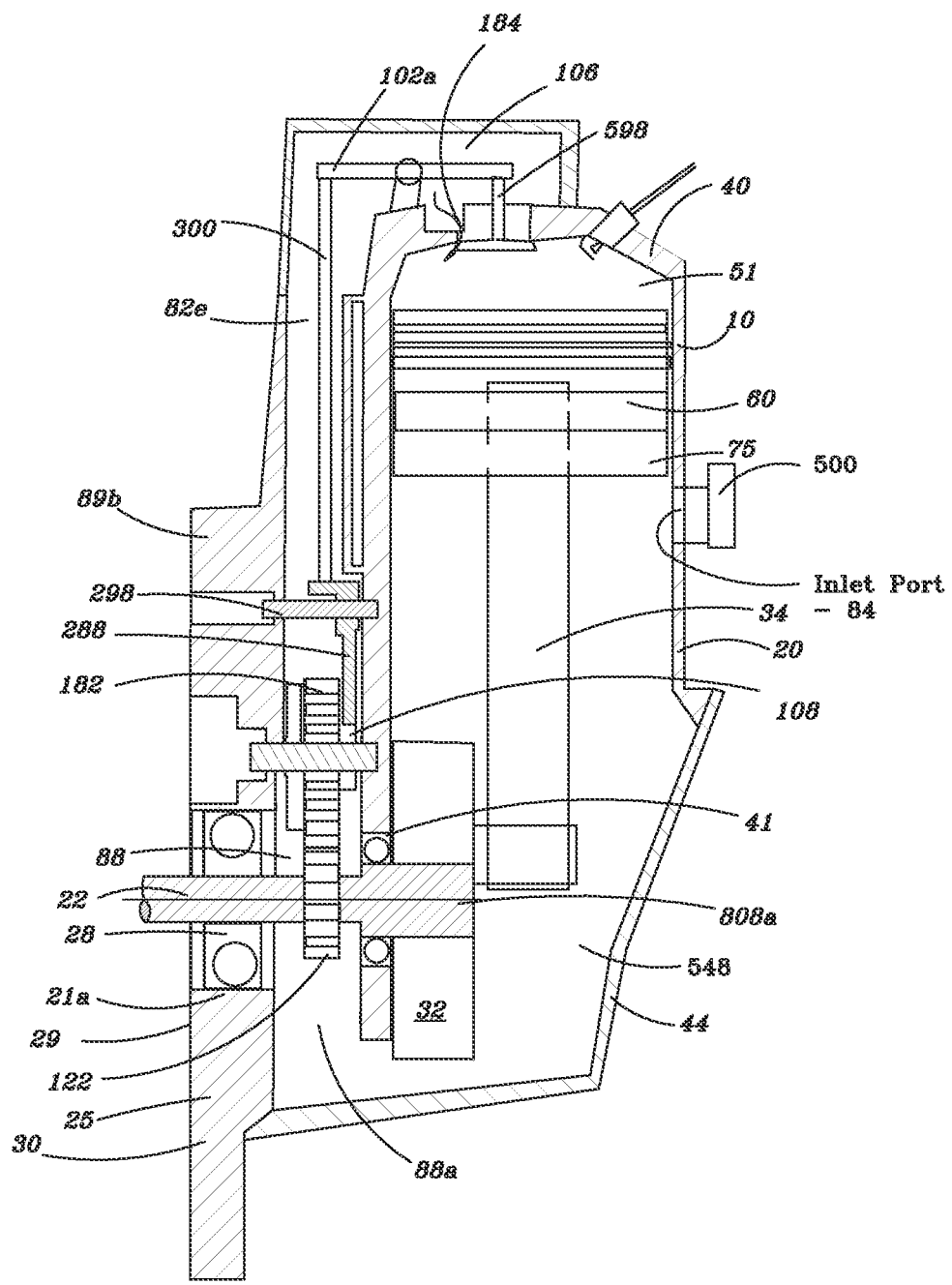
FIG. 5 is a cross-sectional side view illustration of a third exemplary embodiment of a half-crank mono-block four-stroke engine with a carburetor for supplying premixed lubrication and air-fuel mixture.

An embodiment of the engine 1 illustrated in FIGS. 4 and 5 includes a single continuous valve train chamber 88 extending between the crankcase chamber 48 and the overhead valve chamber 106 (or cam chamber if belt driven) in FIGS. 4 and 5. The valve train chamber 88 is a single continuous passage from the crankcase chamber 48 to the valve chamber 106 without any other additional piece attached as a cover to provide an enclosed passage and no separate push tube passages 88e. FIG. 5 illustrates how the airfuel mixture may be supplied into the crankcase chamber 548 through a carburetor 500. The functioning of the piston ported intake system is similar to a commonly used two stroke engine. However, the lube oil mixed charge enters a crankcase chamber 548 and flows into a combustion chamber 51 through an intake valve 598. The intake system may be similar to any standard intake system, such as reed valve or rotary valve system. The mixture enters the valve train chamber 88 through the opening 88a from the crankcase chamber 548 and into valve chamber 106 and into the combustion chamber 51 when the intake valve 98 is opened. Also, when a separate oil pump 1505 as shown in FIG. 5C is used, the fuel may not be pre-mixed with oil. FIG. 5C also illustrates where the pump 1505 is driven directly by the camshaft 82 either at same speed as camshaft or at a different speed through gears 1511. Prior art disclosed in U.S. Pat. No. 2,287,508 refers to a wet lubrication, where the oil is pumped into various sections of the engine and oil is re-circulated. However, in the embodiment disclosed here, the oil is injected into the intake system and mixed with the charge or air as the case may be. The oil pump 1505 has an inlet 1507 and an outlet 1509 for oil. The outlet feeds into the intake passage. The pump system may have an oil sensor 1513 to turn on an indicator when there is no oil in the reservoir or pump fails to pump oil.

Figure 6:
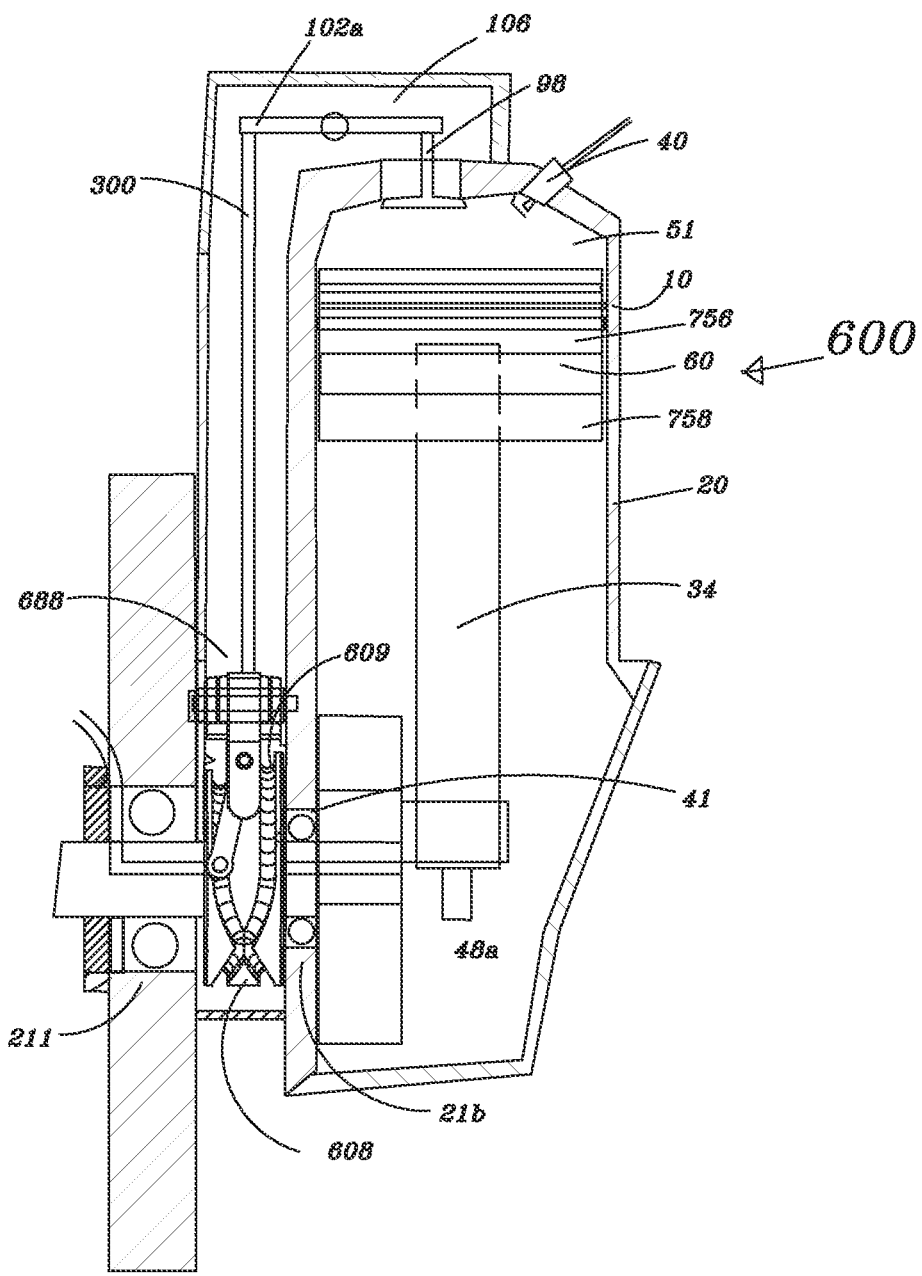
FIG. 6 is a cross-sectional view illustration of another embodiment of the monoblock four stroke engine with a cam lobe on the crankshaft between inner and the outer bearing bosses.

Illustrated in FIG. 6 is an alternative embodiment of the engine 600 that is similar in construction to the engine 1 in FIG. 1, except the engine 600 has the cam lobes 608 with channels 609 similar to U.S. Pat. No. 7,000,581. The construction and functionality of the engine 600 is similar to the prior art. However, FIG. 6 shows where the cam lobe 608 is between the inner and the outer bearing bosses 21b, 21a respectively. As shown in FIG. 6, the engine 600 has push tube type valve train. A valve train chamber 688 is similar to valve train chamber 88 in engine 1 where the lower end of the chamber 88 may be open to the crankcase chamber 48 as shown in FIG. 5 or may be closed as shown in FIG. 1.

Figure 3:
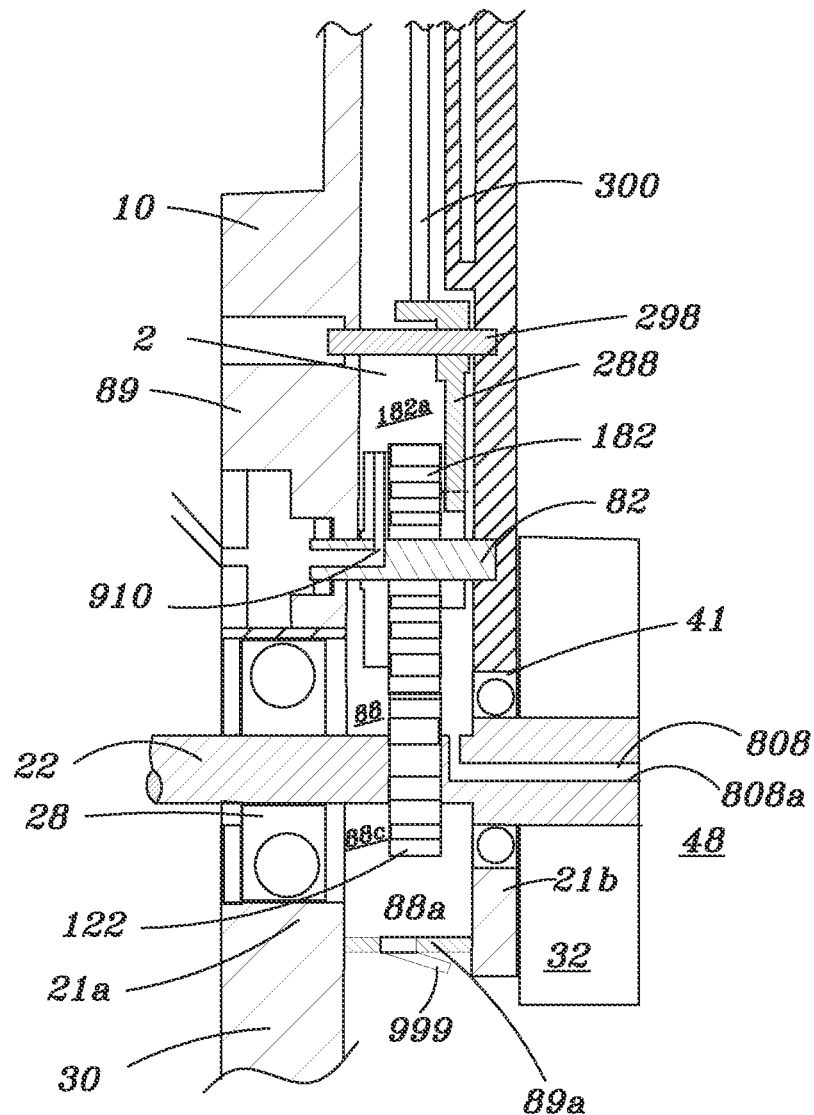
FIG. 3 is an enlarged cross-sectional front view illustration of a cam chamber with a breather passage in a camshaft of the engine illustrated in FIG. 1.

FIG. 3 illustrates a cam assembly 182a including a camshaft 82 and a cam gear 182. A breather system includes a breather passage 910 through the camshaft 82 that connects a breather tube 911 to the ambient to a hole 913 to the inside of the engine to relive the crankcase chamber pressure built-up due to blowby gases. The breather passage 910 and its function are similar to the expired U.S. Pat. No. 6,502,565.

Lubrication of the push tube valve train 2 is achieved by providing an oil passage 808 through the center of the crankshaft 22 that runs axially from the crankcase chamber 48 and then radially to the valve train chamber 88. Unlike breather passages disclosed in U.S. Pat. Nos. 6,039,020 and 6,047,678, the purpose is to supply a small amount of oil from the crankcase chamber into the valve train chamber 88, which in turn lubricates the valve train 2. (claim this feature where oil is supplied through central passage in the crankshaft) The lower opening 88a is closed and there may be an oil seal in the inner bearing boss 21b (or the bearing 41 could be a sealed bearing that prevents direct flow of oil from crankcase chamber into the valve train chamber 88.

Figure 12B:
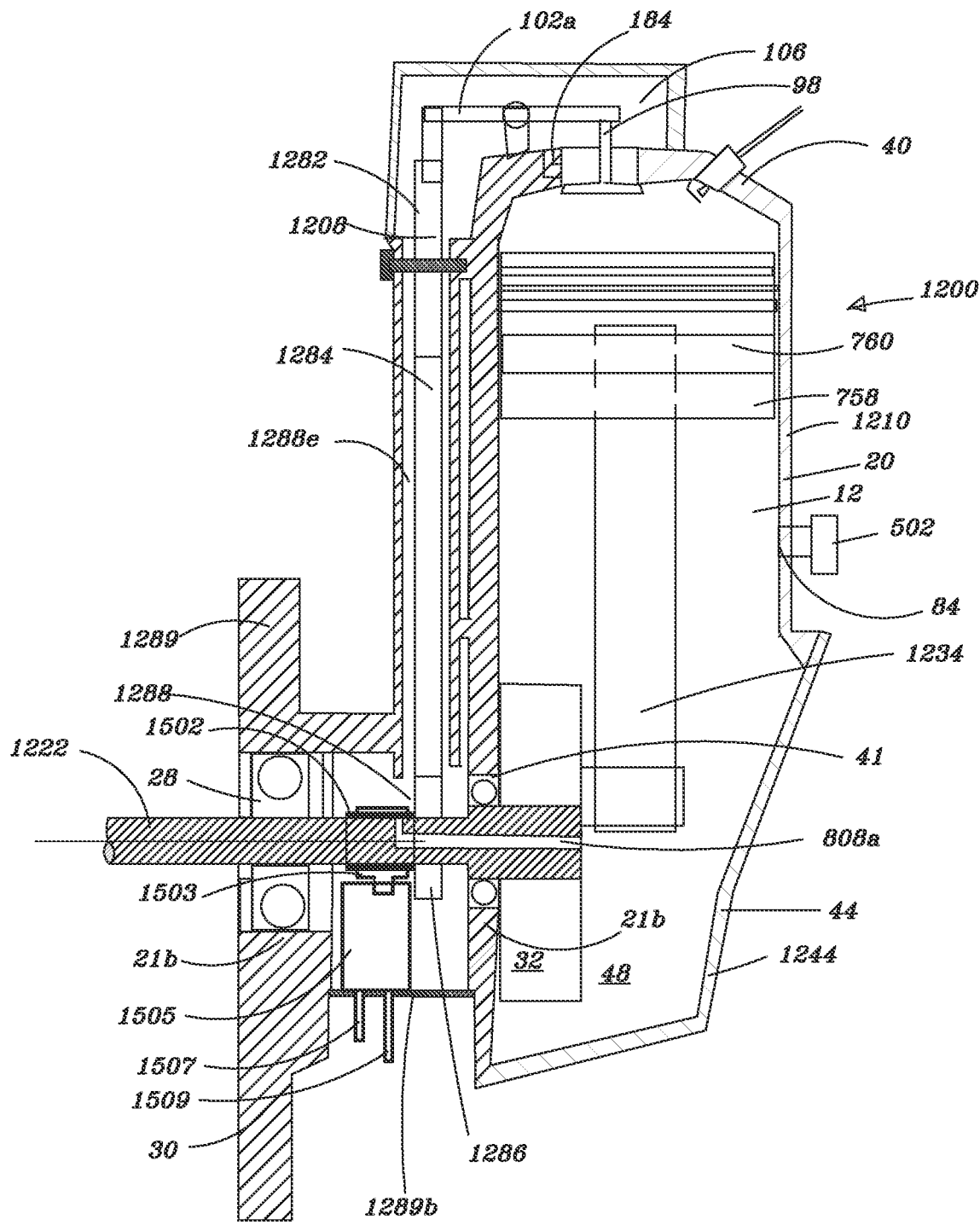
FIG. 12b is a cross-sectional side view illustration of another embodiment of mono-block having oil pump between inner and the outer bearing.

The small amount of oil that gets on the cam gears 182 and the crank gear 122 is splashed to help lubricate the intake valves 98 and rockers 102b. Oil condensed in the valve train chamber 88 is returned to the crankcase chamber 48 through a check valve 999 on the cover 89a, which opens when the crankcase chamber pressure drops as the piston assembly 756 moves upward. Other types of valves may be used. The opening 88a may be used for many usages such as described above to have a check valve for return of oil from the valve train chamber 88 to crankcase chamber 48, or can be used to have a oil pump, as shown in FIG. 12b or for a rotary valve between the valve train chamber 88 and crankcase chamber 48 or a rotary check valve for supply and or return of lubricating oil when a separate reservoir for oil is used either for dry type or mist lubrication shown in FIG. 12. Oil that escapes through the breather passage is collected in a separation chamber (not shown) and then returned to the crankcase chamber through a check valve. (This is a prior art) The oil passage through the crankshaft prevents oil from flowing into the valve train chamber 88 and subsequently into the breather or valve chamber 106 when the engine is stored in almost any attitude because the inlet 808a is always above the oil level. The oil pump 1505 shown in FIG. 12b is driven by the gear 1502 on the crankshaft 1222. However, it is possible for the gear to be an integral part of the crank gear 1286 (122 in other FIGS).

The gear could just be a swash plate to drive the gear on the pump 1505. Pump may be driven off of the belt or cam gear 12821284.

Figure 2:
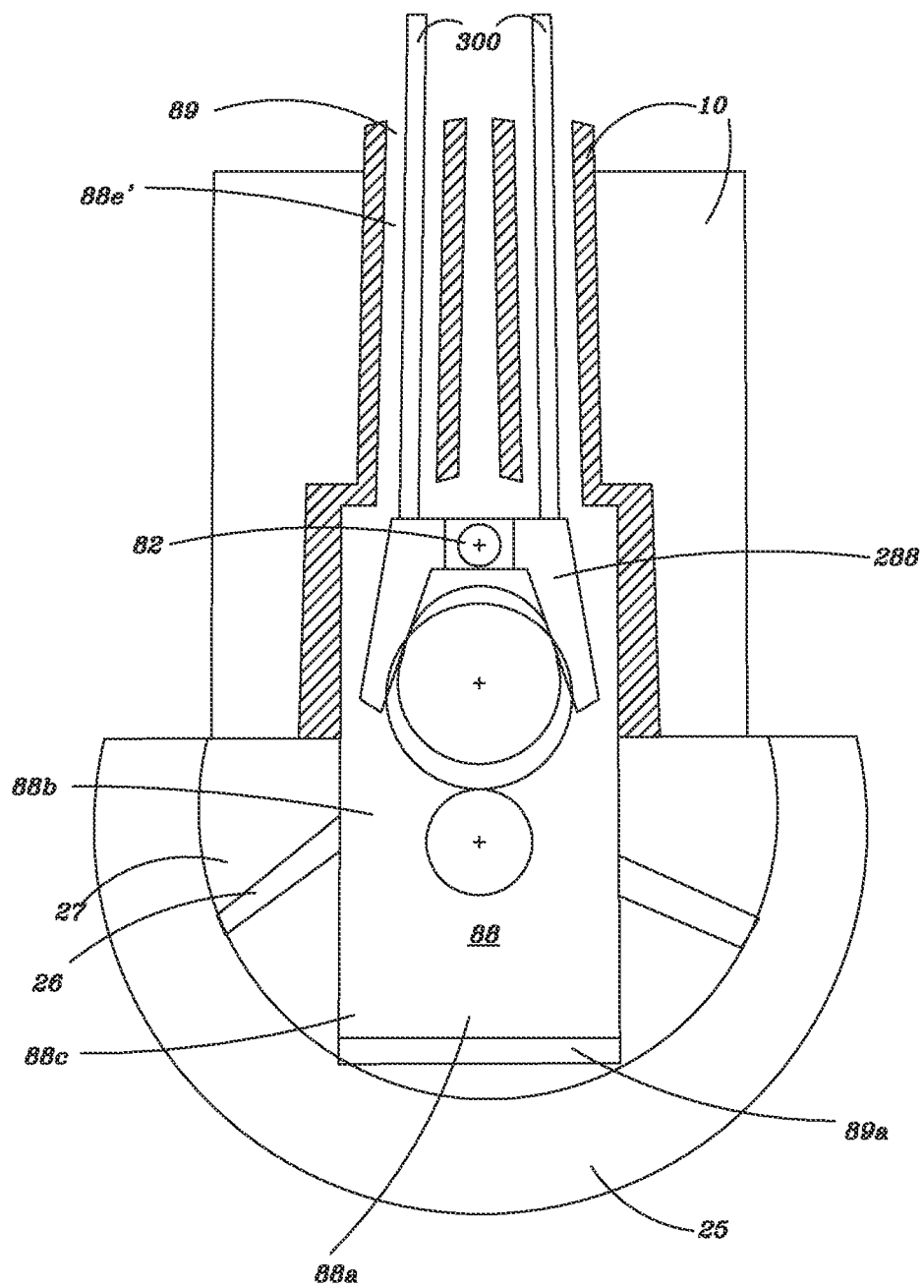
FIG. 2 is a cross-sectional front view illustration of the engine illustrated in FIG. 1.
Figure 7:
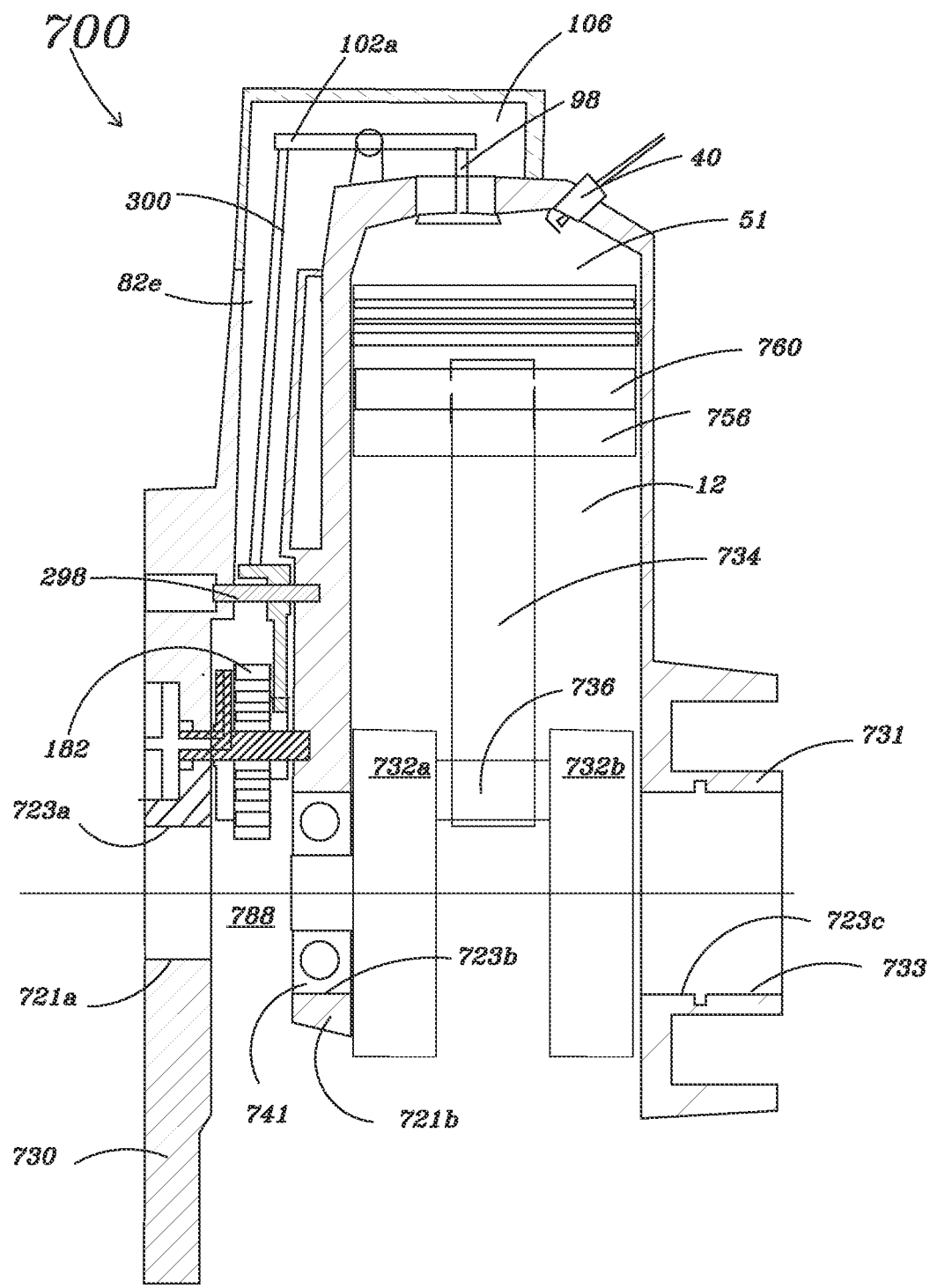
FIG. 7 is a cross-sectional view illustration of another embodiment of the monoblock four stroke engine with a full crank and a single block to support the full crankshaft.
Figure 8:
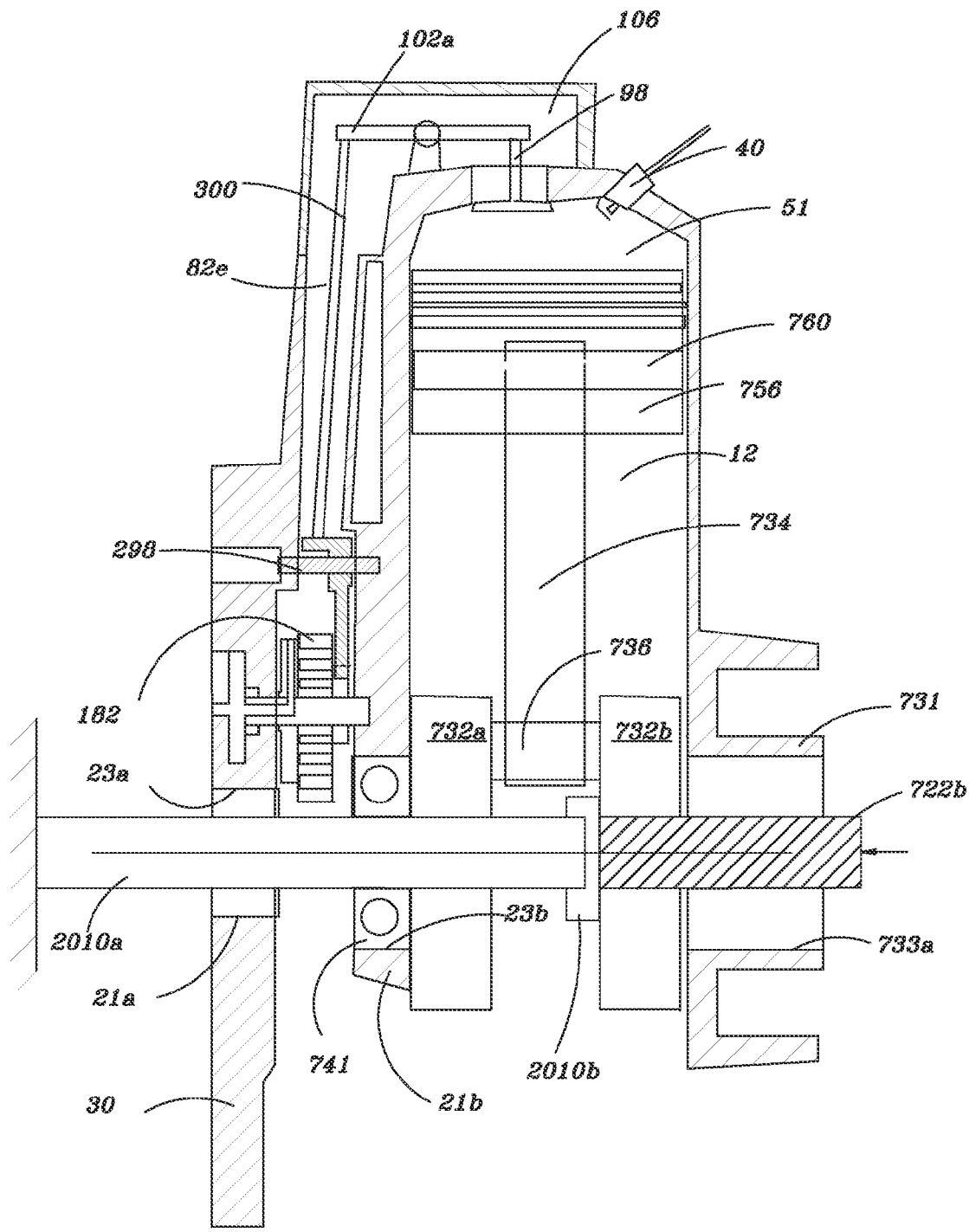
FIG. 8 is a cross-sectional view illustrating an outboard shaft being pressed into a counter-weight in the engine illustrated in FIG. 7.
Figure 9:
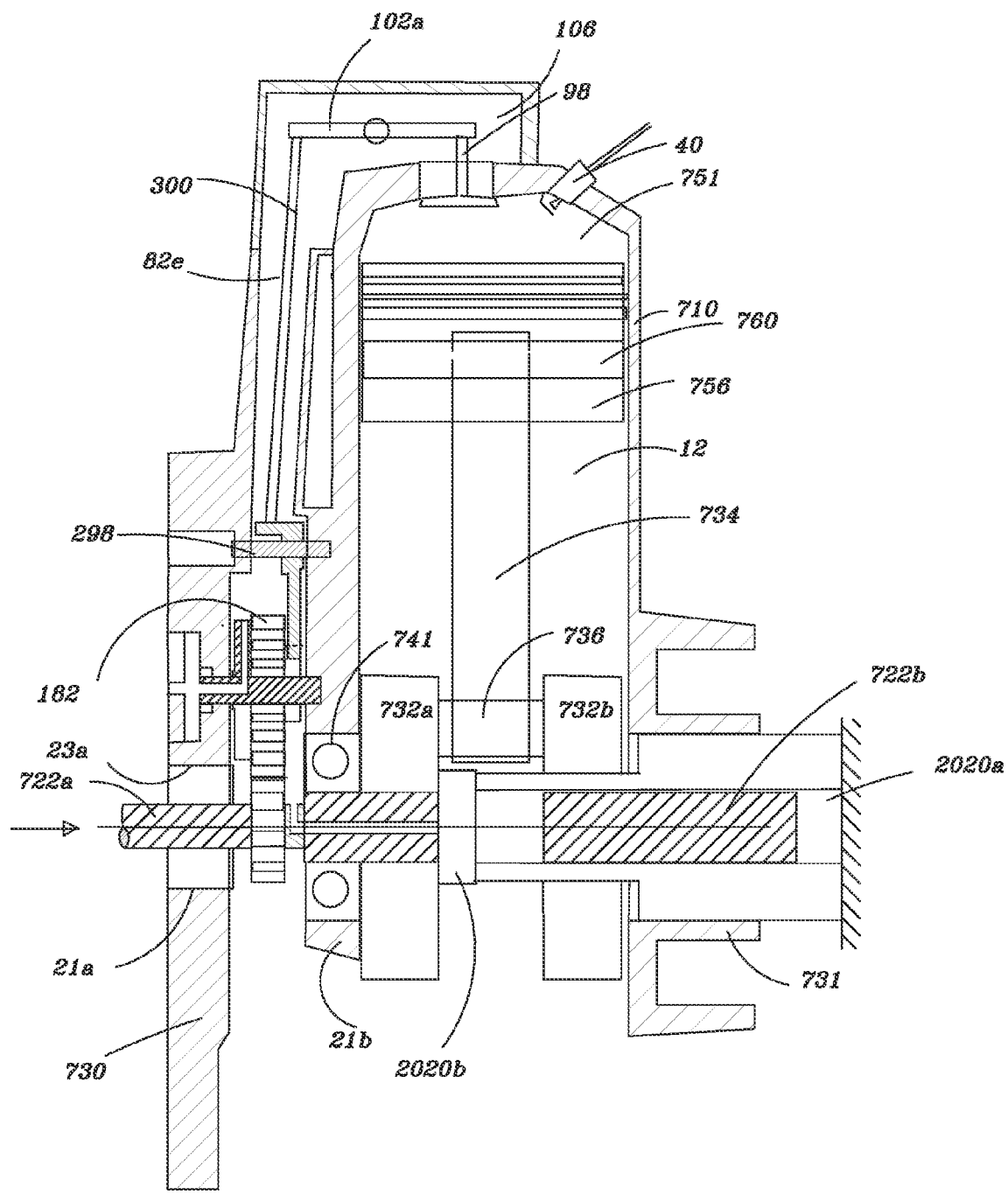
FIG. 9 is a cross-sectional view illustrating main shaft being pressed into the counter-weight in the engine illustrated in FIG. 7.
Figure 9B:
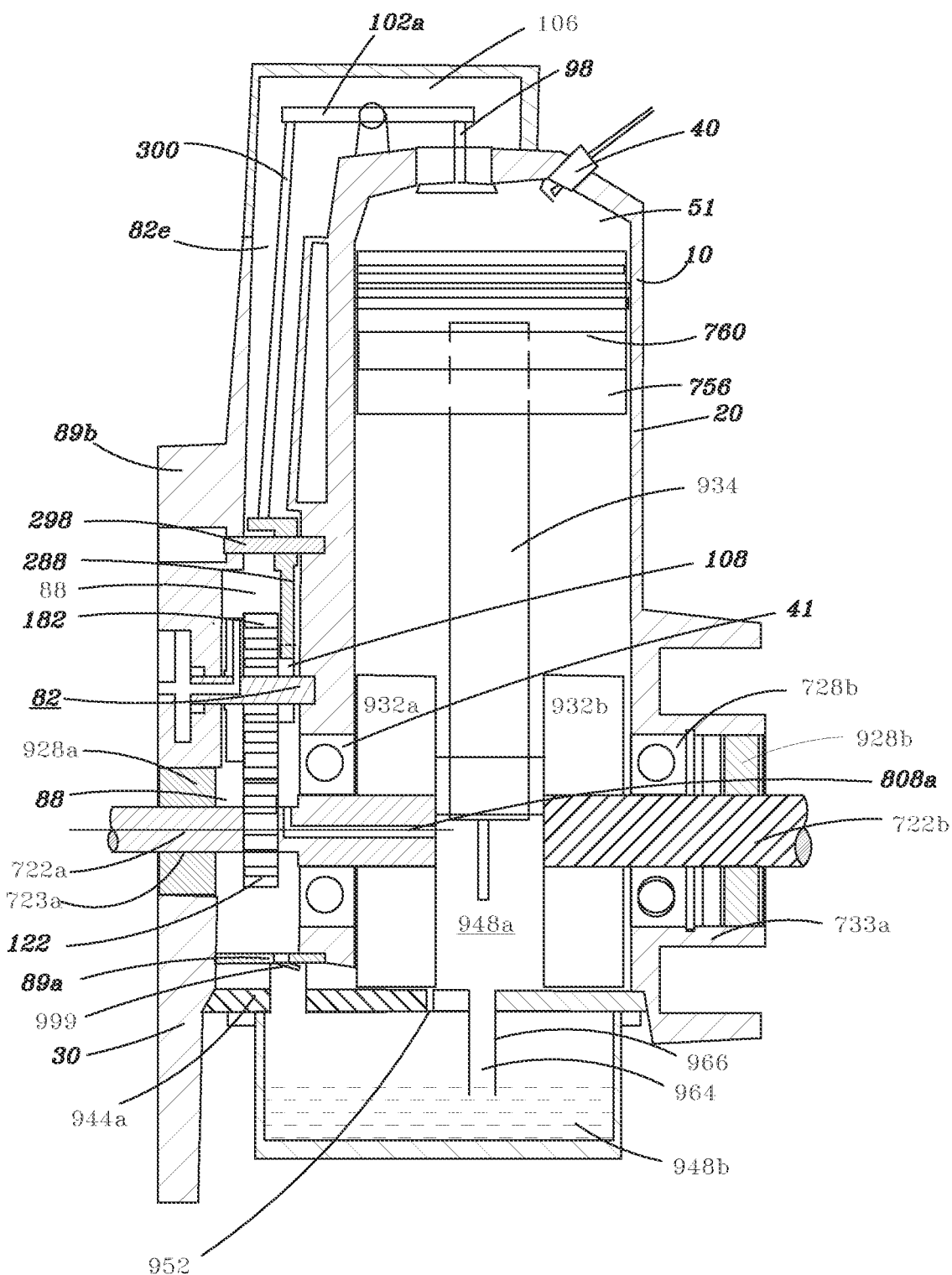
FIG. 9b is a cross-sectional view illustration of the engine illustrated in FIG. 9 with an oil chamber attached to a bottom of a crankcase.
Figure 9B:
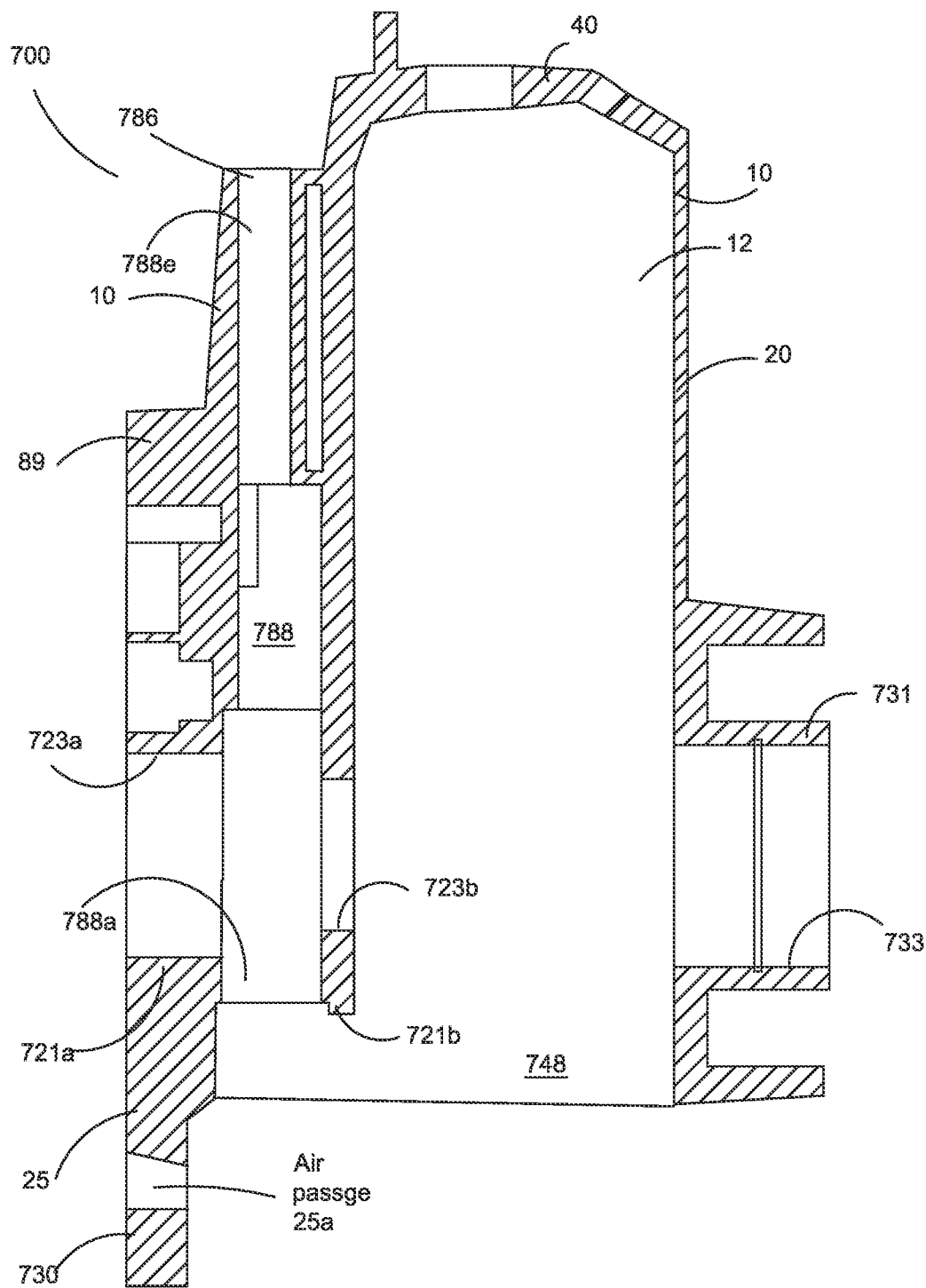
Figure 9C:
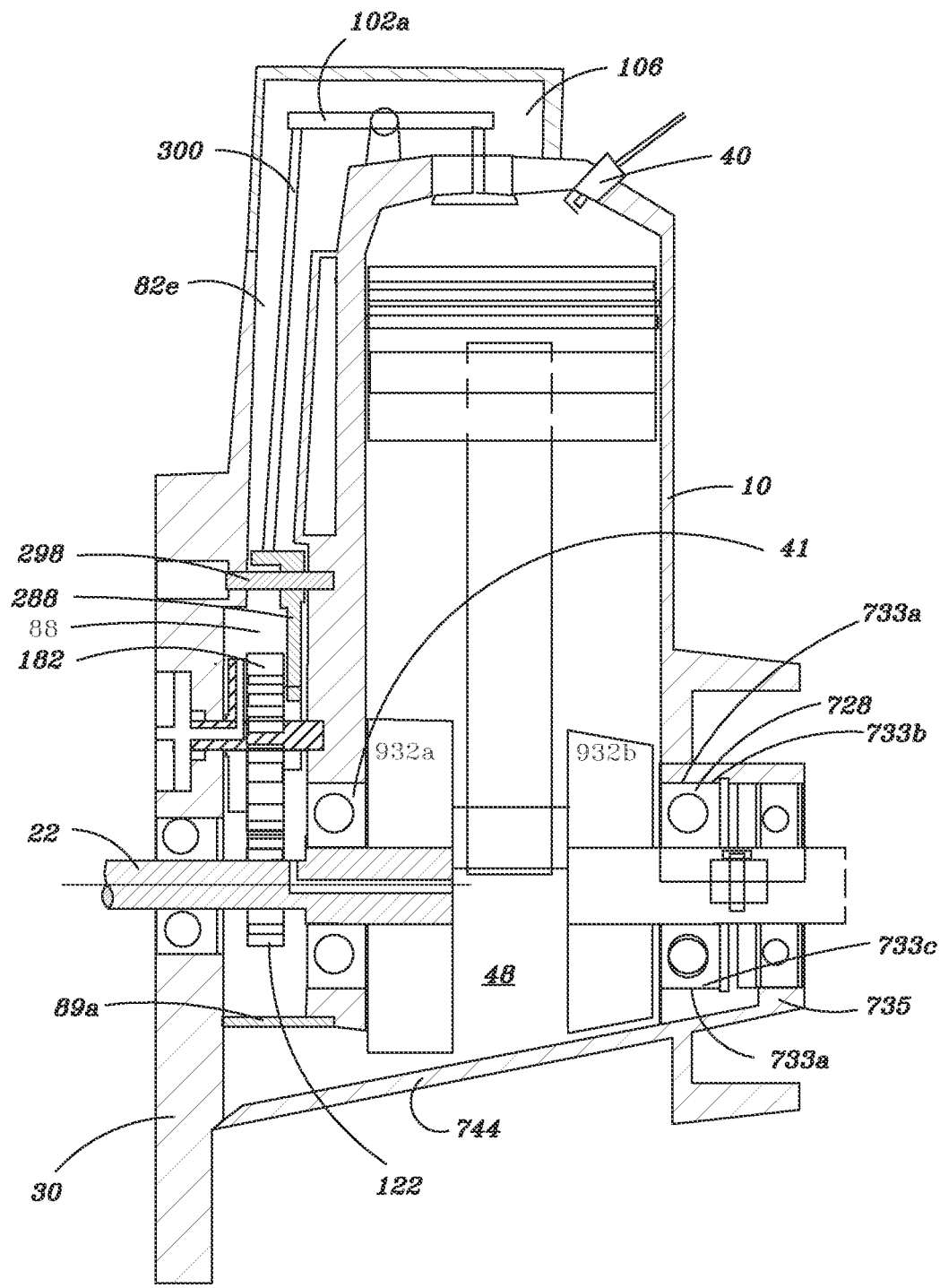
FIG. 9C is a cross-sectional side view illustration of another embodiment of the monoblock four stroke engine with a half-crank and one half of the outboard bearing boss being integral with the cylinder block.

A full crank engine 700, illustrated in FIGS. 7-9, is similar in construction to engine 1, illustrated in FIGS. 1-3. The full crank engine 700 includes an outboard bearing boss 731 to support a full crankshaft 722 which includes inboard and outboard crankshaft halves 722a and 722b. In most conventional full crank engines, the crankcase is split into two crankcase halves either vertically in line with the central line of the cylinder bore 12 or at an angle as in U.S. Pat. Nos. 6,439,215 and 6,250,273 or horizontally along the axis of the crankshaft as in U.S. Pat. Nos. 6,332,440, 6,021,766, and 5,947,075. The disadvantage is that the two crankcase halves are first assembled together first in order to machine the bearing bore and then detached for final assembly. Typically, the two crankcase halves stay as pairs. The embodiment of the engine 700 shown in FIGS. 7-9 has a single cylinder block 20 to support the full crankshaft 722. First, second, and third bearing bores 723a, 723b, and 723c may be machined at the same time concentric to each other as well as perpendicular to the cylinder bore 12 and with a better quality control. The alignment of the front and rear bearings are also better. Alternatively, an upper half 733b of the outboard bearing boss 733a may be integral with the cylinder block 20 while a lower half 733c of the outboard bearing boss 733a may be part of the crankcase cover 744 as illustrated in FIG. 9c.

Assembly of the inboard and outboard crankshaft halves 722a, 722b will be different than the conventional methods. A method of assembling the camshaft 82, cam gear 182, and the followers 288, as illustrated in FIGS. 1 and 3, includes pressing the camshaft 82 into the cylinder block 20 through a hole 83. The camshaft 82 may be free to rotate in the hole 83 in the block 20 when the camshaft 82 is pressed into the cam gear 182 and the lobe 108. Alternatively, the camshaft 82 may have an interference fit within the hole 83 in the block 20 while the cam gear 182 and the lobe 108 are rotating on the camshaft 82.

Figure 11:
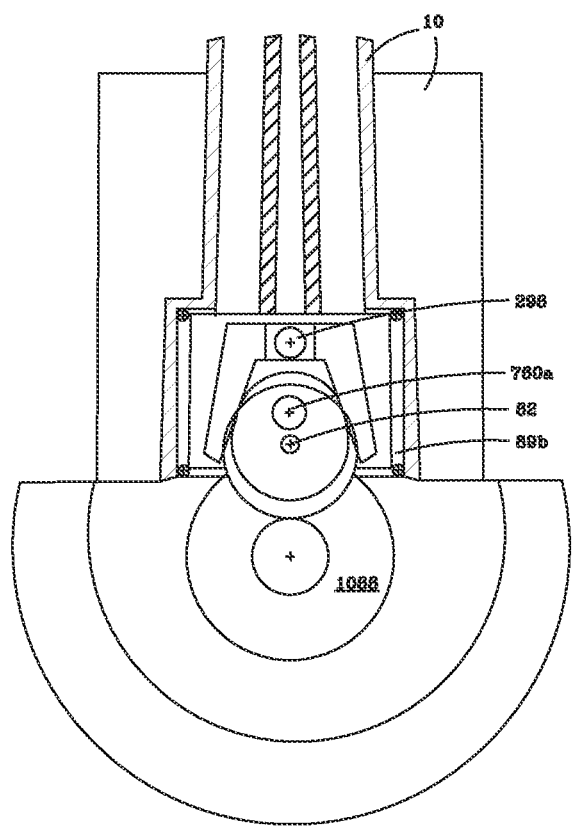
FIG. 11 is a cross-sectional side view illustration of a front part of a cam chamber closed with separate cam cover.

A method of assembling the full crank engine 700 with integral bearing bosses includes assembling first and second counter-weights 732a, 732b, installing crank pin 736 through the first and second counter-weights 732a, 732b, connecting rod 734, as illustrated in FIG. 9. The second counter-weight 732b may be just a yoke for an outboard starter in case of a simulated full crank. The counter-weight assembly procedure may also include installing the piston pin 760 through the piston assembly 756 and the connecting rod 734 of the piston assembly 756. However, it is also possible to assemble the piston assembly 756 separately to the connecting rod 734 after the crankshaft has been installed. It is done by inserting the piston pin 760 through a hole placed in the cylinder block 20 as done in the case of some Briggs and Stratton engines. Alternatively, as illustrated in FIG. 11, the hole 760a in the cylinder block 20 for inserting the piston pin 760 may be located in the valve train chamber 88.

Referring to FIG. 7, step 1 of a method for assembling the full crankshaft 722 includes, with an inner bearing 741 already pressed into the bearing boss 721b, inserting the piston assembly 756 and the connecting rod 734 into the cylinder bore 12. Then aligning the first and second counter-weights 732a and 732b correctly with respect to the bearing bores 723a, 723b, and 723c. Referring to FIG. 8, step 2 of the method includes pressing the outboard crankshaft halves 722b into the counter-weight 732b while the counter-weight 732b is supported by the tools 2010a and 2010b. The tool 2010a passes loosely through the inner bearing 741. Referring to FIG. 9, step 3 of the method includes supporting the outboard crankshaft halves 722b with a special tool 2020a that passes around the outboard crankshaft halves 722b and through the bearing bore 723c in the outboard bearing boss 733a, supporting the first counter-weight 732a with a special tools 2020b, and pressing the inboard crankshaft halves 722a into the counter weight 32a. Referring to FIG. 9b, step 4 of the method includes pressing first and third oil seals 928a, 928b into the first and third bearing bores 723a and 723c.

It should be noted that the oil seal or oil seals may be used in conjunction with the bearings at any bearing bosses 21a, 21b and 731 as necessary depending on lubrication systems and breather systems. Step 5. Insert the outboard bearing 731 (or bearings for outboard starter) and oil seals 728a. The outboard bearing may either slide fit on the outboard crankshaft halves 722b and may be secured in place with the cir-clip.

Referring to FIGS. 9 and 9b, installation of the outboard crankshaft halves 722b in case of a half-crank with outboard starter will be a lot more easy since the yoke is not rigidly pressed onto the crank pin 736. In this case, the outboard bearing boss may be just top half integral with the cylinder block, while the lower half is part of the crankcase cover 44b as shown in FIG. 9C. However, the outer edge of the boss 735, shown in FIG. 9C is still integral with the cylinder block. This helps to improve sealing of crankcase cover 744 with the block 10.

FIG. 9b shows the assembled engine with a separate oil chamber 948b attached to the bottom of the crankcase cover 944a with a slot 964 for the slinger 934b on the connecting rod 934 to splash the oil. It may be noticed, that when the engine is turned upside down the oil does not poor down into the crankcase chamber 948a because of a separation wall 966. However, the bleed passage 952 allows a small amount of oil to drip onto the first and second counter-weights 932a, 932b so the piston assembly 756 gets lubricated and also some oil goes into the valve train chamber 88 for lubricating the valve train. It is possible to time the opening of the bleed passage 952 with the counter-weight 932a so that the bleed passage 952 is open when the piston assembly 756 moves upward causing negative pressure in crankcase chamber 948a and close it when the piston is in downward motion causing positive pressure in the crankcase chamber 948a. The oil condensed in the valve train chamber 88 and valve chamber 106 is returned to the crankcase chamber 948a or possibly directly back into the separate oil chamber 948b through a check valve 999 shown in FIG. 9b. It is also possible to drain the oil from the valve chamber 106 into the oil chamber through an additional return passage and check valve, particularly, when the engine is run upside down.

Figure 10:
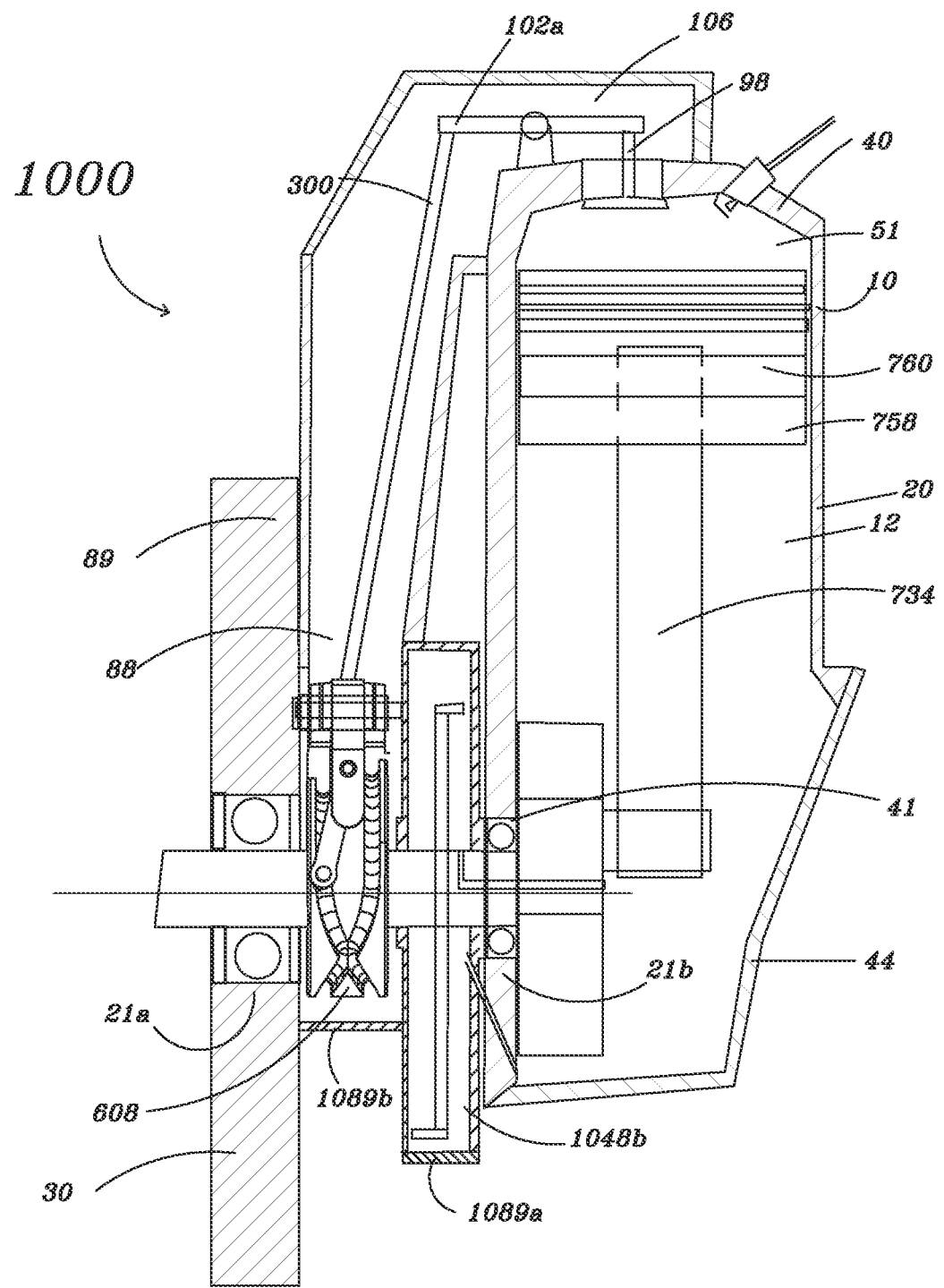
FIG. 10 is a cross-sectional side view illustration of another embodiment of the monoblock four stroke engine with a separate oil chamber with an oil slinger attached to the crankshaft.

In another embodiment of the engine illustrated in FIG. 10, the oil chamber 1048b may be a separate chamber similar to the dry sump lubrication system described in Honda's U.S. Pat. Nos. 5,947,075 and 6,021,766, etc. The disadvantage with Honda's design is that the crankcase consists of two separate halves that have to be machined first and the two pair have to stay together during production and is not a cost effective design. Secondly, as seen in those patents, the engine is a full crank engine. As illustrated in FIG. 10, the oil chamber 1048a can be molded such that the entire chamber is an integral part of the cylinder block 1000 as shown in FIG. 10. The casting, machining and assembly are much simpler. The bottom of the oil chamber is easily plugged with a cover 1089a.

Figure 11B:
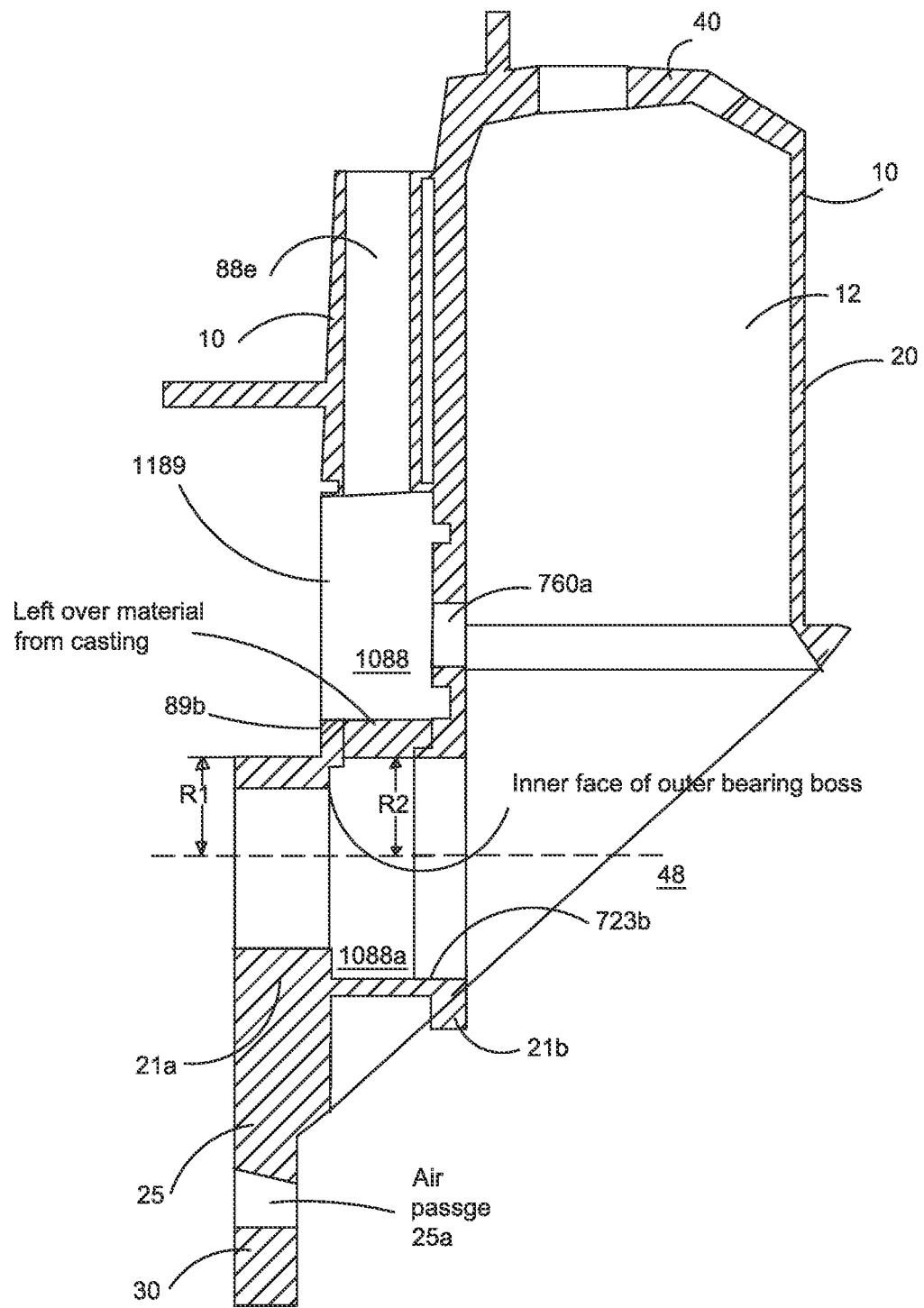
FIG. 11b is a cross-sectional view illustration of a monoblock having separate cam cover shown in FIG. 11, but prior to machining left over material between cam and crank gear chambers.
Figure 11C:
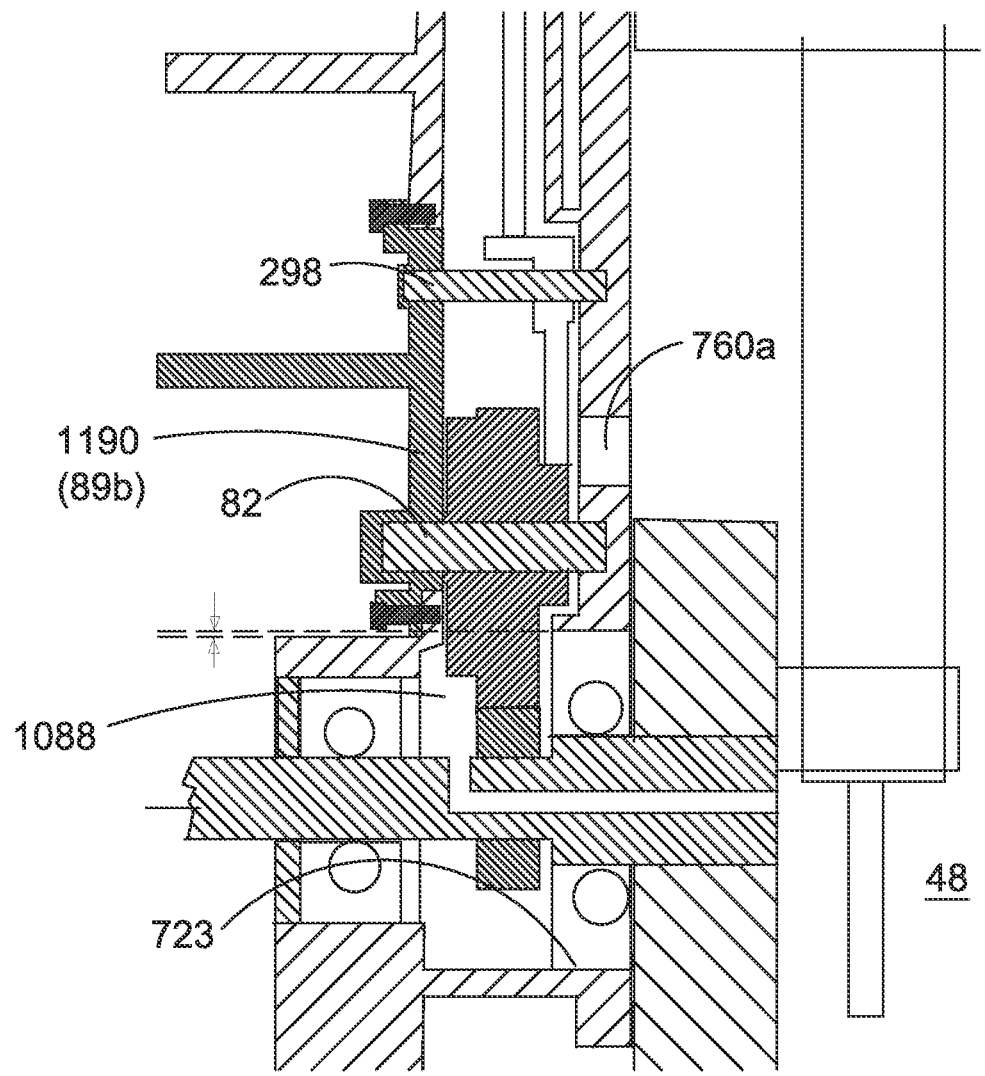
FIG. 11c is an enlarged cross-sectional view illustration of a mono-block having separate cam cover shown in FIG. 11.

FIGS. 11, 11b, and 11c illustrate the second bearing bore 723b as being bored all the way till to the inside of the outer bearing (or oil seal). When the wall thickness of the outer bearing boss is less than the OD of the inner bearing bore, a pocket will be formed above a valve train chamber 1088. In this case, the lower end of the valve train chamber 1088 is closed and there is no need for any kind of plug. However, the front face 1189 of the valve train chamber 1088 has to be cored out from the front for inserting the cam gear and followers. This calls for a separate cam cover 1190 as illustrated in FIG. 11C.

FIGS. 12 and 12b illustrate another embodiment of the engine 1200 having a wet belt drive, similar to the Honda described in the prior art. An overhead cam pulley 1282 running at half the engine speed is driven by a timing belt 1284 and a crank pulley 1286 on the crankshaft 1222. The crank pulley 1286 may be either in a separate chamber 1288 adjacent to the oil chamber 1248b with an oil seal between the two chambers or the valve train and oil chambers 1288 and 1248b may be commonly cored out from the bottom. The slingers 1234b is attached to the crankshaft 1222. There may be more than one pair of slingers. A belt drive passage 1288e is cored out from bottom as well as top of the cylinder block 1210. The follower 102b and rocker 102a shown in FIG. 12 are only for representation of the valve train. It is well known how to operate the intake valve 98 and exhaust valve with the overhead cam 1208. FIG. 12b illustrates a lubricating oil pump 1505 attached to the cylinder block 30 and is driven by the crankshaft 1222 through a worm gear 1502 and a gear 1503. The pump may also be driven off the crank gear 122 through reduction gear in the oil pump. The pump 1505 has an inlet 1507 to receive oil from an oil reservoir and an outlet 1509 to deliver oil to the intake passage 126a as shown in FIG. 14d or into the crankcase chamber 48.

Figure 12C:
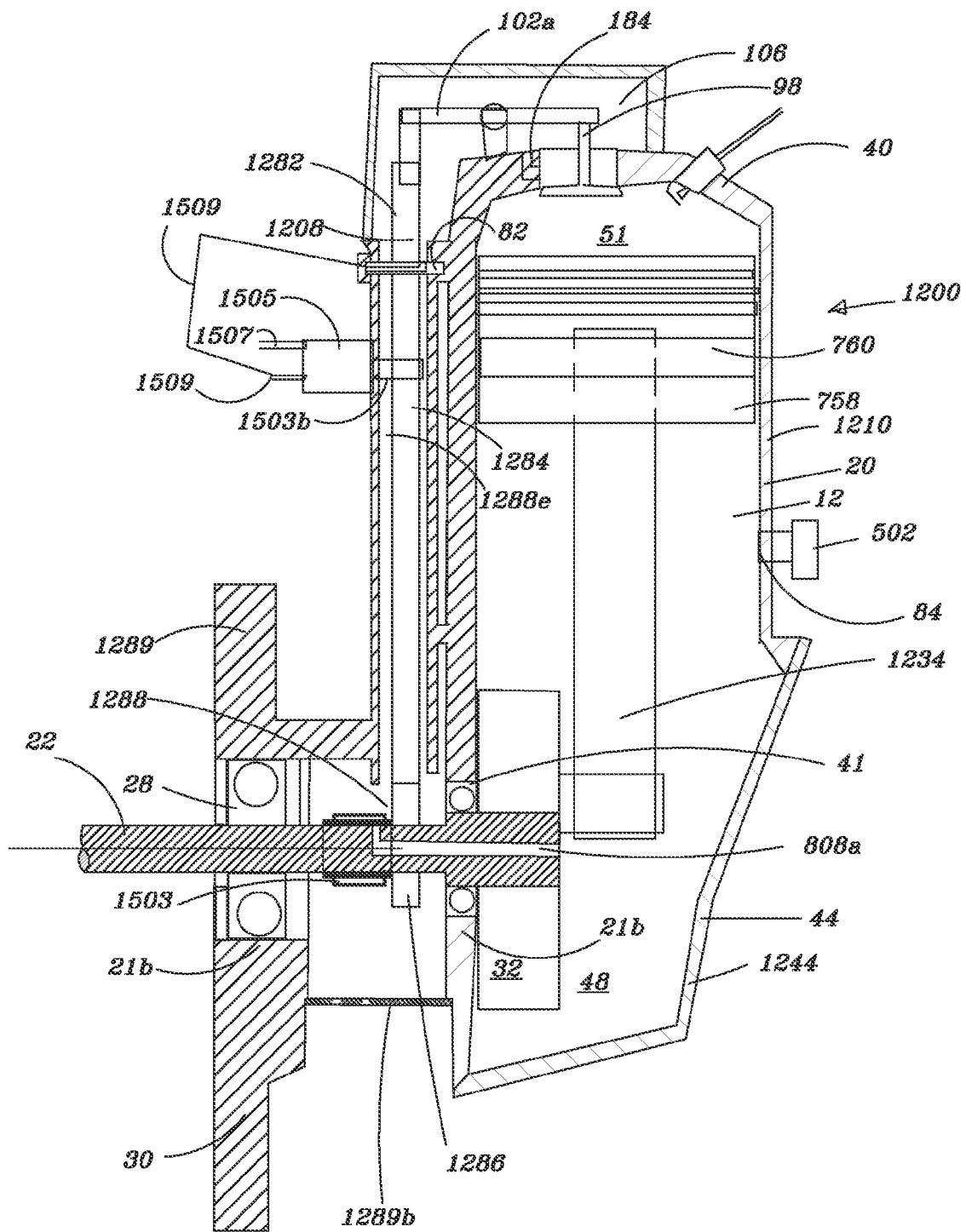
FIG. 12c is a cross sectional side view illustration of a belt driven over head cam mono-block engine with belt drivel oil pump.

FIG. 12c illustrates an oil pump 1505 driven by the belt 1284 driving the overhead cam gear 1282. IN the embodiment disclosed here, the oil pump 1505 mounted on the monoblock 1210 is driven by the toothed belt 1284 at a desired gear ratio. As described earlier the oil pump has an inlet 1507 from a oil tank and an outlet 1509 to mix with the first fraction of air in the passage with oil or directly injected into a passage/hole at the center of the camshaft 82 which communicates with the cam chamber 48 through chamber 88.

Figure 13:
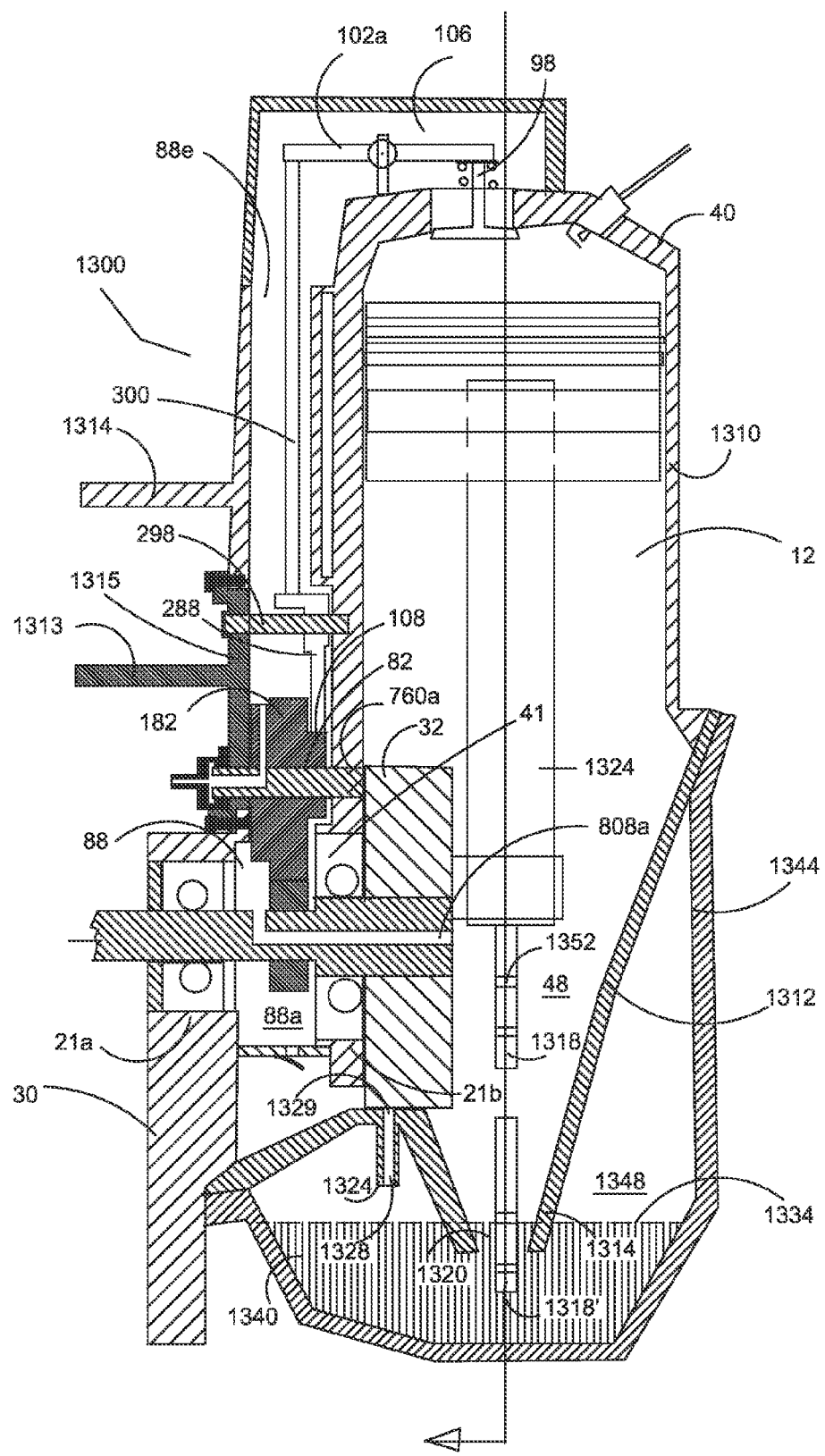
FIG. 13 is a cross-sectional side view illustration of a half-crank embodiment of the monoblock four stroke engine illustrated in FIG. 9b with another embodiment of a wall separating the crankcase chamber and oil sump
Figure 13B:
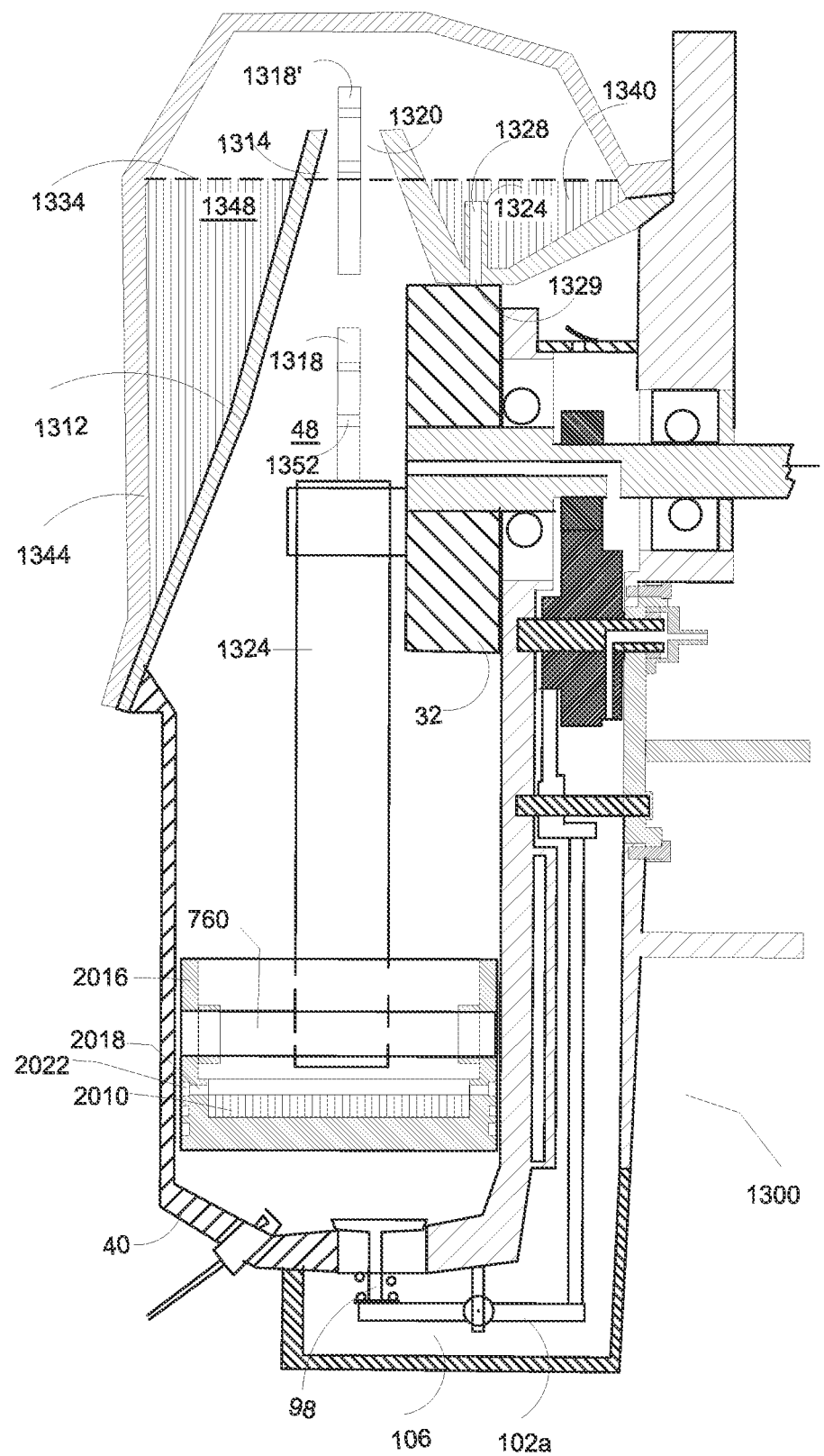
FIG. 13b is a cross-sectional side view illustration of the engine illustrated in FIG. 13 with cylinder head in down attitude.
Figure 13C:
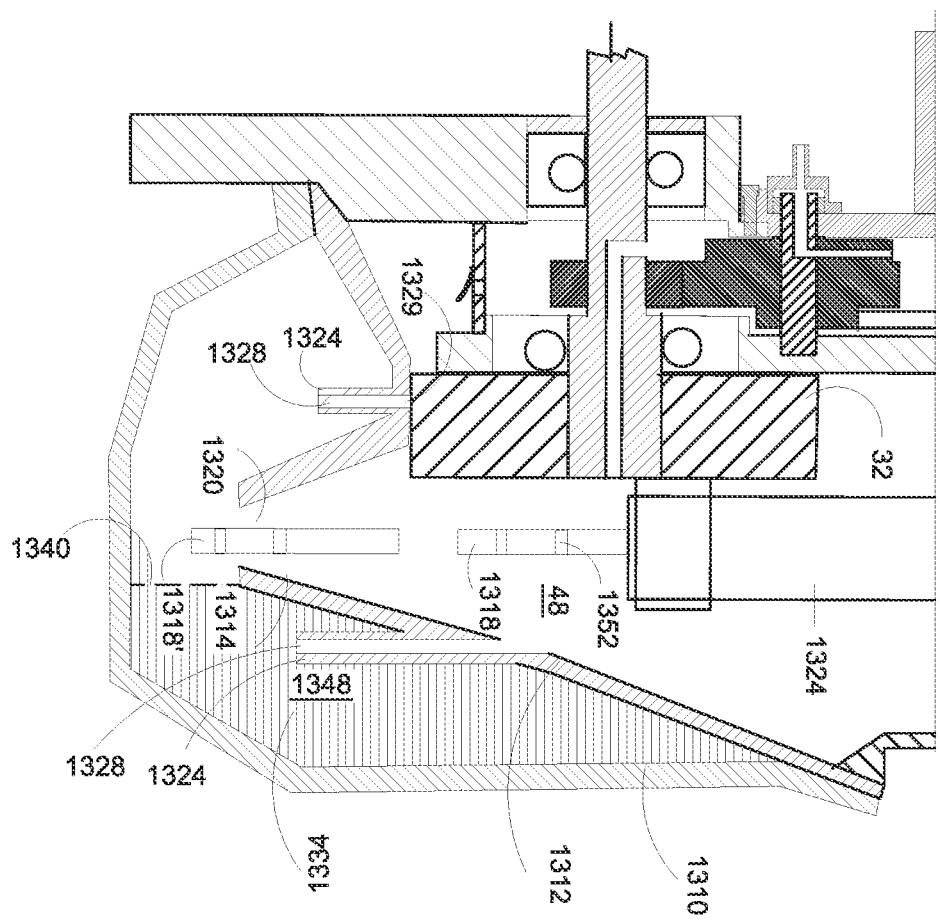
FIG. 13c is a cross-sectional side view illustration of the engine illustrated in FIG. 13 with cylinder head in sideways attitude.

FIGS. 13, 13b, and 13c illustrate an alternative embodiment of the half-crank engine illustrated in FIG. 9b, which prevents oil from getting into the cylinder head 40 when engine 1300 is upside down or sideways. A slinger 1318 is inside a tube 1320 protruding into the oil sump 1348 which is disposed between a crankcase cover 1312 and a wall 1314 (1344?) separating the crankcase chamber 48 and the oil sump 1348. As the connecting rod slinger 1318 moves, the oil in the oil sump is splashed into the inside of the crankcase chamber 48 so that the oil hits the cylinder wall 12a, and moving parts such that they are all lubricated. The oil droplets (or mist) is also carried to lubricate the valve train, consisting of cam 1208, cam gear 1282, followers 102a (rockers, etc.), The oil mist or droplets may be carried into the cam chamber 1288 and the valve chamber 106 through a passage 808a in the crankshaft or through bearing passages. An oil level 1334 is illustrated in FIG. 13 when the engine 1300 is in an upright position. When the engine is turned sideways or upside down, as illustrated in FIG. 13b, the oil in the oil sump does not spill into the cylinder bore or crankcase chamber, instead oil may drip into the crankcase chamber 48 through oil passage(s) 1328 in a standoff tube 1324. There may be more than one such standoff tube, such that the engine is lubricated in all attitudes. Elements 1352 are serrations on the slinger or scoops like (or any similar) to help splash oil into the crankcase chamber 48. The oil supply passages to the cylinder head and returns may be located in the crankcase chamber such that excessive oil does not get to the head.

Figure 14:
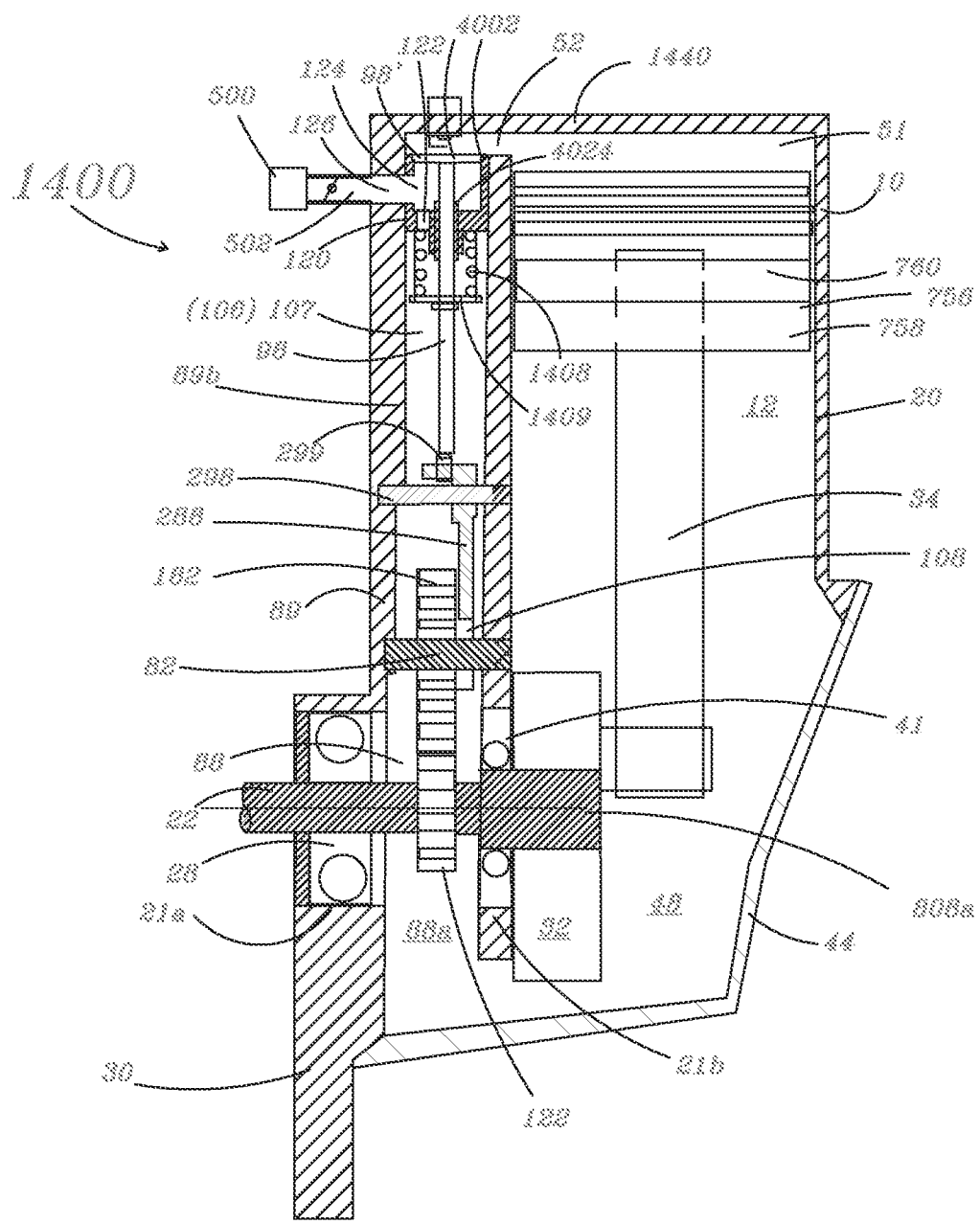
FIG. 14 is a cross-sectional side view illustration of an exemplary embodiment of a half-crank mono-block four-stroke engine with a L-head and a valve train.
Figure 14B:
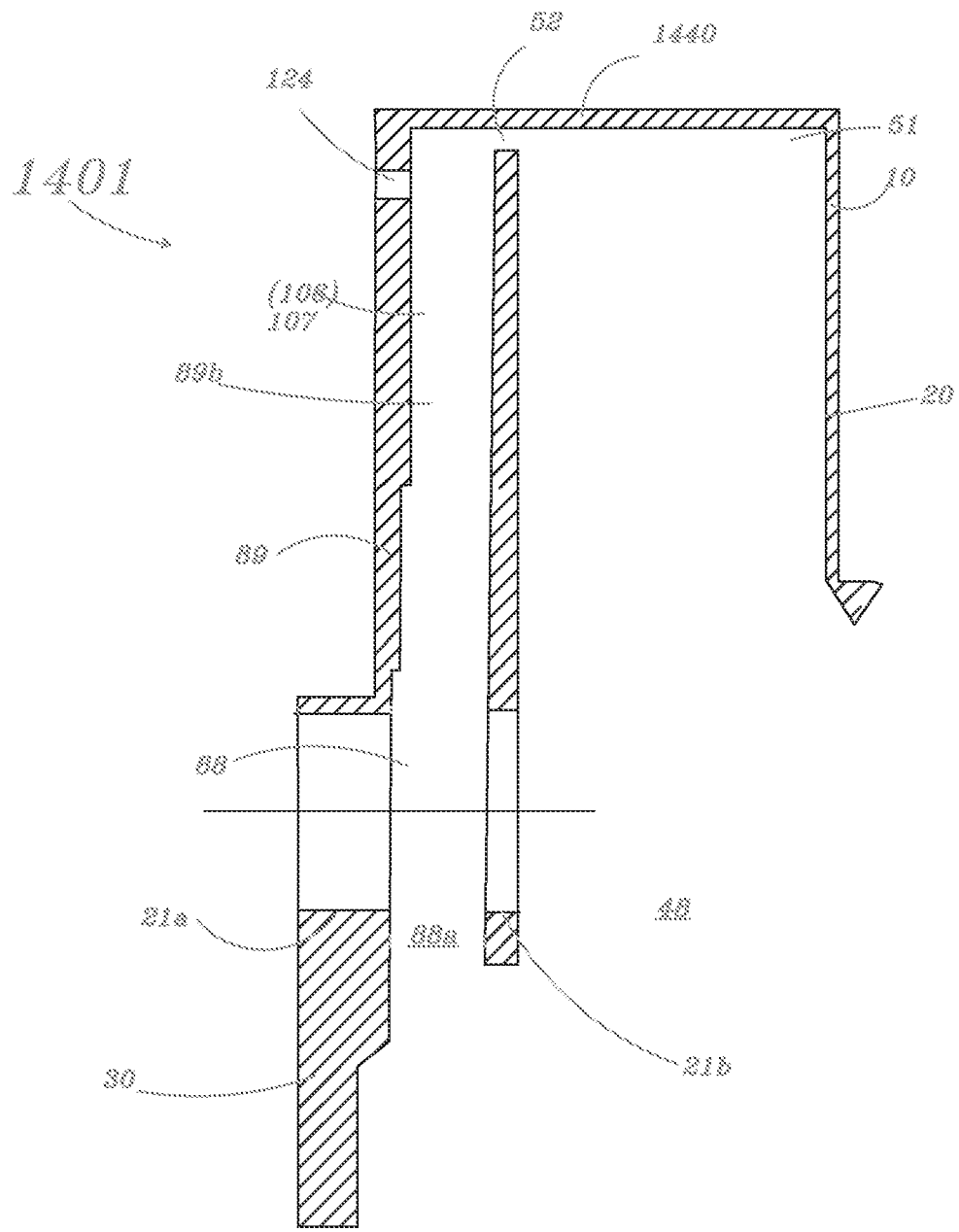
FIG. 14b is a cross-sectional side view illustration of a mono-block having integrally cast cylinder block, crankcase, cylinder head, outer and inner bearing bosses in the engine illustrated in FIG. 14.
Figure 14C:
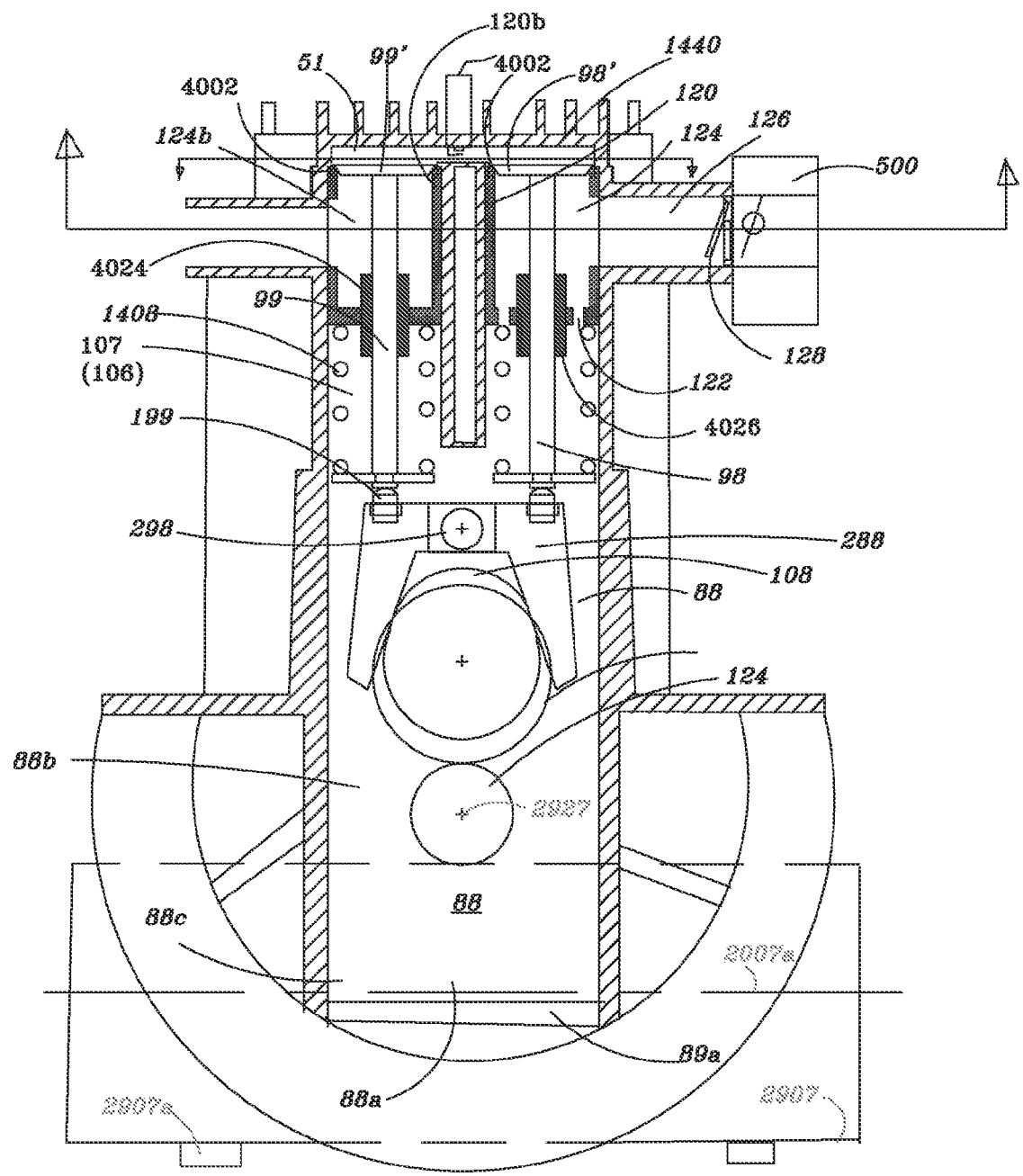
FIG. 14c is a cross-sectional front view illustration of another embodiment of a mono-block having integrally cast cylinder block, crankcase, cylinder head, outer and inner bearing bosses, valve assembly on the side of the cylinder block in the engine illustrated in FIG. 14, and an intake system with one way valve in the intake passage.
Figure 14D:
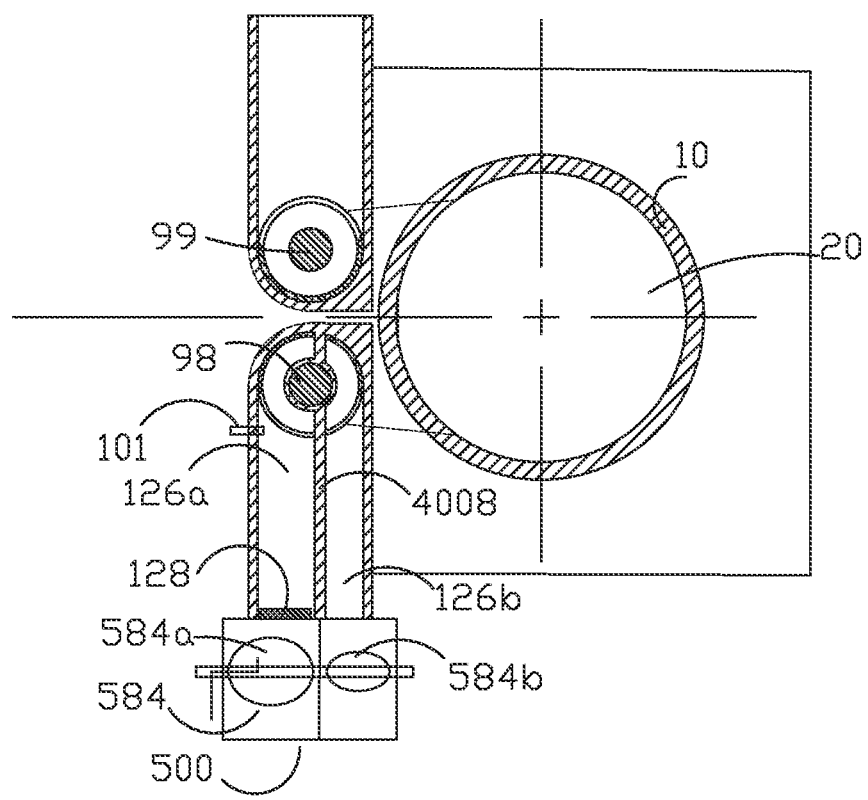
FIG. 14d is a cross-sectional top view illustration of another embodiment of an engine with a divided intake system with one way valve in one intake passage and oil injection into said passage.

FIGS. 14, 14b, 14c, 14d, and 14e illustrate another embodiment of the engine 1400 having an integral L head monoblock 10 including an integral (one piece) cylinder block 20 and crankcase 30. FIG. 14f illustrate engine similar to FIG. 14 with a LPG tank 2007 at the bottom and FIG. 14g is similar to engine 14, but the engine is upside down with LPG Tank 2007 at the top. A cylinder bore 12 is disposed within the cylinder block 20 and a valve train chamber 88 is disposed between the cylinder block 20 and an outboard wall 89 integrally cast with the cylinder block 20 as part of the mono-block 10. The integral casting of the monoblock 10 is illustrated in FIG. 14b. A valve chamber 106 (107), the valve train chamber 88, and the crankcase chamber 48 are all interconnected through passages and disposed between the cylinder block 20 and at the bottom of the chamber 88 and the passage at the top of the combustion chamber 51. The chamber 88 and valve chamber 106 (107) are substantially in line with each other. And valve chamber 106 (107) is substantially inline with the axis of the cylinder.

The valve chamber 106 (107) has a valve assembly 120 (for intake) (and 120b for exhaust valve) that includes a valve seat 4002 and a valve guide 4024 (for intake and 4026 for exhaust), valve spring 1408, and valve retainer 1409 and is tightly attached to the mono-block 10 in the passage 107? between the cam chamber 88 and the combustion chamber 51, to form a leak proof combustion chamber 51. The valve assembly may be a modular piece where valve seat 4002, valve guide 4024, valve spring 1408, and valve retainer 1409 are all assembled separately prior to attaching to the monoblock 10. The valve assembly 120 has an opening 124 to the ambient through an inlet port 126 connecting a carburetor 500 (fuel-air mixer). The valve assembly 120 can have an opening 122 connecting the carburetor 500 to the crankcase chamber 48 where the air-fuel mixture is mixed with lubricant oil. A passage 502 connecting the carburetor 500 and the crankcase chamber 48 may have a one way valve 128 (shown in FIG. 14c) to prevent the charge from flowing back into the ambient when the piston is moving downward.

FIGS. 14f and 14g show where the crankcase cover 44 is formed to match the curvature R of the fuel tank 2007 at fractional section 44b of the crankcase cover 44. The radius of curvature R is such that it provides enough clearance for the connecting rod 734 and crank pin 738 to freely rotate without interference. Secondly the center line 2007a of the fuel tank 2007 is below the axis 2927 of the crankshaft 22 and the center line 2007a is offset from the axis 12a of the cylinder 12 when the fuel tank 2007 is located at the bottom of the engine as shown in FIG. 14f. When the attitude of the cylinder block 20 is such that crankcase chamber 48 is above the center line 2927 of the crankshaft 22 the fuel tank 2007 is located at the top of the crankcase cover 44. The LPG tank may also be located vertically in line with the axis 12a of the cylinder 12. The advantage is a smaller package. Also, the oil tank 3008 containing oil 3010 to lubricate the engine may be attached to the fuel tank and above the center line 2007a of the fuel tank. The fuel tank 2007 is inside a frame 2907 which may be attached to the crankcase cover 44 or cylinder block 20 OR element 30. When the fuel tank 2007 is at the bottom, the frame 2907 has a leg 2907a for the engine block 20 to rest on the floor. However, when the fuel tank 2007 is above the center line, the oil chamber 3010 is used to supply oil to the oil pump for injecting oil into the intake system.

By definition charge means mixture of fuel and air and pre-mixed fuel or charge means fuel pre-mixed with oil. First fraction of charge means first fraction of the air and first fraction of fuel (could be pre-mixed fuel) and second fraction of charge means second fraction of air mixed with second fraction of fuel (could be pre-mixed). The fuel may be any liquid or gaseous fuel, including propane.

Figure 14E:
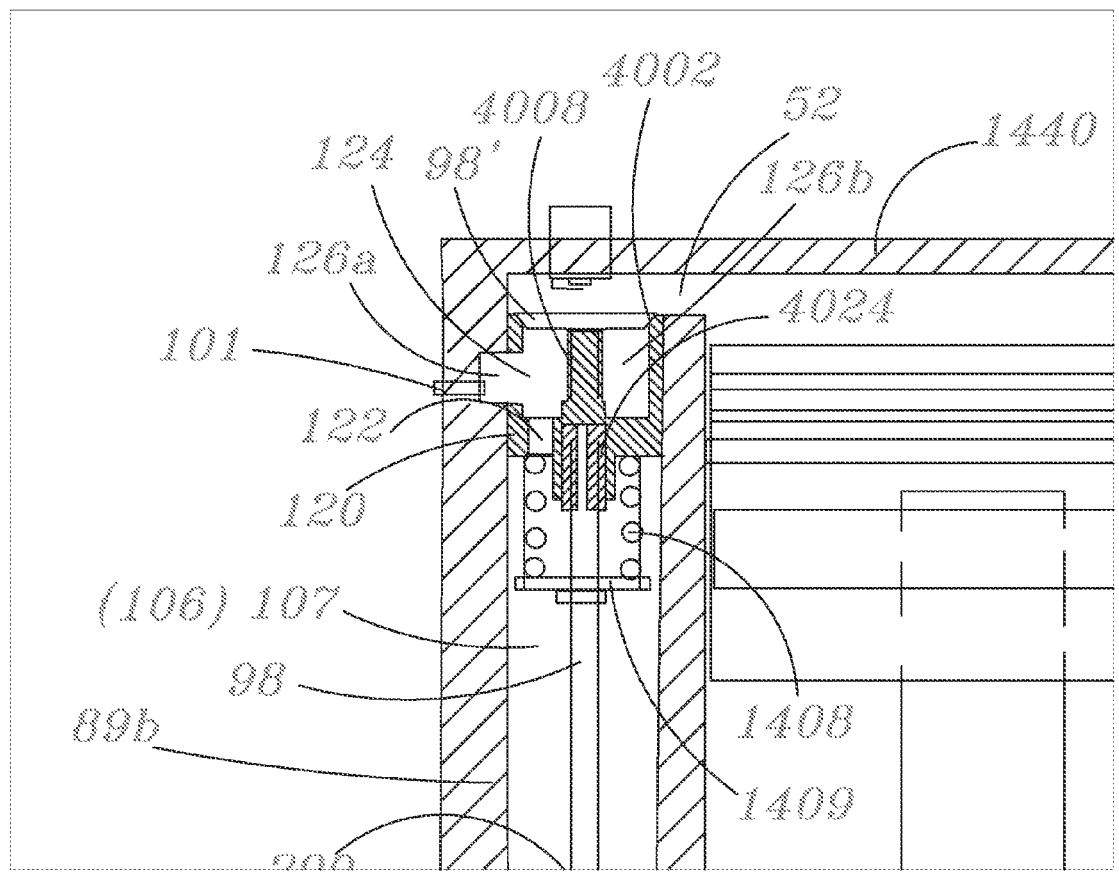
FIG. 14e is an enlarged cross-sectional view illustration of engine illustrated in FIG. 14d showing partition on intake system at the intake.
Figure 14F:
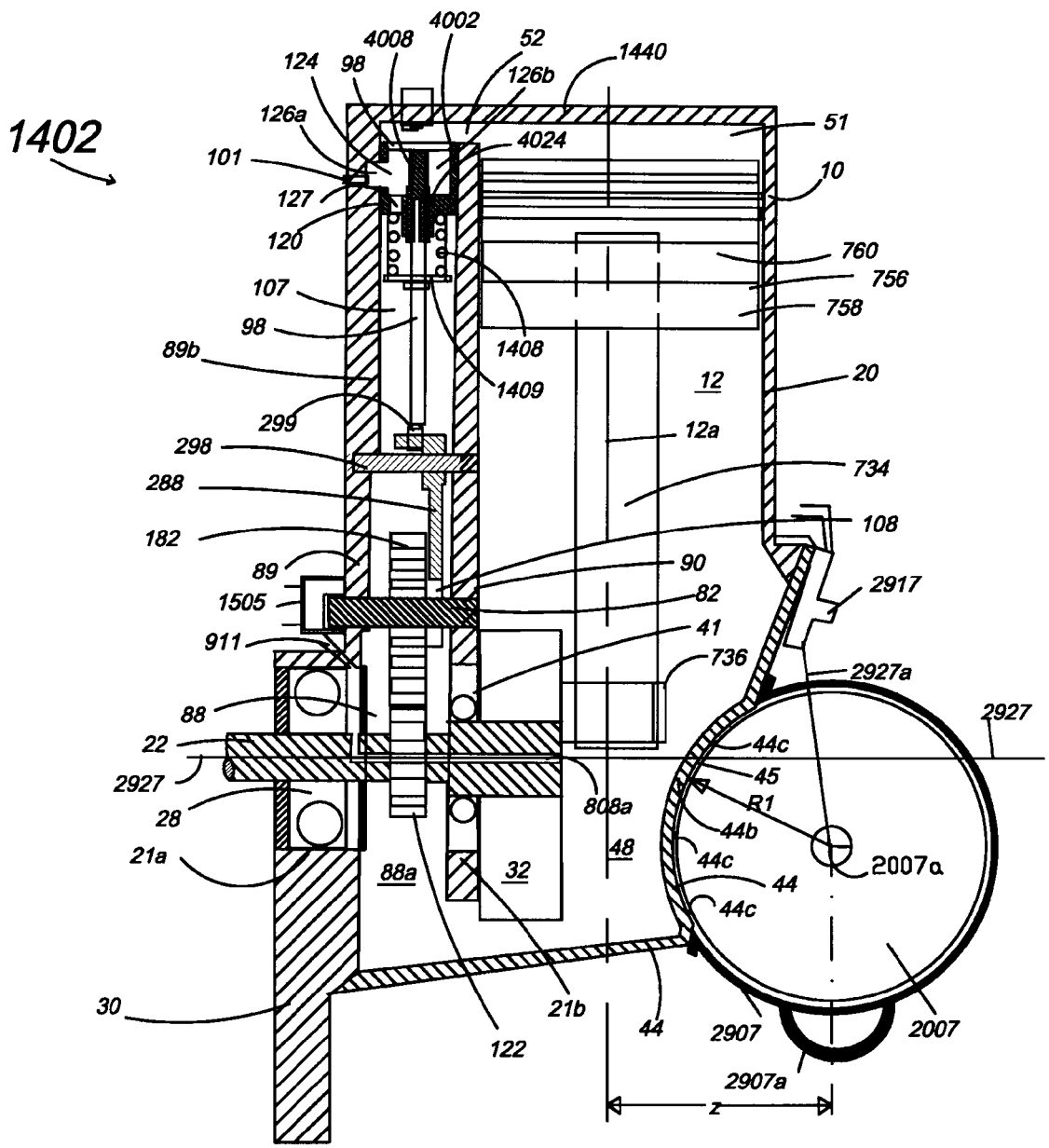
FIG. 14f is a cross-sectional side view illustration of an exemplary embodiment of a four-stroke engine with a L-head and a valve train with LPG fuel tank at the bottom.
Figure 14G:
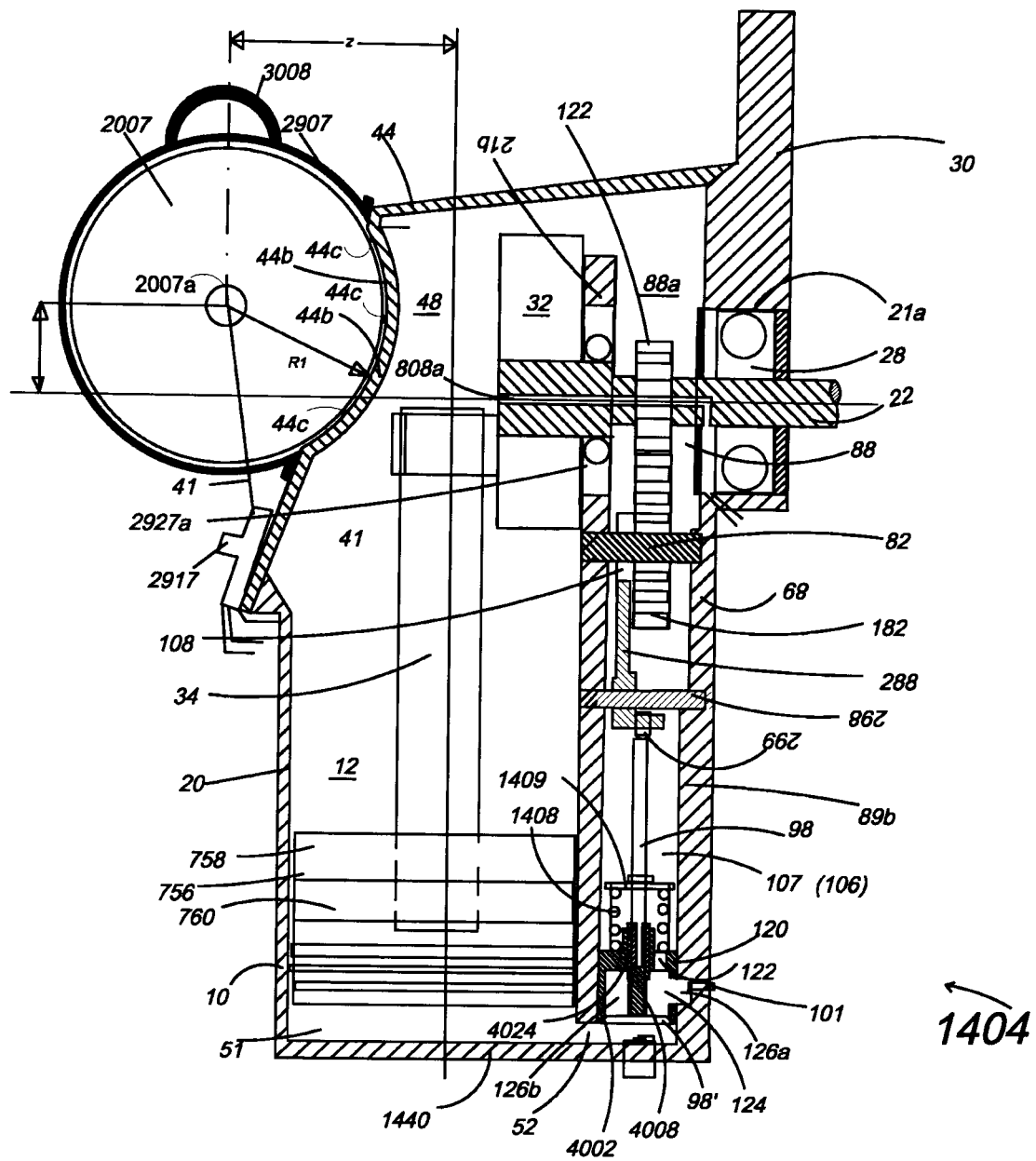
FIG. 14g is a cross-sectional side view illustration of an exemplary embodiment of a half-crank mono-block four-stroke engine with a L-head and a valve train with LPG fuel tank on the top.

In an another embodiment shown in FIGS. 14c, 14d, and 14e the intake valve assembly 120 may have dual inlet passages; 126b that connects carburetor 500 directly to the cylinder 12 (combustion chamber 51) during the intake process, and the passage 126a that connects carburetor to the crankcase chamber 48. A partition wall 4008 runs all the way across the intake passage separating the flow all the way from the carburetor 500 to the valve 98 and across to minimize short circuit of the two mixtures until just before they enter the cylinder 12. A fraction of the charge 25% to 75% goes into the crankcase chamber 48 through the passage 126a (or may have separate passage, not shown) when the piston is moving upward during compression and exhaust strokes when the piston is moving toward the combustion chamber 51. The passage 126b is connected from the carburetor 500 to the cylinder 12 when the intake valve 98 is open during intake stroke. The fraction of the pre-mixed charge going into the crankcase chamber 48 is to lubricate the engine parts (internal parts), particularly the valve train and parts in the crankcase chamber 48. It is also possible to inject lubricating oil separately into the passage 126a at 101 when the fuel is not pre-mixed with oil. In which case rich charge free of oil goes into the combustion chamber 51 and oil mixed charge (or oil mixed with just air) goes into the crankcase chamber 48. Amount of charge is controlled by the carburetor valve 584 and may have separate valves 584a and 584b to regulate the mass flow into passages 126a and 126b respectively. When oil is injected into the passage 126a, only air may be inducted through the passage 126a. Essentially the divided intake passage 126 may have either only air going into crankcase chamber 48 through passage 126a when oil is injected into the air stream to lubricate the parts; or may have air-fuel mixture when oil is pre-mixed with the fuel, OR may have lean air-fuel mixture free of oil when oil is injected into the lean mixture in passage 126a, while rich mixture flows through the passage 126b OR the mixture may be of uniform air-fuel ratio going through both the passages 126a and 126b. Also, when only air passes through passage 126a, fuel supplied through 126b may be a propane fuel or any gaseous fuel, such as compressed natural gas, bio gas, etc. The advantage of injecting oil into air inducted into crankcase chamber is that the fuel either liquid form as in the case of gasoline or gaseous as in the case of propane can flow directly into the combustion chamber during the intake process, while oil injected into air lubricates the valve train (cam gear, crank gear, followers, valves, cam lobe, etc) and bearings in the crankcase chamber 48. Another advantage is that the engine can be operated in many attitudes as there is no oil in the crankcase chamber that would flow into the cylinder when engine is operated upside down. The dual intake system where passage 126 is divided into two separate passages 126a and 126b may also be applied to overhead valve chamber 106 shown in FIG. 1, but with a passage 126a connecting the valve chamber 106 and only air entering the valve chamber 106 and crank chamber 48, with oil injected for lubricating the valve train and parts in the crankcase chamber 48.

During the compression stroke when the piston assembly 756 travels upward, the intake valve 98 is closed and the crankcase chamber 48 experiences negative pressure and the charge (oil mixed charge) is inducted into the crankcase chamber 48 from the carburetor 500 through the passage 126a, the port 122, the chamber 88. The one way valve 128 opens due to differential pressure cross the one way valve (typically a reed valve is used). When the piston moves downward during power stroke and expansion stroke, the crankcase pressure is built up.

During the intake stroke, the intake valve 98 opens and the charge from the crankcase chamber 48 enters the combustion chamber 51. At the same time, the rich charge enters the combustion chamber 51 directly from the carburetor 500 through the passage 126b.

The concept of dual passage (lean charge going into crankcase chamber 48 and rich charge going directly into combustion chamber is applicable to all Four-stroke engines.

Figure 5B:
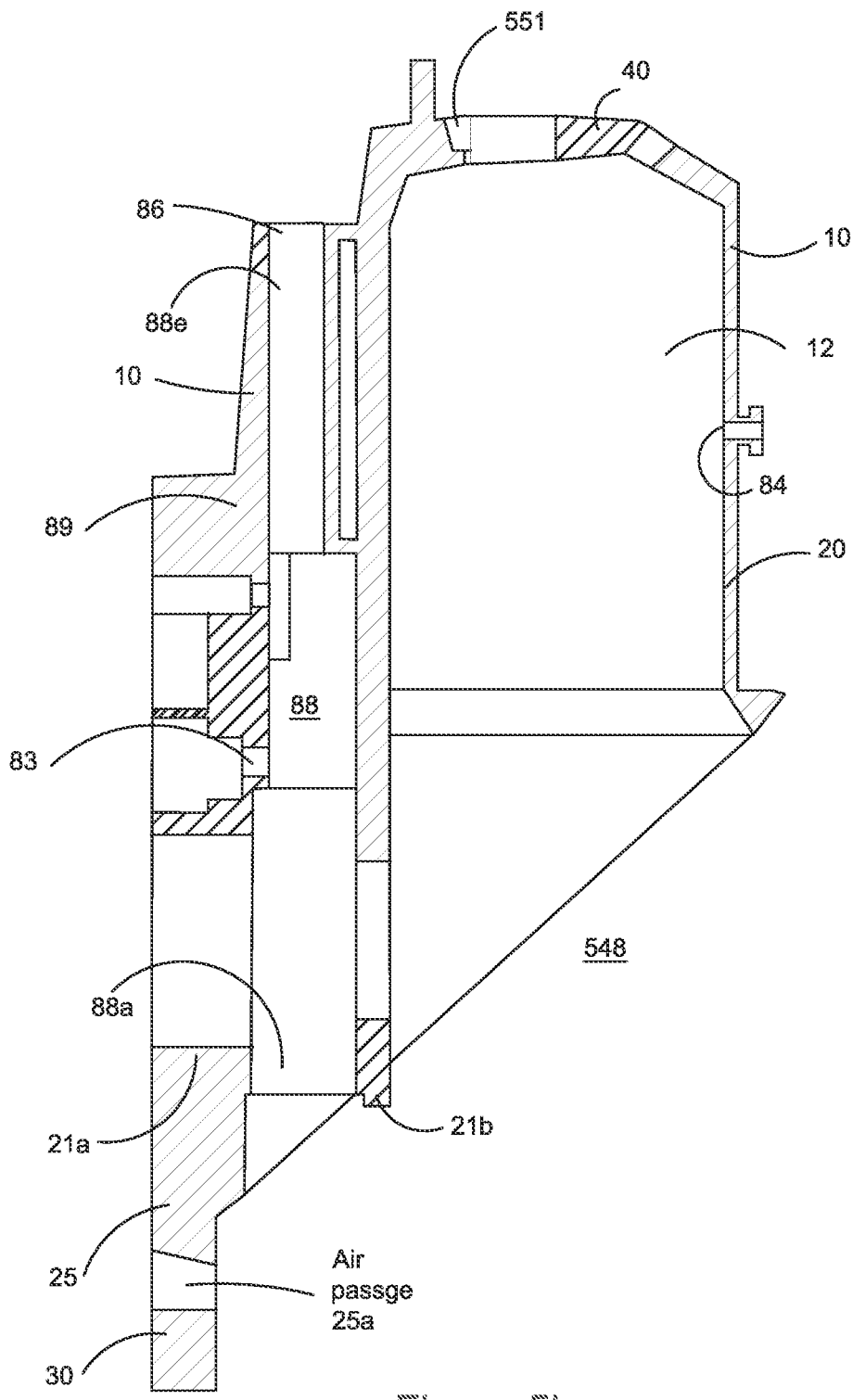
FIG. 5b is a cross-sectional side view illustration of a mono-block having integrally cast cylinder block, crankcase, cylinder head, outer and inner bearing bosses and carburetor port in the engine illustrated in FIG. 5.
Figure 5C:
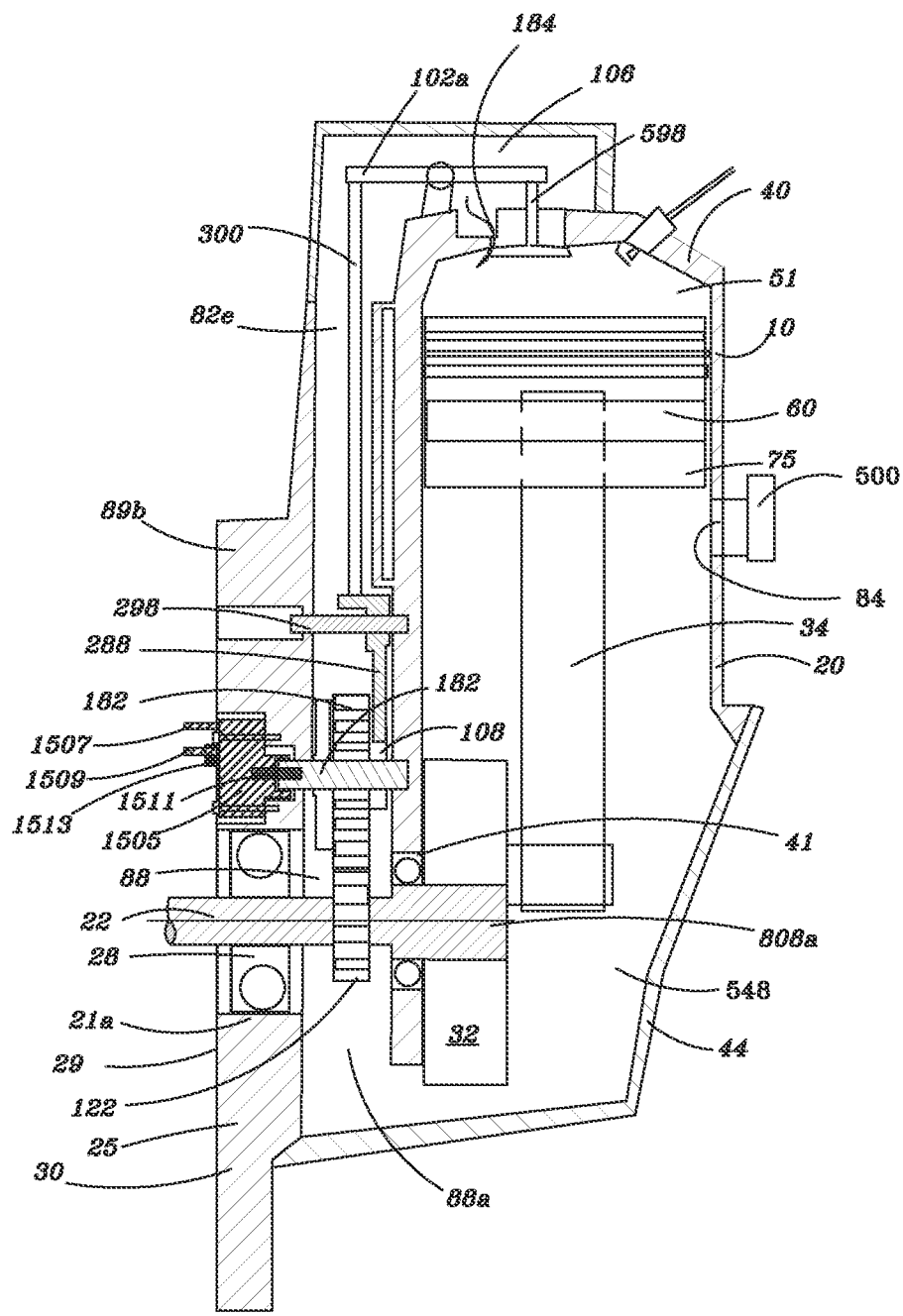
FIG. 5c is a cross-sectional side view illustration of another exemplary embodiment of a half-crank mono-block four-stroke engine with a camshaft driven oil pump for injecting oil to lubricate parts.

The oil pump may be driven by the crankshaft 22 as shown in FIG. 12b or by the camshaft 82 as shown in FIG. 5b. The pump may also be driven by the crankshaft 722b, shown in FIG. 9b (and FIG. 9) where the pump is mounted outboard.

Fuel used in the oil injected engine may be propane gas commonly known as LPG (liquefied petroleum gas or compressed gaseous fuel.

The U.S. Pat. No. 6,199,532 discloses engine where intake passage is not divided into separate passages and the fuel is pre-mixed with oil and the valve chamber is substantially spaced above the combustion chamber.

Figure 15:
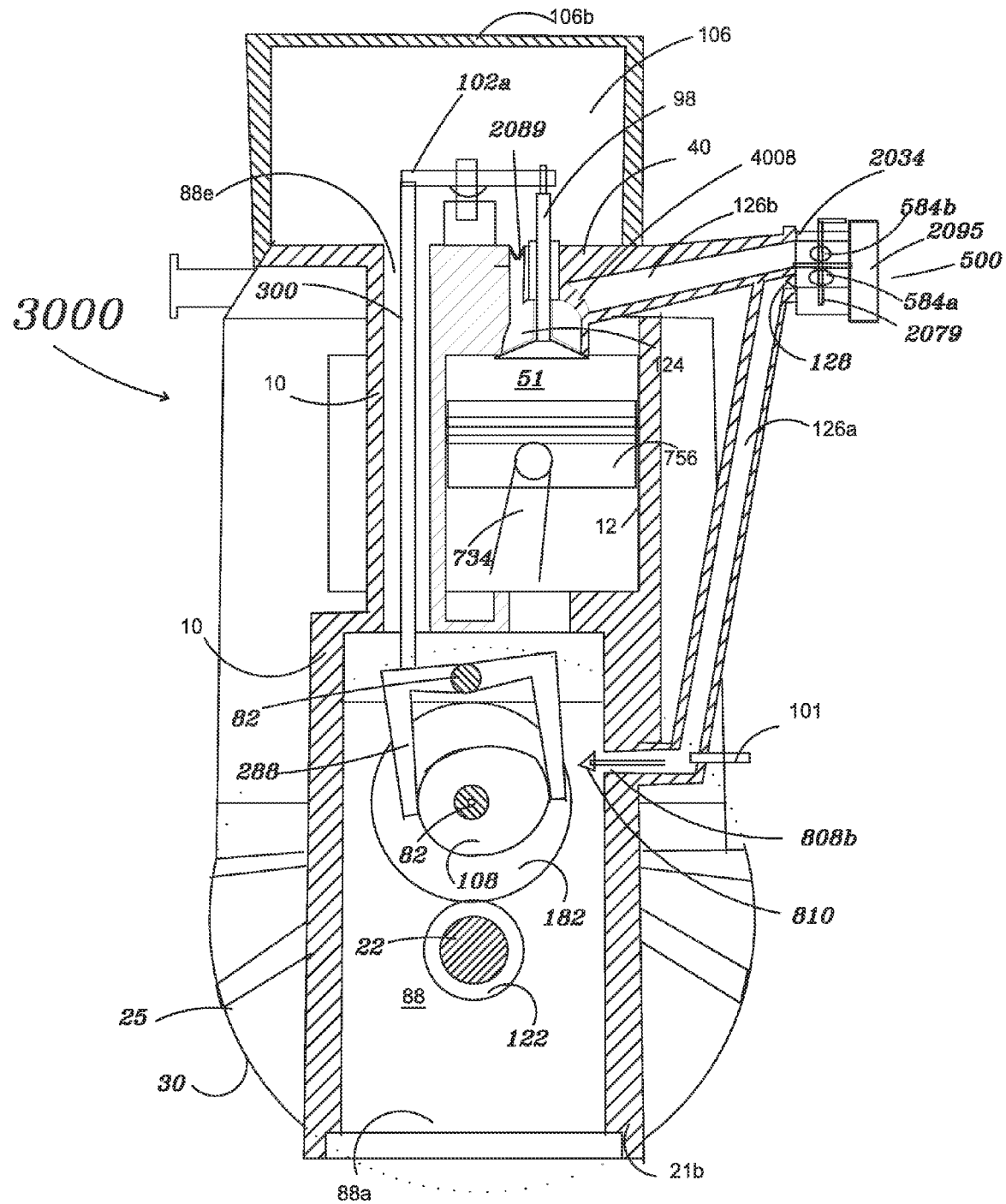
FIG. 15 is a front cross sectional view of an embodiment with divided intake port in a dual intake system.
Figure 16:
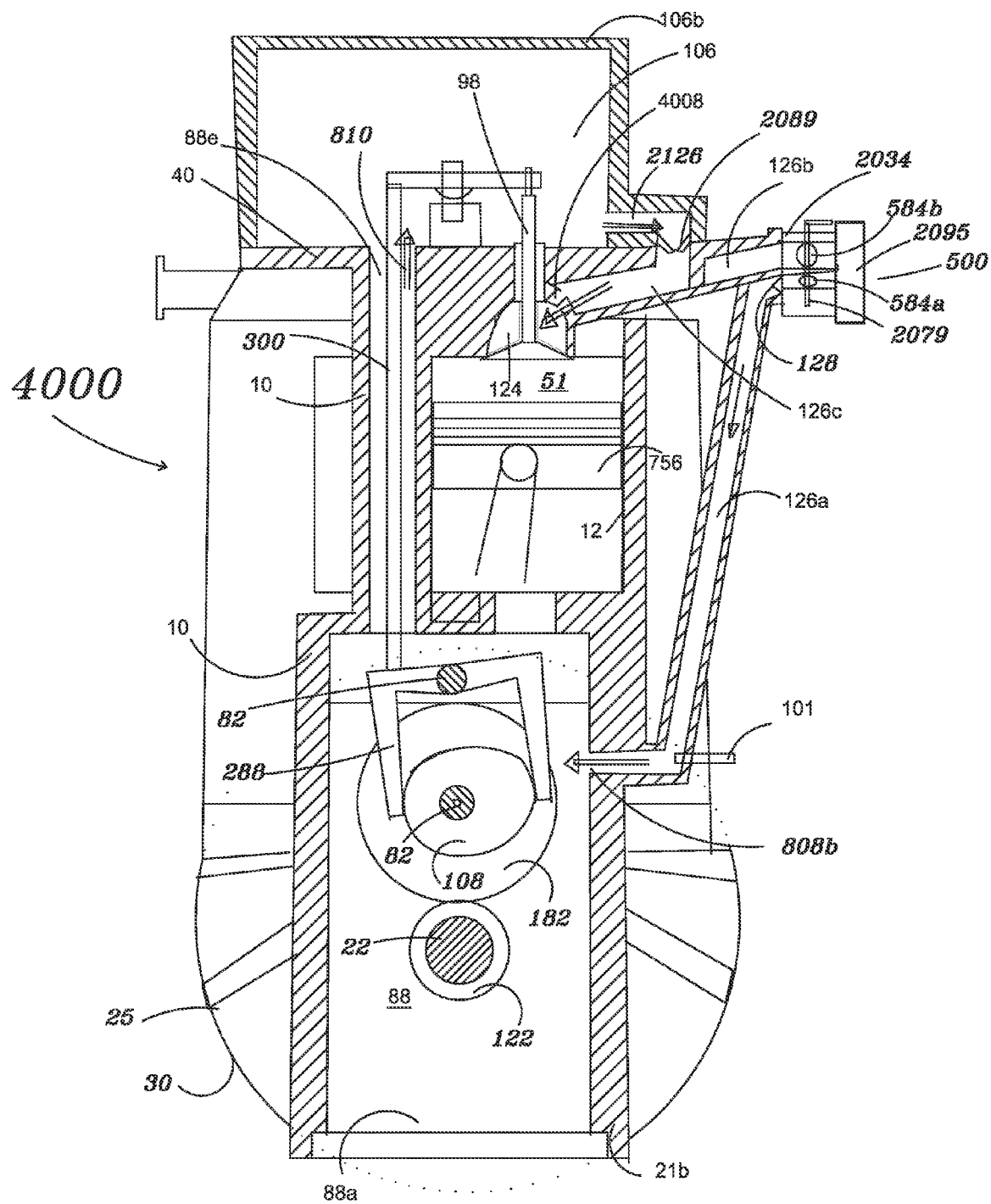
FIG. 16 is a front cross sectional view of an embodiment with divided intake port in a dual intake system showing flow of first fraction of charge and passage external to valve chamber.
Figure 17:
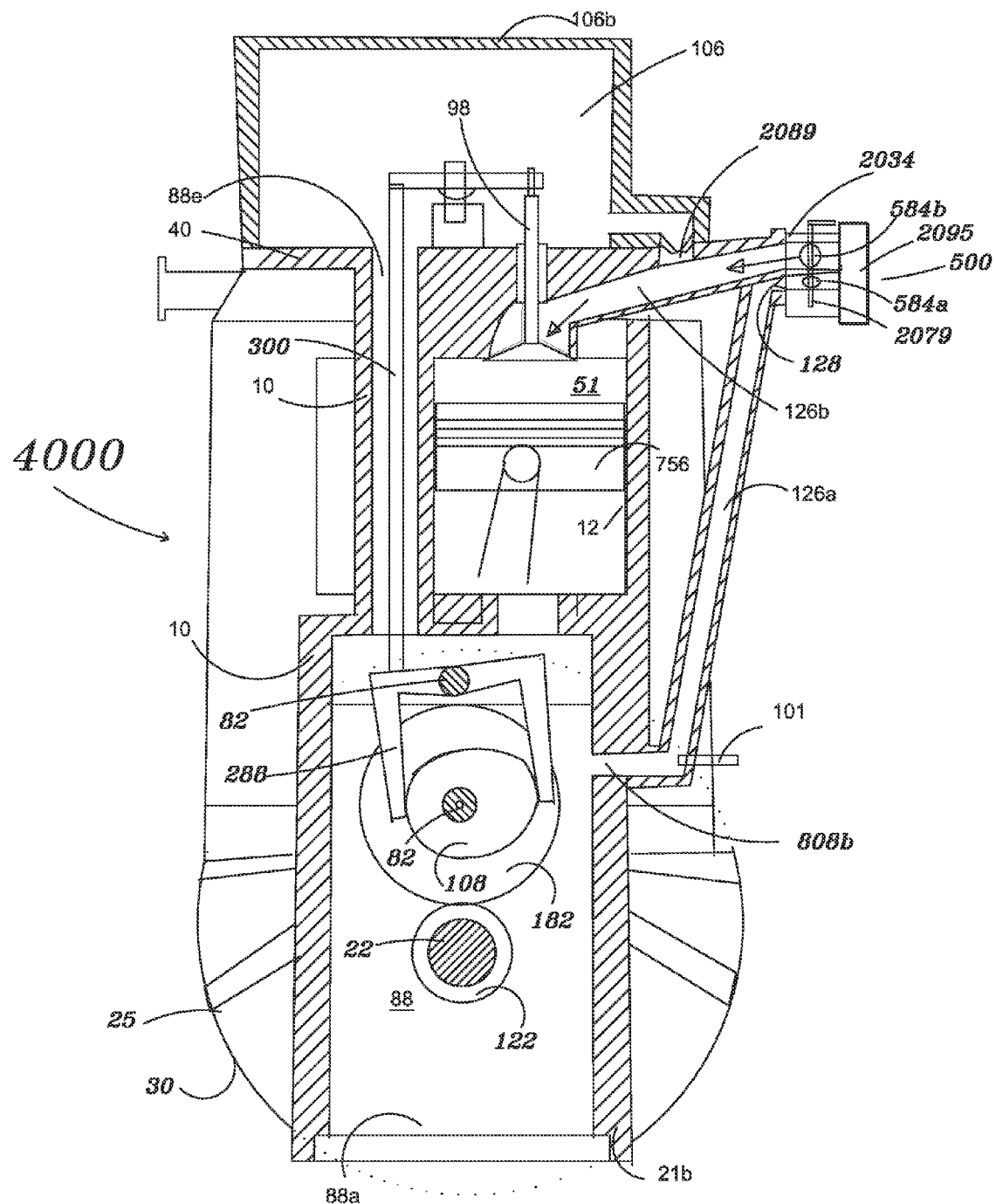
FIG. 17 is a front cross sectional view of an embodiment with divided intake port in a dual intake system showing flow of second fraction of charge.

In another embodiment shown in FIGS. 15, 16, 17, and 18 the engines 3000, 4000, and 2000 have the valves above the combustion chamber 50, commonly known as over head valves (OHV). In FIGS. 15, 16, and 17 the intake passages from the carburetor 500 is divided into two separate passages 126a and 126b. The passage 126a may carry first fraction of charge 810 consisting of first fraction of air and pre-mixed fuel into the crankcase chamber 48 through a port 808 in the block. The first fraction of air may be free of any pre-mixed fuel, in which case oil is injected into the first fraction of air by an injector 101, which may be just an orifice connected to either a separate pump as shown in FIGS. 5c and 12b or an oil reservoir. The first fraction of air carrying the oil enters the crankcase chamber to lubricate the internal parts and return to the combustion chamber during intake process as explained above for FIG. 14. The second fraction of the charge 812 which consists of second fraction of air and either fuel only or pre-mixed fuel as the case may be enters the combustion chamber 51 through intake passage 126b. A partition wall 4008 runs all the way across the intake passage separating the flow all the way from the carburetor 500 to the valve 98 and across to minimize short circuit of the two mixtures until just before they enter the cylinder 12. The first fraction of the charge (or air free of fuel) 25% to 75% goes into the crankcase chamber 48 through the passage 126a as shown in FIGS. 15, 16, and 17 when the piston is moving upward during compression and exhaust strokes when the piston is moving toward the combustion chamber 51. The passage 126b is connected from the carburetor 500 to the cylinder 12 when the intake valve 98 is open during intake stroke. The fraction of the charge going into the crankcase chamber 48 is to lubricate the engine parts, particularly the valve train and parts in the crankcase chamber 48. It is also possible to inject lubricating oil separately into the passage 126a at 101 when the fuel is not pre-mixed with oil. In which case second fraction of charge free of oil goes into the combustion chamber 51 and oil mixed first fraction of the charge (or oil mixed with just air) goes into the crankcase chamber 48. Amount of charge is controlled by the carburetor valve 584 and may have separate valves 584a and 584b to regulate the mass flow into passages 126a and 126b respectively. When oil is injected into the passage 126a, only first fraction of air free of fuel is inducted through the passage 126a. Essentially the divided intake passage 126 may have either only air going into crankcase chamber 48 through passage 126a when oil is injected into the air stream to lubricate the parts; or may have air-fuel mixture when oil is premixed with the fuel, OR may have lean air-fuel mixture free of oil when oil is injected into the lean mixture in passage 126a, while rich mixture flows through the passage 126b OR the mixture may be of uniform air-fuel ratio going through both the passages 126a and 126b. Also, when only air passes through passage 126a, fuel supplied through 126b may be a propane fuel or any gaseous fuel, such as compressed natural gas, bio gas, etc. The advantage of injecting oil into air inducted into crankcase chamber is that the fuel either liquid form as in the case of gasoline or gaseous as in the case of propane can flow directly into the combustion chamber during the intake process, while oil injected into air lubricates the valve train (cam gear, crank gear, followers, valves, cam lobe, etc) and bearings in the crankcase chamber 48. Another advantage is that the engine can be operated in many attitudes as there is no oil in the crankcase chamber that would flow into the cylinder when engine is operated upside down. The dual intake system where passage 126 is divided into two separate passages 126a and 126b may also be applied to overhead valve chamber 106 shown in FIG. 1, but with a passage 126a connecting the valve chamber 106 and only air entering the valve chamber 106 and crank chamber 48, with oil injected for lubricating the valve train and parts in the crankcase chamber 48.

During the compression stroke when the piston assembly 756 travels upward, the intake valve 98 is closed and the crankcase chamber 48 experiences negative pressure and the charge (oil mixed charge) is inducted into the crankcase chamber 48 from the carburetor 500 through the passage 126a, the port 122, the chamber 88. The one way valve 128 opens due to differential pressure cross the one way valve (typically a reed valve is used). When the piston moves downward during power stroke and expansion stroke, the crankcase pressure is built up.

During the intake stroke, the intake valve 98 opens and the charge from the crankcase chamber 48 enters the combustion chamber 51. At the same time, the rich charge enters the combustion chamber 51 directly from the carburetor 500 through the passage 126b.

The concept of dual passage (first fraction 810 going into crankcase chamber 48 and second fraction of charge 812 going directly into combustion chamber is applicable to all mono-block engines and any conventional cylinder crankcase blocks.

The oil pump 1505 may be driven by the crankshaft 22 as shown in FIG. 12b or by the camshaft 82 as shown in FIG. 5b. The pump may also be driven by the crankshaft 722b, shown in FIG. 9b (and FIG. 9) where the pump is mounted outboard. The pump may be a diaphragm pump operated by the variation in the pressure in the crankcase chamber 48.

Fuel used in the oil injected engine may be propane gas commonly known as LPG (liquefied petroleum gas or compressed gaseous fuel.

Figure 18:
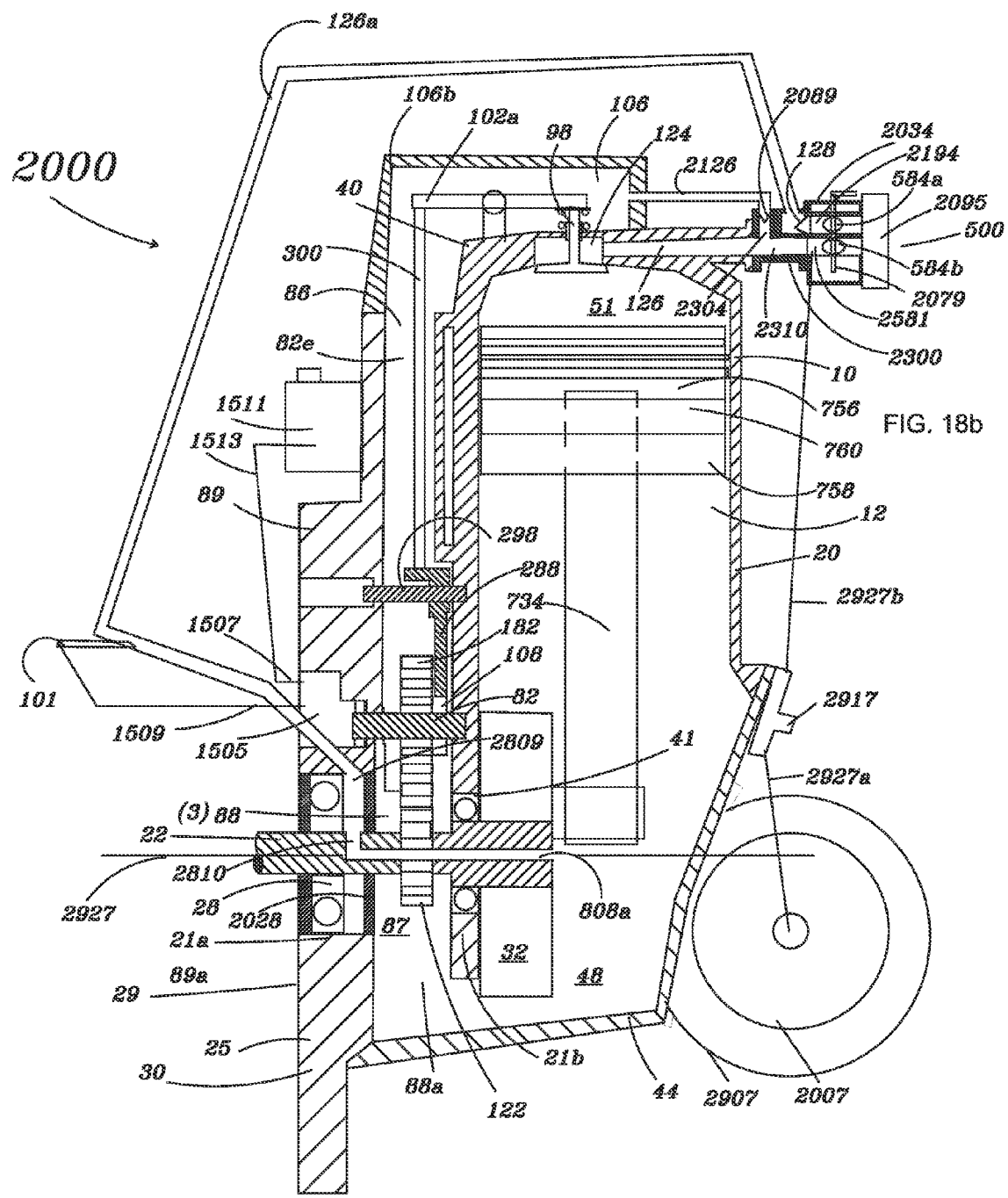
FIG. 18 is a cross sectional view of another embodiment with intake system showing first fraction passage through crankshaft and return passage through single intake port and showing the locations of a propane fuel tank and an oil tank.
Figure 18B:
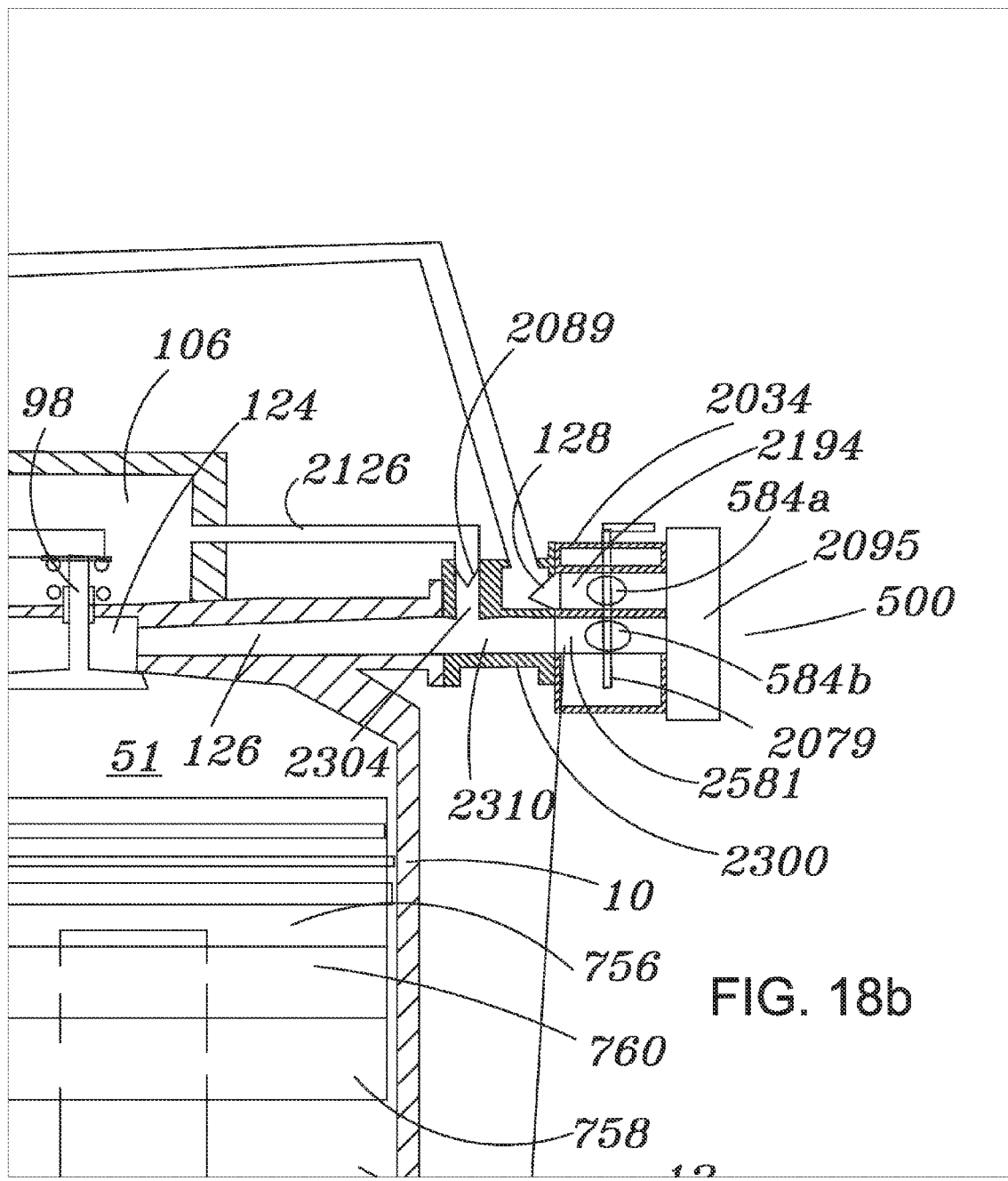
FIG. 18b shows enlarged sectional view of FIG. 18.

In the FIG. 18, the passage 126a is connected to the crankcase chamber 48 through a passage 808a as shown in FIG. 18. The cross drilled passage 2809 on the crankshaft 22 is in gaseous communication with the passage 126a through packet of space formed between the outer sealed bearing 28 and an oil seal 2028. The pocket of space may also be between the inner bearing 41 and an oil seal (not shown). Therefore in this case there is a gaseous passage between the crankcase chamber 48 and the intake passage 2194 in the heat dam 2300. The first fraction of the air now mixed with oil returns to the combustion chamber through a passage 82e connecting the crankcase chamber 48 and the over head valve chamber 106, passage 2126 and into the intake passage 2310 through a one way valve 2089 in the heat dam 2300.

The oil may also be injected at the carburetor 500 and the shaft 2079 may be used to regulate the amount of coil injected into the first fraction of the air.

Figure 18C:
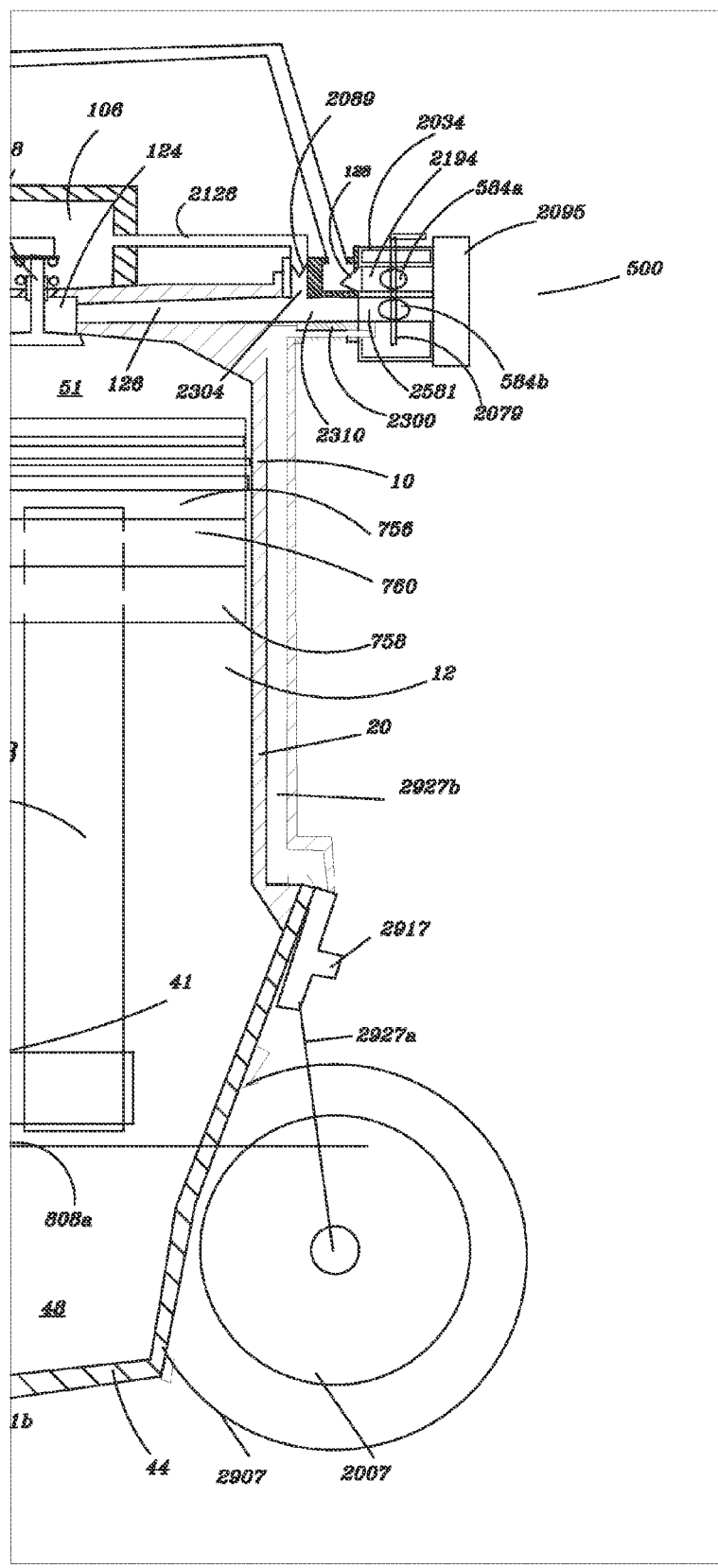
FIG. 18c shows enlarged sectional view of FIG. 18 with cast fuel line integral with the mono-block.

FIG. 18 shows the location of the propane fuel tank 2007 located below the center line 2927 of the crankshaft attached to the crankcase cover 44. The pressure regulator 2917 is attached to the crankcase cover 44 with the fuel line 2927a feeding the pressure regulator 2917 from the fuel tank 2007. Fuel line 2927b from the pressure regulator 2917 feeds the carburetor 500. The pressure regulator 2917 may be an integral of the carburetor 500. Also, the fuel lines 2927b can be cast into the cylinder block 10 and the heat dam 2300 can have an internal passage connecting the cast in fuel line 2927b to the carburetor 500 as shown in FIG. 18c. This helps heat the fuel line 2927b to vaporize the propane fuel. Also, the propane tank 2007 may be cast into the crankcase cover 44 to be an integral part of the engine block.

The oil reservoir 1511 is above the centerline 2927 and may be a cast feature of the cylinder block 20. The oil outlet line 1513 feeds the oil pump 1505 driven either off of the camshaft 82 shown in detail in FIG. 5c or driven off of the crankshaft 22 in a half crank as shown in FIG. 12b. The oil pump may also be driven by the outboard shaft 722b similar to an oil pump in a commercially available Mitsubishi's HL26cc two-stroke trimmer.

The pressure regulator 2917 may be an integral part of the crankcase cover 44 or the mono-block 10.

Figure 19:
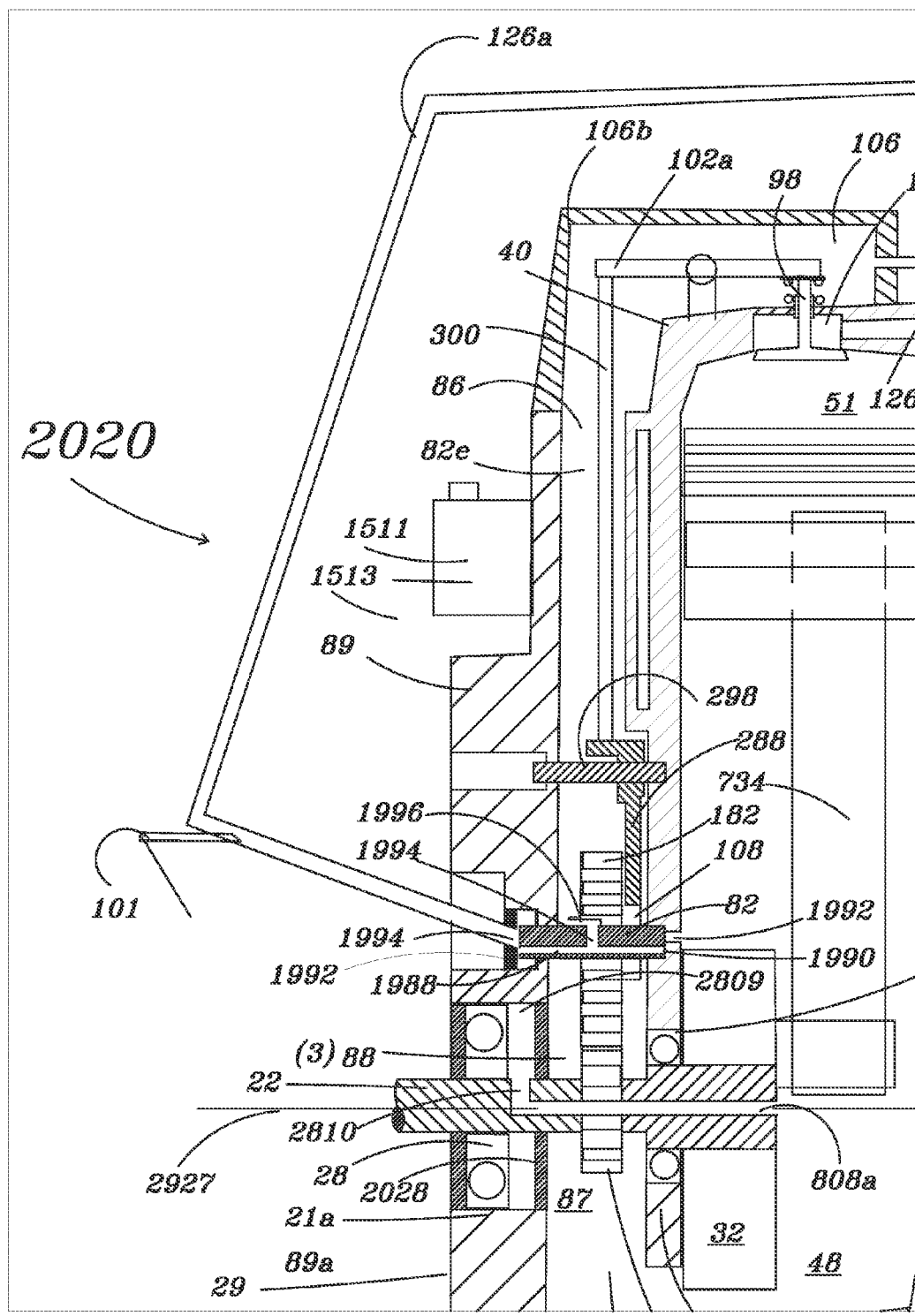
FIG. 19 is a cross sectional view of another embodiment with intake system showing first fraction passage through cam shaft and return passage through single intake port and showing the locations of a propane fuel tank and an oil tank.
Figure 19B:
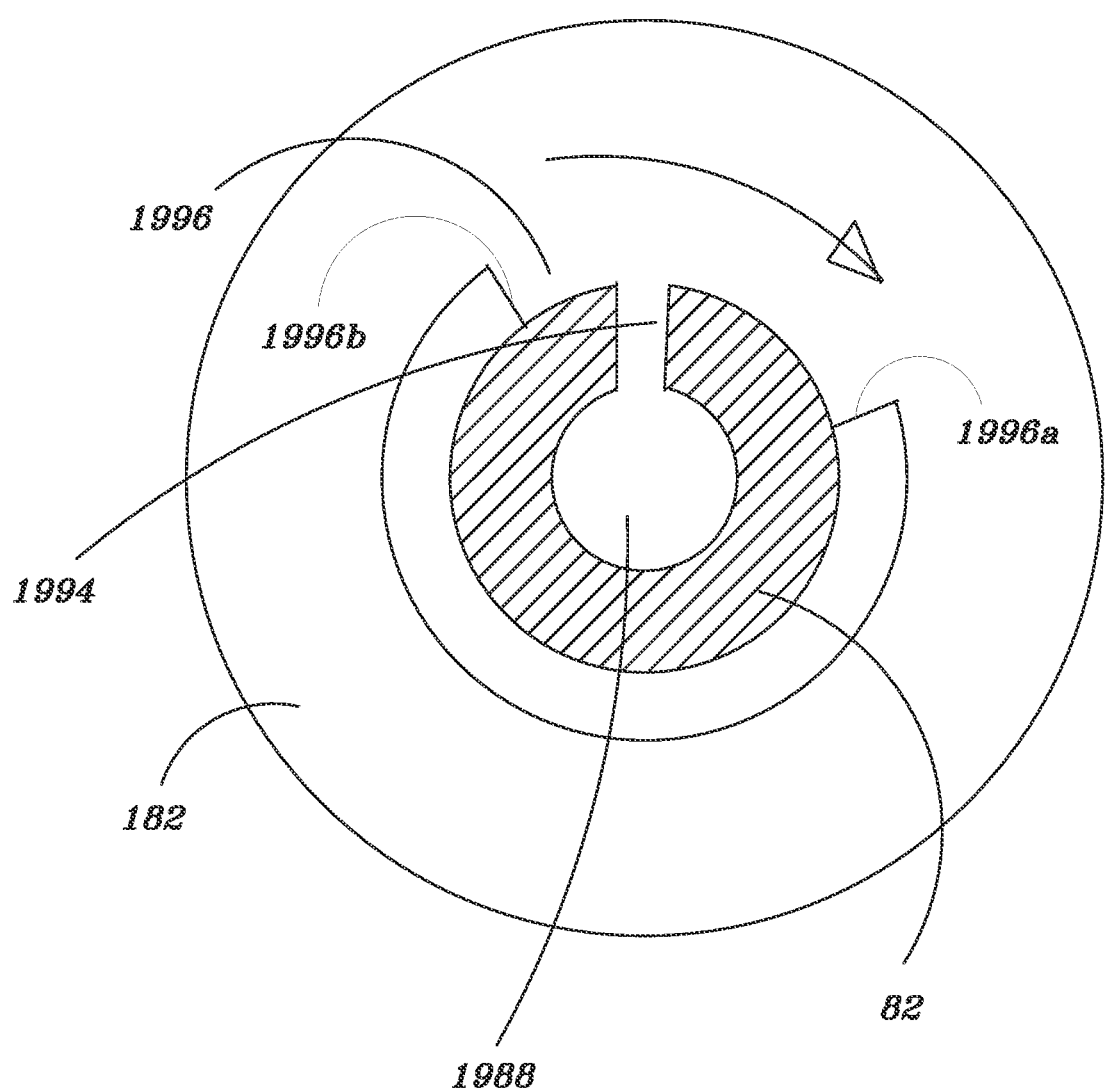
FIG. 19b is a front view of the cam gear on a camshaft with the first fraction passage in the center of the shaft with a timing slot.

FIG. 19 illustrates where the first fraction of charge or just air and oil is supplied into the crankcase chamber 48 through a central passage 1988 in the camshaft 82. In one embodiment the central passage 1988 is off-centered in the camshaft 82 and a similarly off-centered hole 1982 in the cylinder block 20 aligns periodically with each other. The hole 1992 communicates with the crankcase chamber 48. The camshaft 82 is rotating at half the crankshaft speed. Therefore it is possible for the passage 1988 and hole 1992 to align only when the piston is moving upward during either exhaust stroke or compression stroke. The passage is cut off from the crankcase chamber when the piston is moving downward. Thus the one-way valve 128 may be eliminated. In another embodiment the opening and closing of the passage 1988 may be controlled by the rotating cam gear 182 in which case the camshaft 82 will be stationary. Again the opening and closing of the cross drilled passage 1994 may be accomplished by the cut out 1996, which has an leading edge 1996a to open the passage 1994 and a trailing edge 1996b to close the passage 1994. Again the communication of passage 126a with the crankcase chamber 48 is open and closed appropriately. It is open when the piston is moving upward and closed during downward stroke of the piston. Again, the one-way valve 128 may be eliminated. It is also possible to use camshaft as a way to eliminate the one-way valve 2089 as well.

The return of charge from the crankcase chamber into the combustion chamber may be from any convenient location. As described above one fraction of the charge may enter the crankcase chamber to lubricate the parts through a passage in the crankshaft or camshaft and the charge may return from the crankcase chamber into the intake passage or from the valve chamber 106 as the case may be. The camshaft may be located above the combustion chamber in the valve chamber 106

The U.S. Pat. No. 6,199,532 discloses engine where intake passage is not divided into separate passages and the fuel is pre-mixed with oil and the valve chamber is substantially spaced above the combustion chamber. The U.S. Pat. No. 7,096,850 describes 100% of the pre-mixed fuel and air going into the crankcase chamber to lubricate the internal parts. In U.S. Pat. No. 7,398,759 the carburetor does not have dual passage system and the intake port is not divided as described in this embodiment. Secondly, the first fraction of the charge enters the crankcase chamber through a passage in the crankshaft and may be timed according to the stroke of the piston and not have the check valve 128.

Figure 19C:
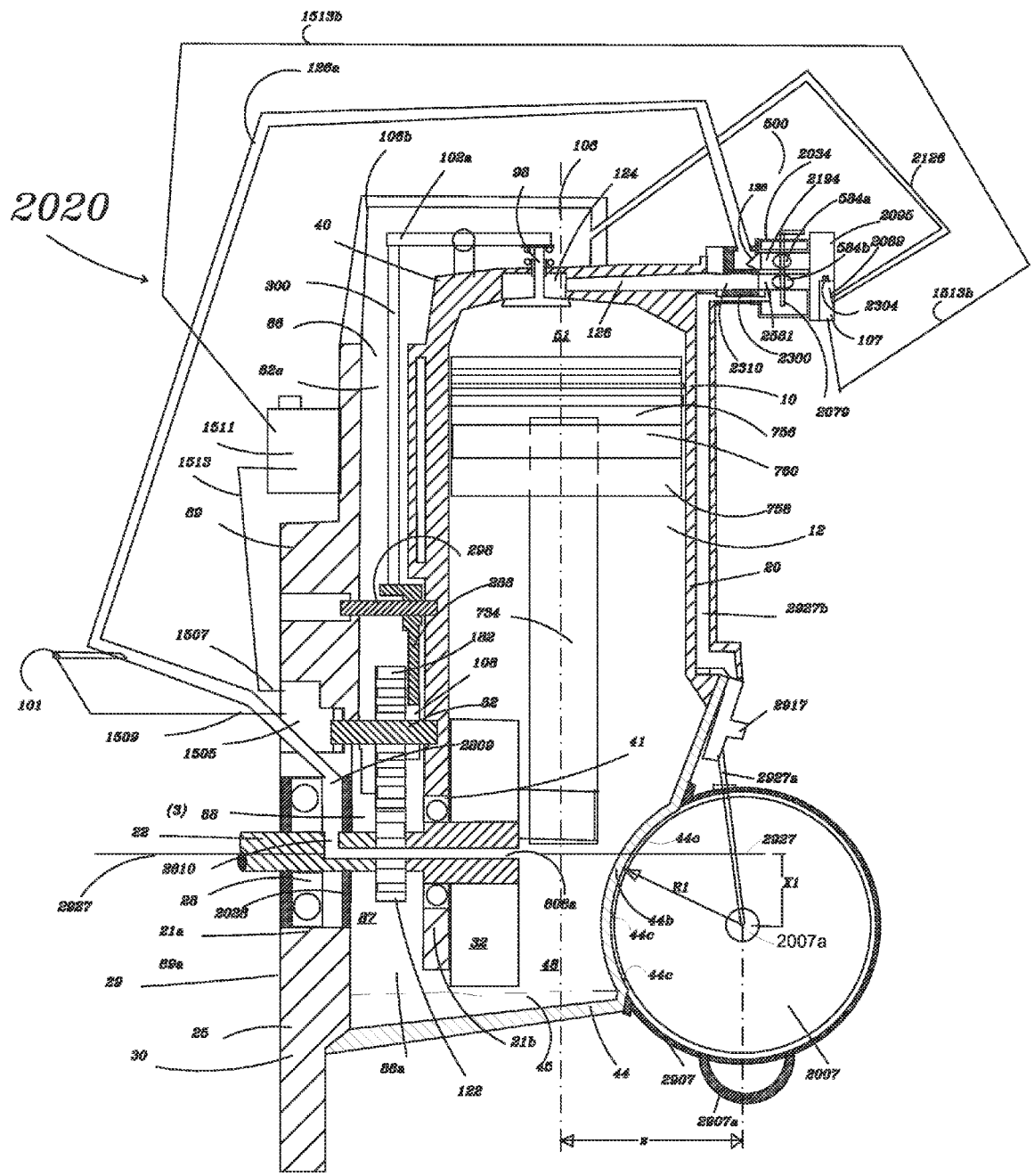
FIG. 19c is a cross sectional view of another embodiment with intake system showing first fraction passage through crankshaft and return passage through an oil separation chamber integral with the air filter system and oil return to oil tank and has a propane fuel tank tucked on to the crankcase cover.
Figure 19C:
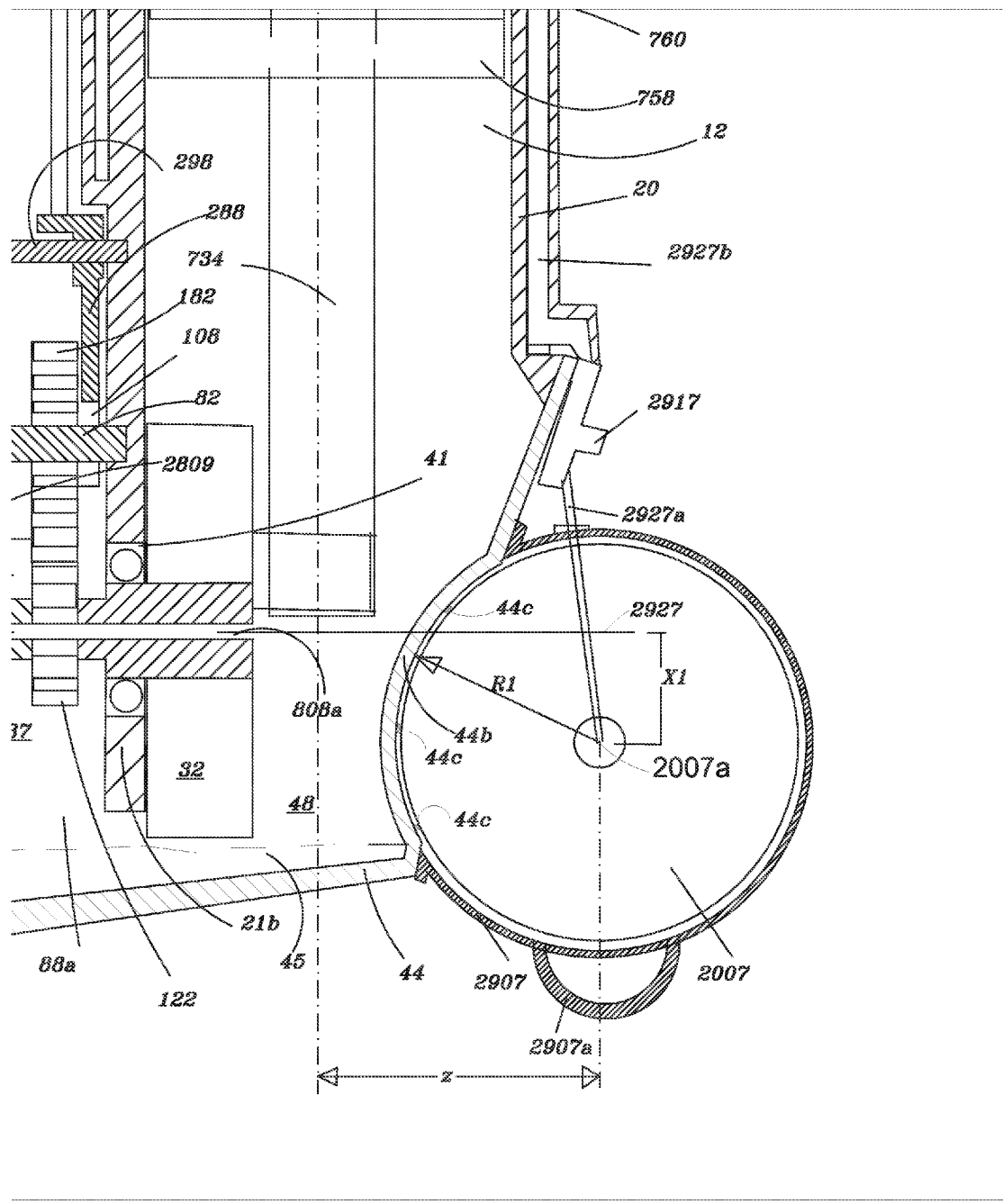
Figure 19D:
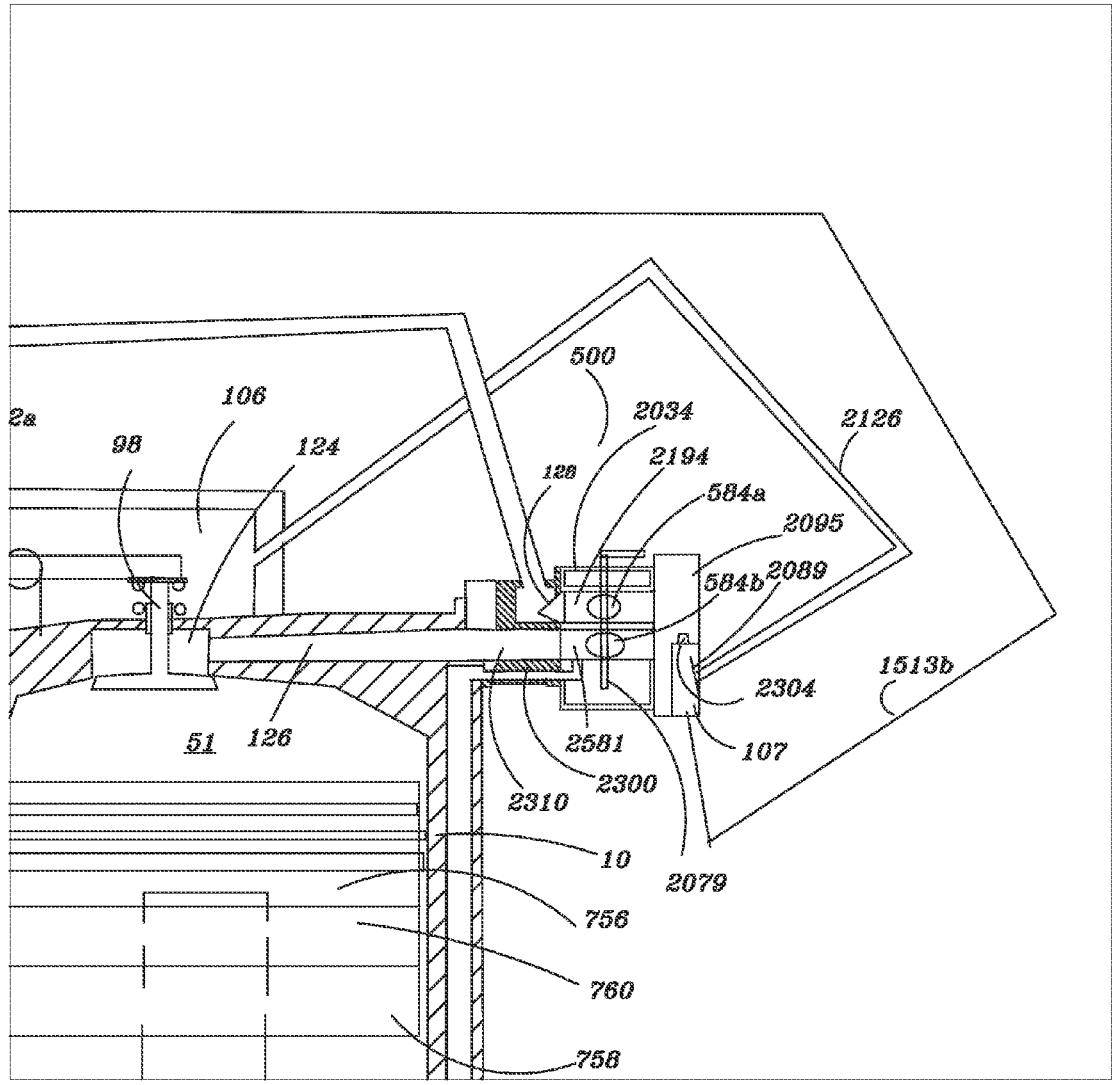
FIG. 19d shows enlarged view of the embodiment shown in FIG. 19c.
Figure 19E:
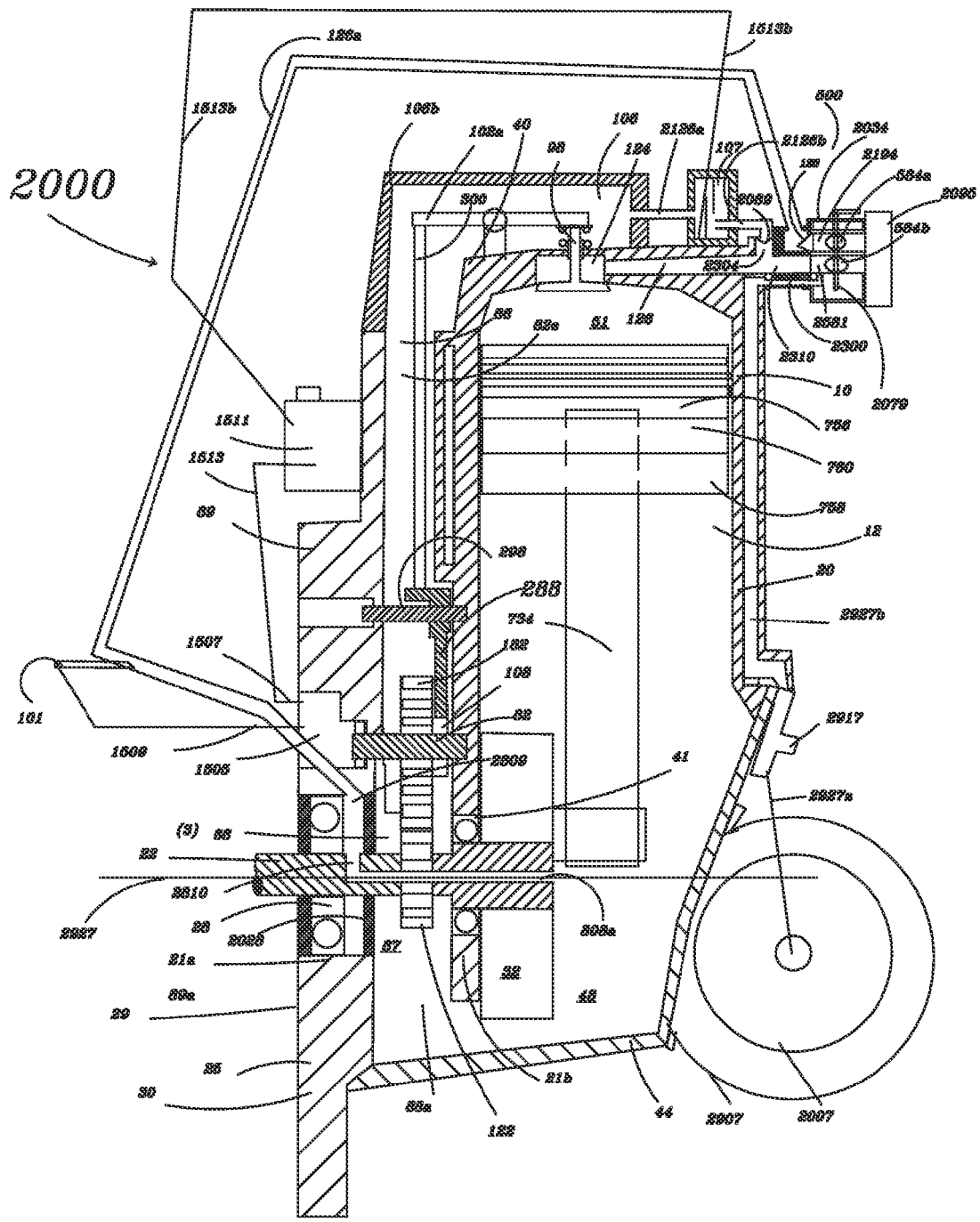
FIG. 19e is a cross sectional view of another embodiment with intake system showing first fraction passage through crankshaft and return passage through an oil separation chamber between the valve chamber and the intake passage and oil return to oil tank.
Figure 19F:
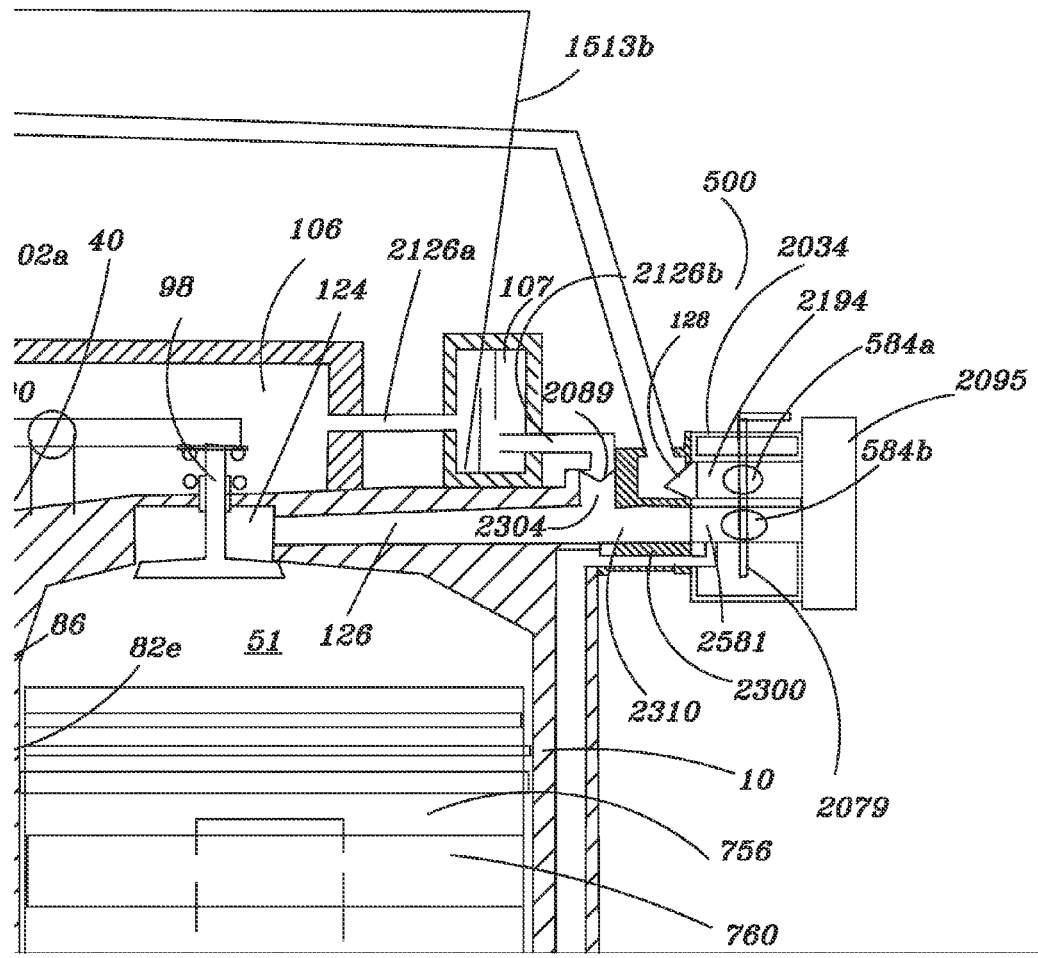
FIG. 19f shows enlarged view of the embodiment shown in FIG. 19e.

In another embodiment, engine 2020 having over head valve 98 shown in FIG. 19c, the first fraction of the charge carrying oil vapors and or droplets of oil is returning into the intake air filter 2095. However, the first fraction is first passed through a one-way valve 2089 and into an oil separation chamber 107 which is integral with the air filter box 2095. The condensed oil is then returned to through line 1513b into the oil tank 1511. The first fraction now inducted into the combustion chamber through the intake passage 2310. FIG. 19c also shows the location of the LPG fuel tank 2007 and the crankcase cover 44 has a radius of curvature R1 plus a few millimeters to closely match the curvature R1 of the LPG fuel tank 2007. As explained with FIG. 14 f, the centerline of 2007a of the fuel tank 2007 is below the axis 2927 of the crankshaft 22 and is also offset from the axis 12a of the cylinder 12. In order to minimize heating of fuel tank 2007 and provide a softer cushion between the crankcase cover 44 and fuel tank 2007, a vibration absorbent and low heat conductive material 44c is used between the fuel tank 2007 and crankcase cover 44 at 44b as shown in FIG. 19cc. FIG. 19d shows enlarged view of the carburetor 500 and the oil separation chamber 107 integral with the air filter box 2095.

In another embodiment 19e shows the engine 2000 having overhead valve 98 similar to engine 2000, first fraction of the charge flows from the inside of the engine, in this case from the valve chamber 106 through a passage 2126a into an oil separation chamber 107 where the oil vapors and droplets are separated fairly well and the first fraction of charge now relatively free of oil returns to the combustion chamber 51 during the intake process through a passage 2126b through a one-way valve 2089 into the intake passage 126. As explained earlier the first fraction after flowing through the oil separation chamber may enter the intake port 124 through a separate passage as explained for engine 3000. The condensed oil in the oil separator 107 is returned into the oil tank or engine. The oil in the oil separation chamber is pumped back into the engine or oil tank 1511 periodically by the partial vacuum formed in the oil tank 1511, particularly when oil tank 1511 is connected to the crankcase chamber 48 or may even be pumped back into the injector 101 using the oil pump 1505, as shown by dotted line 1513c in FIG. 19c. The oil pump 1505 may be driven either by a camshaft, crankshaft, or a cam gear or belt drive or flywheel. The flywheel, typically used as a cooling fan and a magneto may have teeth cut on the circumference to drive an oil pump. The oil pump may also be a diaphragm pump operated by the pressure pulsation in crankcase chamber 48 caused by the upward and downward movement of the piston 756.

The oil may also be inducted automatically into the intake passage 126a by the vacuum or low pressure in the intake passage 126a when the piston is traveling upward away from the crankcase chamber 48.

The fuel take off point inside the LPG Tank may be at a location where the liquid fuel cannot enter the pickup point. One proffered location is the center of the tank 2007 with a metal or a rigid pipe. With this arrangement the liquid fuel does not enter the fuel line at any attitude of the engine or the tank.

Also, the fuel supply line 3017 may always be immersed into the liquid form of LPG in the fuel tank 3007 if liquid form of fuel is required. Such a liquid fuel may be desired when liquid form of LOG is injected into the engine or intake passage. Secondly, when the liquid form of LPG is delivered into the intake system, particularly when the fuel is to go through the crankcase chamber, the oil may be pre-mixed with oil. Thus when fuel and air passes through the crankcase chamber 48, the oil lubricates the internal parts of the engine.

Also, it is possible to use the pressure in the LPG fuel tank 2007 to pump oil into the engine to lubricate the parts. A diaphragm may be used to separate the oil and LPG fuel from getting in contact with each other.

Figure 27:
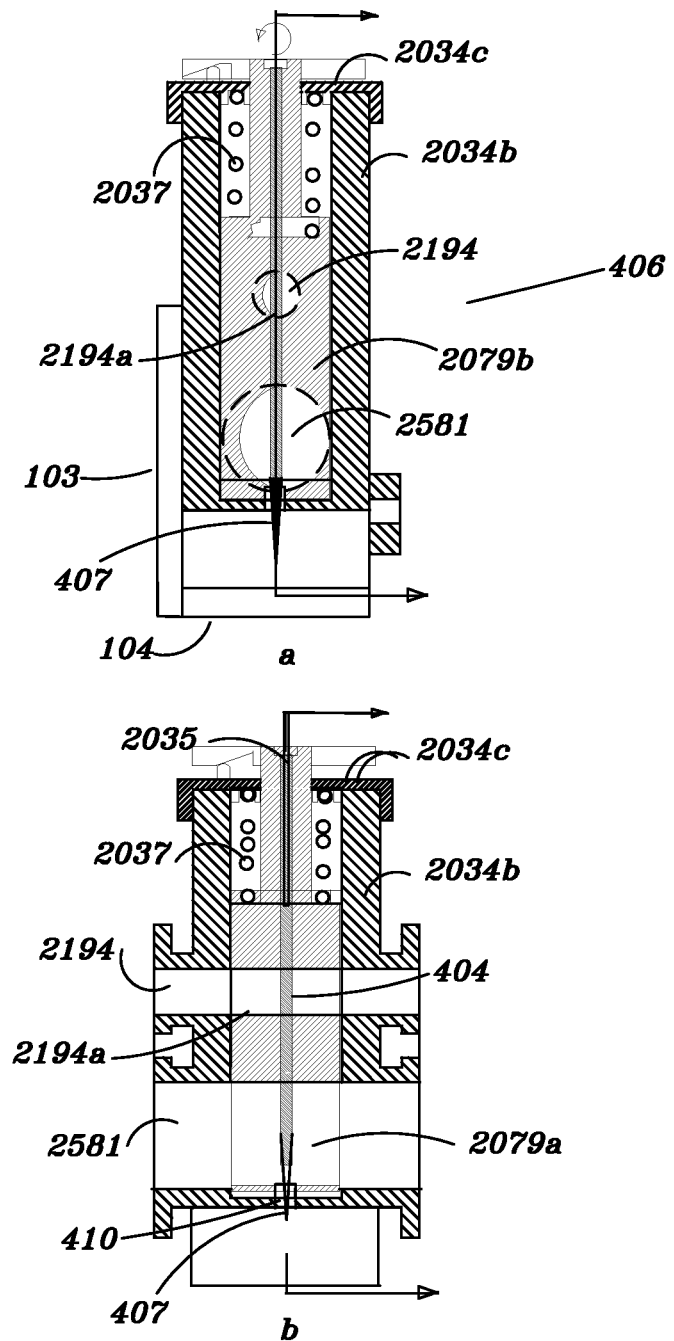
FIG. 27a is a cross sectional front view of an embodiment of a fuel mixer with a rotary valve.
FIG. 27b is a cross sectional side view of FIG. 27a with the rotary valve 2079b partially rotated.

In another embodiment the propane tank may be located in the front side of the block 89 above the crankshaft 22. In which case, the flywheel and starter may be located on the back side. The dual valve carburetor 500 may be rotary valve type as shown in FIGS. 27a and 27b having a rotary valve 2079b, or a butterfly valve type described in U.S. Pat. No. 6,901,892. The valves 584a and 584b may be mounted on a common shaft 2079 or have separate shaft for each. The dual valve carburetor 500 may also be of sliding valve type, commonly used in LPG Carburetors or motor cycle carburetors. The Carburetor may a liquid fuel carburetor or a gaseous fuel, such as propane type carburetor. A sliding valve is commonly employed for propane gas carburetion or mixing, the sliding valve may be combined with any other type of valve for the regulation of first fraction of the charge or air OR the sliding valve may have dual passages with a slot cut on the sliding valve to regulate either first or second fraction of air.

The application of such embodiments described in here may be trimmers, blowers, chainsaws, generators, or any lawn and garden equipment.

Figure 20:
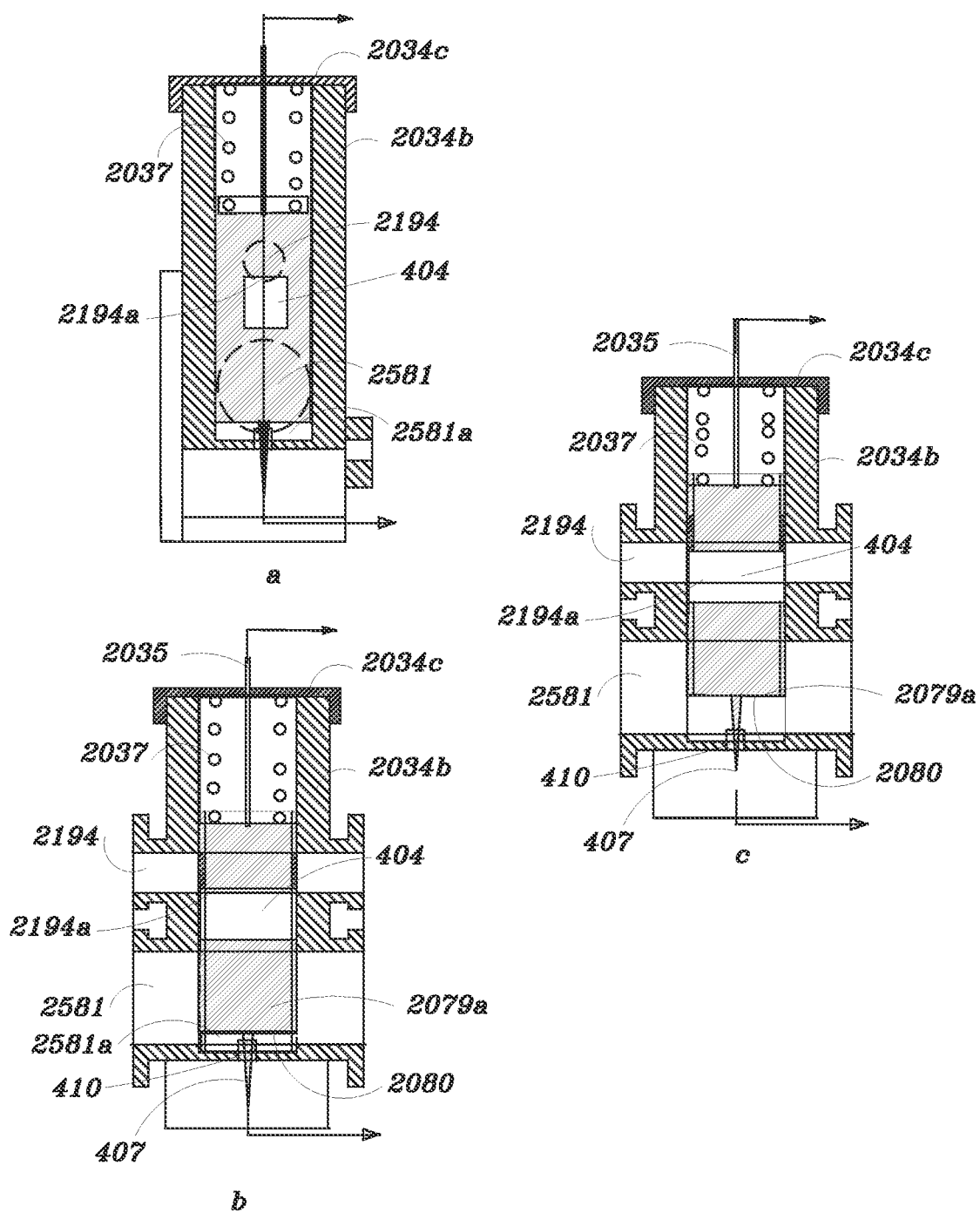
Figure 21:
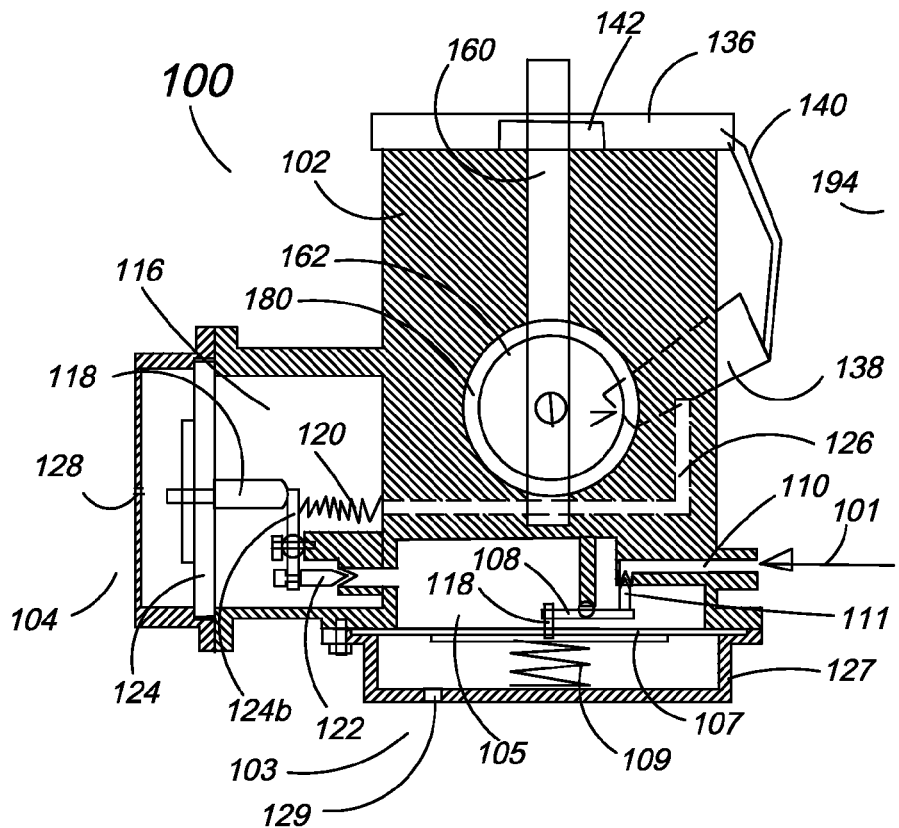
FIG. 21 is a cross sectional front view of an embodiment of an electronic LPG fuel injected throttle body with butterfly valve, fuel metering chamber, and fuel pressure regulator.
Figure 22:
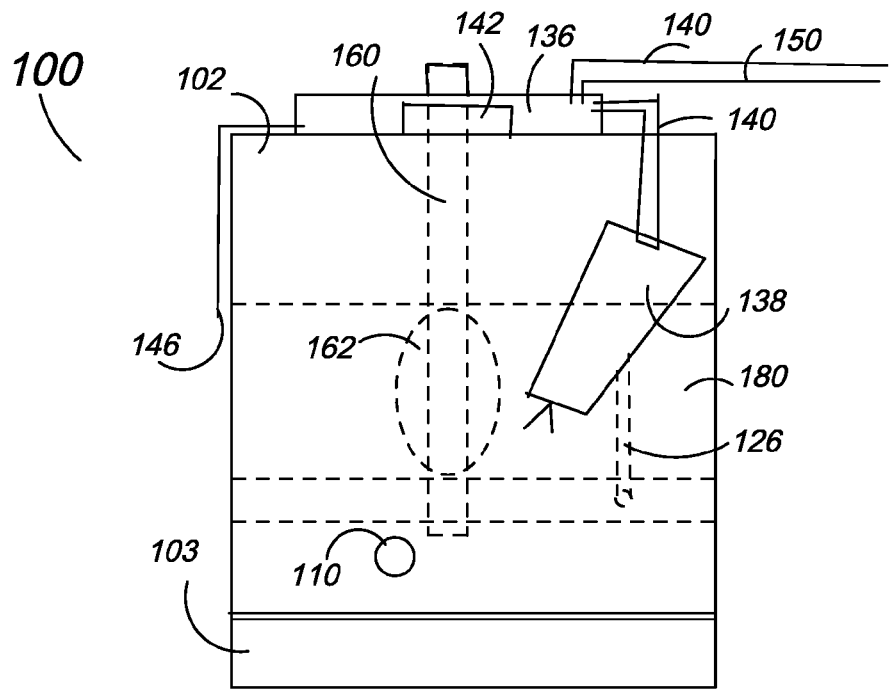
FIG. 22 is side view of the FIG. 21

FIGS. 20a, 20b and 20c illustrates embodiment of a sliding valve type fuel mixer 700. It consists of a body 2034b and a sliding drum 2079a. The drum 2079a has a through 404 hole cut out in the drum 2079a for regulating the first fraction of the air (or charge) and the second fraction of the air (or charge) is regulated by the flow area under the lower edge 2080 of the sliding drum 2079a. The drum 2079a has a fuel regulating needle 407 attached to the drum. The needle 407 is a taper needle which increases the flow area for the fuel as the drum is lifted up. The cut out 404 increases the flow area for the first fraction as the drum is lifted up. The drum has a spring 2037 to keep the drum pushed down in its free state. The upper cap 2034c keeps the spring and the drum inside the body 2034b. The cross sectional area of the passage 2194 to regulate the first fraction of charge may be 2% to 75% of the cross sectional area of the second passage 2581. When fuel is mixed with first fraction of the charge the fuel metering jet 410 may extend into the passage 2194 as described in U.S. Pat. No. 6,901,892. As the sliding drum 2079a is lifted up with a cable 2035, the flow area 2581a under the lower edge 2080 increases and at the same time, it also increases the flow area 2194a for the first fraction. The fuel supplied to the fuel mixer 700 may be LPG fuel or gasoline. However, the sliding valve is preferred for regulating the gaseous fuel, such as LPG. The LPG when it reaches the mixer 700, it is in gaseous form. The fuel mixer 700 has a pressure regulator 414 to maintain a uniform flow of fuel. The cut out 404 in the fuel mixer 700 may be rectangular, oval or circular in shape.

FIG. 21 through 26 illustrate embodiments of electronically controlled LPG or compressed natural gas injected throttle body as applied to small engines. The pressure in an LPG tank typically is about 100 inches of water and the pressure is reduced in regulator to about 10 inches of water. The Throttle body 100 consists of a body 102 that has one primary passage 180 that connects the engine's intake passage 126 (126b) in a four-stroke engine for example shown in FIG. 14, 14d and or in FIG. 1. The intake passage 180 has a throttle valve 162 which is a butterfly valve (or a slide valve 462 shown in FIG. 23 to regulate the amount air going into the engine. The throttle valve is controlled by the throttle shaft 160 (or 468). The throttle body 100 has an electronic control unit 136, commonly called as ECU or ECM mounted on the body 102 such that the throttle shaft 160 passes through the ECU 136 which has a throttle position sensor 142 to sense the position of the throttle, which can range from full closed for low speed and load at idle, to fully open position at full speed or load. The ECU 136 has inputs or sensors connected to it to measure engine speed 148, engine temperature or exhaust temperature 150, intake air temperature of air filter body temperature 146. The ECU 136 has already programmed fuel and timing maps to control the amount of fuel injected through an injector 138 and also it can control the spark timing, which is a common practice.

The Throttle body 102 has an integral pressure regulator 103 consisting of an LPG inlet 110, pressure chamber 105, diaphragm 107, needle valve 111, arm 108, pressure spring 109, vent hole 129 in the pressure regulator cover 127.

The pressure P1 is normally at about 50 to 100 inches of water in the LPG tank enters the pressure chamber 105 where the flow is regulated by the needle valve 111. The needle valve 111 is connected to the diaphragm 107 through a pin 118 and an arm 108. As the pressure increases in the chamber 105 the needle valve closes the flow of LPG fuel because the pressure pushes the diaphragm outward against a pressure spring 109. The pressure P2 in the pressure chamber is controlled by the spring 109, which may be pre-set to any level equal to or below the inlet pressure P1, The fuel pressure chamber is connected to a fuel metering chamber 104 through a passage 176 between the pressure chamber 105 and the fuel metering chamber 116. The metering chamber 116 is connected to the LPG fuel injector 138 through a fuel passage 126, which can also be an external hose outside the throttle body 102. As the fuel flows into the fuel metering chamber 116, the pressure in the pressure regulator chamber 105 drops, thus opening the needle valve 111 for the fuel to flow into the pressure chamber, thus maintaining almost a constant pressure.

The fuel metering chamber 116 also a diaphragm 124, needle valve 122, arm 124, pin 118, metering chamber cover 126 and a vent hole 128. Operation of the metering chamber is similar to the pressure regulator chamber, where the pressure now at about 10 inches of water is maintained constant while the fuel is fed to the fuel injector 138. Fuel in the metering chamber 116 is connected to the injector 138 through a fuel passage 126, as the fuel is depleted in the metering chamber due to fuel injection into the passage 180, the pressure P2 drops in the metering chamber. The needle 122 opens and maintains a nearly constant pressure P2. The needle valve 122 is activated by the diaphragm through the pin 118 and the arm 124. The needle valve is tries to stay closed because of the spring 120 in the metering chamber 116. Typically this spring 120 is a very small spring compared to the spring 109. P2 in metering chamber is slightly lower than P2 due to pressure loss across the needle valve 122.

The amount of fuel injected depends on throttle position, intake temperature TI, engine block or exhaust gas temperature TB, engine speed RPM, and sometimes, intake manifold pressure MAP.

Figure 23:
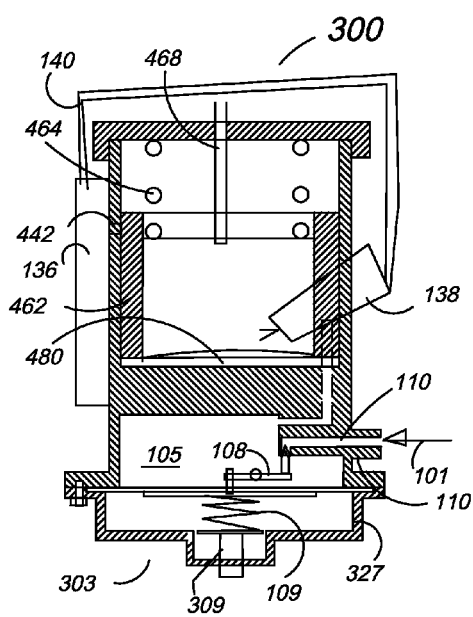
FIG. 23 is a cross sectional front view of an embodiment of electronic LPG fuel injected throttle body with slide valve with fuel pressure regulator.

FIG. 23 illustrates a throttle body 300 similar to 100. However, the throttle body 300 has a sliding valve 462 in place of butterfly valve and does not have fuel metering chamber. It only has pressure chamber which also acts as a metering chamber. The principle of operation is similar as explained above. However, the ECU 136 has a linear position sensor 442 in place of a rotary position sensor 142.

Figure 24:
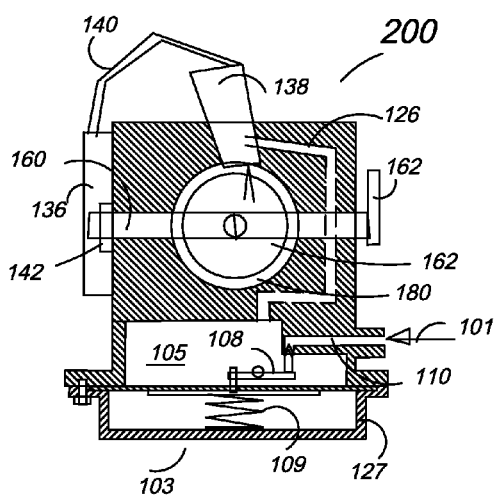
FIG. 24 is a cross sectional front view of another embodiment of throttle body with electronic LPG fuel injection system, butterfly valve, and fuel pressure regulator only.

FIG. 24 illustrates a throttle body similar to throttle body 21, but has only pressure regulator (also acts as a fuel metering chamber). It is possible to have a throttle body where the pressure regulator is external to the throttle body. And the commonly used pressure regulator as in cooking gas stove may be used.

Figure 25:
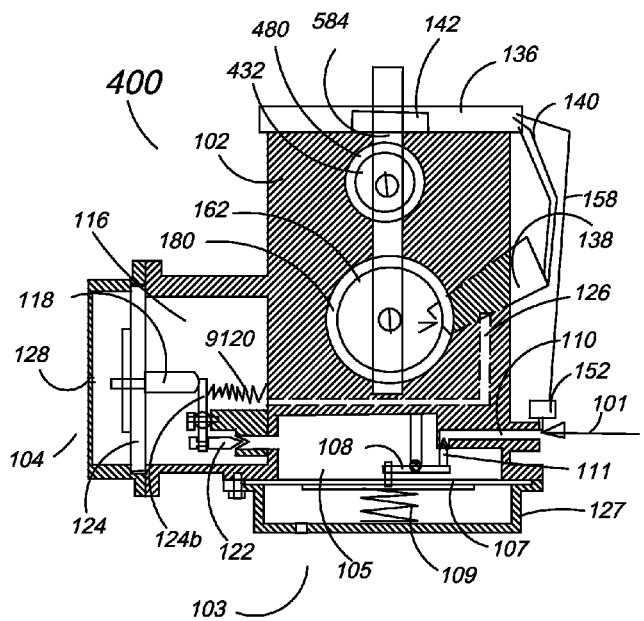
FIG. 25 is a cross sectional front view of an embodiment of an electronic LPG fuel injected throttle body with dual intake butterfly valves, fuel metering chamber, and fuel pressure regulator.
Figure 26:
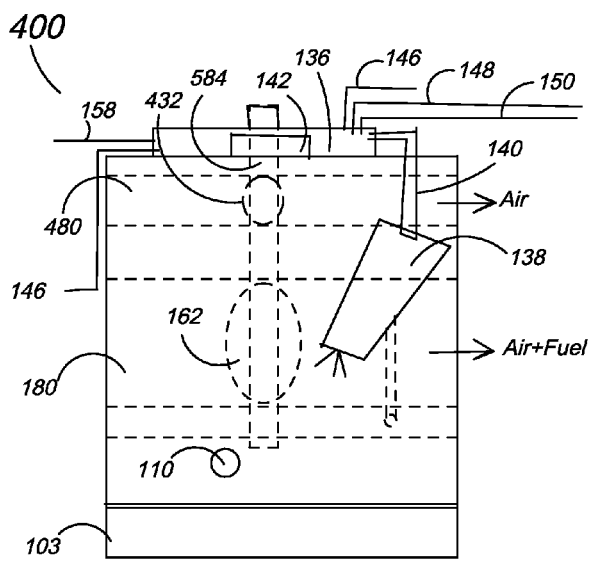
FIG. 26 is side view of FIG. 25.

FIGS. 25 and 26 illustrate a dual intake throttle body consisting of primary intake passage 180 having a throttle valve 162 to control the flow of charge (mixture of air and fuel) and a secondary passage 480 for air only having a throttle valve 432 to regulate only the air. The dual intake system may be used in place of the carburetor 500 explained earlier on an engine shown in FIGS. 14, 14d, and 15 or in a two-stroke stratified engines. Throttle valves 162 and 432 are on the same throttle shaft 160 or it can be a rotary valve or a sliding valve disclosed in many prior arts.

Advantages:
1. It is a monoblock and hence there is no separate head, or gaskets for cylinder head or valve chamber or cam chamber.
2. Not all of the charge goes to the crankcase chamber which may take extra time for charge to each combustion chamber.
3. Rich charge goes directly into the combustion chamber and hence faster response to throttle and faster acceleration.
4. Only a fraction of the charge going into the crankcase chamber may be lubricated, thus, reducing oil consumption. In a dual intake system, only air can be inducted into crankcase chamber with oil injection into the air intake passage. Or oil may be injected directly into crankcase chamber.
5. Assembly has few parts—less number of screws.
6. Valve lash may be adjusted in an L head using the screw 299.
7. Valve assembly can be a modular part where the valve seal can beinspected prior to assembling into the block. Cost of the rejected parts is less and the parts can be salvaged easily.
8. The camshaft 82 may be inserted through the crankcase chamber and, thus, minimizes leak into the ambient.
9. Piston pin may be assembled through the opening in the crankcase and hence assembly is simpler.
10. Divided passage as shown in FIG. 14e has an advantage where engine responds faster to throttle because fuel does not have to travel through crankcase chamber.
10. The LPG tank when mounted close to the crankcase cover, it gets warmed up sooner.
11. When the LPG fuel tank is mounted on top of the engine, the radiation and convection heat from the warm engine heats the LPG fuel tank.
12. The pressure regulator may be integral with the fuel tank.
13. The pressure regulator may be integral with the engine block.
14. The oil tank may be mounted on the fuel tank or may be integral with the fuel tank.
15. The oil tank may be pressurized using the fuel pressure.
16. The oil injection may occur due to pressure difference between the crankcase and the oil tank.
17. The LPG Fuel with dual intake system may easily be used on two-stroke stratified engines, particularly with oil injection into the first fraction of air that goes into the transfer passages and the oil is injected into the second fraction so the oil goes straight into the crankcase chamber.
18. The design with dual intake system with one fraction of air only going into the crankcase chamber and oil being injected into the first fraction of air may be used in conjunction with fuel injection into the second fraction of the air.
19. The dual intake slide valve fuel mixer shown in FIG. 20 may be used on two-stroke stratified engines.
20. Electronically controlled LPG fuel injection system has many advantages; better fuel control, compensation for temperature, faster response, fuel efficiency is better, emission is lower, speed governing is easier.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

PART NUMBERS

100 LPG EFI Throttle Body
101 LPG/Natural gas fuel
102 Throttle body
103 Pressure regulator
104 Metering chamber
105 Pressure chamber
107 Diaphragm—pressure chamber
108 Arm—pressure chamber
109 Spring—pressure regulator
110 LPG inlet
111 Needle valve—pressure chamber
116 Metering chamber
118 Pin—Diaphragm
120 Spring—needle valve
122 Needle valve—metering chamber
124 Arm—metering chamber
124 Diaphragm—metering chamber
126 Fuel passage
126 Cover—metering chamber
127 Cover—Pressure regulator
128 Vent hole—metering chamber
129 Vent hole—pressure chamber
136 ECU
138 LPG Injector
140 Injector wires
142 TPS—throttle position sensor—rotary
146 Inlet air temperature
148 Cylinder or exhaust temperature—input signal
150 RPM—Engine speed
160 Throttle shaft
162 Primary butterfly throttle valve
162 Throttle lever
172 Feed passage
180 Primary inlet passage
New
190 Kill switch
192 Fuel shut off valve
194 Kill wire
200 EFI Throttle body
300 EFI Throttle body—sliding valve
303 Pressure regulator
309 Adjustable screw—pressure
327 Cover—pressure regulator
442 Throttle position sensor—linear
462 Slide valve
464 Spring—slide valve
468 Throttle cable
480 Inlet passage
400 Dual intake throttle body
432 Secondary butterfly throttle valve
480 Secondary inlet passage Accordingly, what is desired to be secured by Letters Patent of the United States is the invention as defined and differentiated in the following claims:

1. A dual passage gaseous fuel carburetor having:
a body (102, 2034*b*);
a sliding drum (2079*a*) in the body (102, 2034*b*);
a first passage (2581) for air-fuel mixture;
a second passage (2194) for air only;
a cut out (404) in the sliding drum (2079*a*) is axially at a distance away from the lower edge (2080) and movable axially as the sliding drum (2079*a*) is lifted axially;
flow area (2581*a*) under the lower edge (2080) and the flow area (2194*a*) for the first fraction increase simultaneously from partially open to fully open flow areas as the sliding drum (2079*a*) is lifted axially;
a variable venturi (2581*a*), in which the sliding drum is movable up and down to change the area of the variable venturi and regulate the mixing of air and fuel in the first passage (2581), and to simultaneously regulate the air flow in the second passage (2194);
a fuel regulating needle (407) at the bottom of the sliding drum (2079*a*);
at least one pressure regulating chamber (105) within the body;
a metering (116) chamber within the body; and
at least one pressure regulator, in which each of the pressure regulators comprise:
an LPG inlet;
at least one diaphragm;
at least one needle valve (111);
at least one arm;
at least one pressure regulator cover with at least one vent hole in the at least one pressure regulator cover; and
at least one pressure spring.

2. The carburetor of claim 1 further comprising a variable venturi (2581*a*), in which the sliding drum is movable up and down to change the area of the variable venturi and regulate the mixing of air and fuel in the first passage (2581), and to simultaneously regulate the air flow in the second passage (2194).

3. A dual passage gaseous fuel carburetor having:
a body (2034*b*);
a sliding drum (2079*a*) in the body (2034*b*);
a first passage (2581) for air-fuel mixture;
a second passage (2194) for air only;
a third passage (404) in the sliding drum (2079*a*) is axially at a distance away from the lower edge (2080), in which the third passage (404) aligns with the second passage (2194) as the sliding drum is lifted from partially open to fully open positions;
a fuel regulating needle (407) at the bottom of the sliding valve (2079*a*);
a cable/lever (2035) to axially lift the the sliding valve (2079*a*); and
at least one LPG inlet (110).

* * * * *